US012245605B2

(12) United States Patent
Hernandez et al.

(10) Patent No.: US 12,245,605 B2
(45) Date of Patent: Mar. 11, 2025

(54) COMPOUNDS AND FORMULATIONS FOR PROTECTIVE COATINGS

(71) Applicant: APEEL TECHNOLOGY, INC., Goleta, CA (US)

(72) Inventors: Carlos Hernandez, Goleta, CA (US); Chance Holland, Goleta, CA (US); Stephen Kaun, Goleta, CA (US); Louis Perez, Santa Barbara, CA (US); Charles Frazier, Goleta, CA (US)

(73) Assignee: Apeel Technology, Inc., Goleta, CA (US)

( * ) Notice: Subject to any disclaimer, the term of this patent is extended or adjusted under 35 U.S.C. 154(b) by 340 days.

(21) Appl. No.: 16/427,219

(22) Filed: May 30, 2019

(65) Prior Publication Data

US 2020/0068912 A1 Mar. 5, 2020

Related U.S. Application Data

(60) Provisional application No. 62/727,501, filed on Sep. 5, 2018.

(51) Int. Cl.
*A23B 7/154* (2006.01)
*A23B 7/16* (2006.01)
*A23L 3/3517* (2006.01)

(52) U.S. Cl.
CPC ................ *A23B 7/154* (2013.01); *A23B 7/16* (2013.01); *A23L 3/3517* (2013.01); *A23V 2002/00* (2013.01)

(58) Field of Classification Search
CPC .. A23B 7/154; A23B 7/16; A23B 9/14; A23B 9/26; A23L 3/3463; A23L 3/3472; A23L 3/3481; A23L 3/349; A23L 3/3499; A23L 3/3508; A23L 3/3517; A23L 3/3544; A23P 20/10; A23P 20/11; A23P 20/15; A23P 20/17; A23P 20/18; C07C 53/124; C07C 57/02; C07C 57/03; C07C 57/12; C07C 59/01; C07C 59/42; C07C 59/44; C07C 69/02; C07C 69/22; C07C 69/24; C07C 69/28; C07C 69/30; C07C 69/52; C07C 69/533; C07C 69/58; C07C 69/587; C07C 69/66; C07C 69/67; C07C 69/675; C07C 69/73; C07C 69/732
See application file for complete search history.

(56) References Cited

U.S. PATENT DOCUMENTS 1,016,761 A 2/1912 Moore
1,943,468 A 1/1934 Bridgeman
2,213,557 A 9/1940 Tisdale
2,222,000 A 11/1940 Schmidt
2,223,168 A 11/1940 Dombrow
2,275,659 A 3/1942 Steinle et al.
2,324,448 A 7/1943 Gottlieb
2,333,887 A 11/1943 Redlinger
2,424,952 A 7/1947 Handy
2,472,794 A 6/1949 Cothran
2,657,282 A 10/1953 Winkel
2,697,793 A 12/1954 Trump et al.
2,857,282 A 10/1958 Jansen
3,189,467 A 6/1965 Kalmar
3,208,951 A 9/1965 Berger et al.
3,232,765 A 2/1966 Rosenthal et al.
3,449,108 A 6/1969 McConnell et al.
3,471,303 A 10/1969 Hamdy et al.
3,715,024 A 2/1973 Mumma
3,997,674 A 12/1976 Ukai
4,002,775 A * 1/1977 Kabara .................. A01N 37/12 426/532
4,025,540 A 5/1977 Kleemann et al.
4,115,313 A * 9/1978 Lyon ....................... A23L 27/00 252/8.57
4,421,775 A 12/1983 Chan, Jr.
4,423,071 A 12/1983 Chignac et al.
(Continued)

FOREIGN PATENT DOCUMENTS

CN 86104531 2/1988
CN 1103548 6/1995
(Continued)

OTHER PUBLICATIONS

English machine translation of Nishina et al. (JP-H0416173 A). (Year: 1992).*
Berge et al. ("Pharmaceutical Salts," J. Pharm. Sci., 66(1), pp. 1-19) (Year: 1977).*
English language machine translation of Fukukura et al. (JP 2519455 B2 / JPS 63305930 A) (Year: 1996).*
English language machine translation of Sonoda (JP 2012087072 A) (Year: 2012).*
English language machine translation of Moribe et al. (JP 2014231481 A) (Year: 2014).*
English language machine translation of Li (CN 104606076 A) (Year: 2015).*
(Continued)

*Primary Examiner* — Matthew R Diaz
(74) *Attorney, Agent, or Firm* — Fish & Richardson P.C.

(57) ABSTRACT

Compositions for forming protective coatings can include a first group of compounds, where each compound of the first group is a fatty acid, fatty acid ester, or fatty acid salt having a carbon chain length of at least 14 carbons. The compositions can optionally include a second group of compounds selected from fatty acids, fatty acid esters, fatty acid salts, and combinations thereof, wherein each compound of the second group has a carbon chain length from 7 to 13 carbons. At least some of the compounds of the first group can function as emulsifiers, allowing the composition to be dissolved, suspended, or dispersed in a solvent. At least some of the compounds of the second group can function as wetting agents in order to improve the surface wetting of items to be coated when solutions, suspensions, or colloids that include the compositions are applied to the items.

28 Claims, 18 Drawing Sheets

(56) References Cited

U.S. PATENT DOCUMENTS

| | | | |
|---|---|---|---|
| 4,649,057 A | 3/1987 | Thomson | |
| 4,654,370 A | 3/1987 | Marriott, III et al. | |
| 4,661,359 A | 4/1987 | Seaborne | |
| 4,710,228 A | 12/1987 | Seaborne et al. | |
| 4,726,898 A | 2/1988 | Mills et al. | |
| 4,732,708 A | 3/1988 | Ekman et al. | |
| 4,820,533 A | 4/1989 | Seaborne | |
| 4,857,345 A | 8/1989 | Sardo | |
| 4,874,618 A | 10/1989 | Seaborn | |
| 4,960,600 A | 10/1990 | Kester et al. | |
| 4,962,885 A | 10/1990 | Coffee | |
| 5,019,403 A | 5/1991 | Krochta | |
| 5,051,448 A | 9/1991 | Shashoua | |
| 5,110,509 A | 5/1992 | Peter et al. | |
| 5,126,153 A | 6/1992 | Beck | |
| 2,342,063 A | 2/1994 | Sells | |
| 5,354,573 A | 10/1994 | Gross et al. | |
| 2,363,232 A | 11/1994 | Witt | |
| 5,366,995 A * | 11/1994 | Savage | A01N 37/02 514/558 |
| 5,376,391 A | 12/1994 | Nisperos | |
| 5,389,389 A | 2/1995 | Beck | |
| 5,451,266 A | 9/1995 | Kirk | |
| 5,498,295 A | 3/1996 | Murch | |
| 5,543,164 A | 8/1996 | Krochta et al. | |
| H1591 H | 9/1996 | Fulcher | |
| 5,607,970 A | 3/1997 | Ishihara | |
| 5,658,768 A | 8/1997 | Quinlan | |
| 5,741,505 A | 4/1998 | Beyer | |
| 5,827,553 A | 10/1998 | Dimitroglou et al. | |
| 5,832,527 A | 11/1998 | Kawaguchi | |
| 5,906,831 A | 5/1999 | Larsson et al. | |
| 5,925,395 A | 7/1999 | Chen | |
| 5,939,117 A | 8/1999 | Chen et al. | |
| 6,010,726 A | 1/2000 | Evans et al. | |
| 6,033,705 A | 3/2000 | Isaacs | |
| 6,136,856 A | 10/2000 | Savage et al. | |
| 6,162,475 A | 12/2000 | Hagenmaier et al. | |
| 6,165,529 A | 12/2000 | Yang | |
| 6,241,971 B1 | 6/2001 | Fox et al. | |
| 6,254,645 B1 | 7/2001 | Kellis, Jr. et al. | |
| 6,255,451 B1 | 7/2001 | Koch et al. | |
| 6,294,186 B1 | 9/2001 | Beerse et al. | |
| 6,348,217 B1 | 2/2002 | Santos et al. | |
| 6,503,492 B2 | 1/2003 | McGlone et al. | |
| 6,723,364 B1 | 4/2004 | Bompeix | |
| 6,783,768 B1 | 8/2004 | Brown et al. | |
| 6,822,105 B1 | 11/2004 | Luxem | |
| 7,373,135 B2 | 5/2008 | Najib-Fruchart et al. | |
| 7,375,135 B2 | 5/2008 | Najib-Fruchart et al. | |
| 7,550,617 B2 | 6/2009 | Imig et al. | |
| 7,708,822 B2 | 5/2010 | Lahav et al. | |
| 7,732,470 B2 | 6/2010 | Imig et al. | |
| 7,754,766 B2 * | 7/2010 | Awad | A61P 31/02 514/560 |
| 7,785,897 B2 | 8/2010 | Agnes et al. | |
| 7,851,002 B2 | 12/2010 | Hekal et al. | |
| 7,931,926 B2 | 4/2011 | Lidster et al. | |
| 7,943,336 B2 | 5/2011 | Viksoe-Nielsen et al. | |
| 8,101,221 B2 | 1/2012 | Chen et al. | |
| 8,119,178 B2 | 2/2012 | Lidster et al. | |
| 8,197,870 B2 | 6/2012 | Krasutsky et al. | |
| 8,247,609 B2 | 8/2012 | Roques et al. | |
| 8,263,751 B2 | 9/2012 | Peterson | |
| 8,424,243 B1 | 4/2013 | Narciso et al. | |
| 8,501,445 B2 | 8/2013 | Yoshikawa et al. | |
| 8,546,115 B2 | 10/2013 | Buchert et al. | |
| 8,586,807 B2 | 11/2013 | Hatcher | |
| 8,609,169 B2 | 12/2013 | Chen et al. | |
| 8,752,328 B2 | 6/2014 | Kaiser et al. | |
| 8,846,355 B2 | 9/2014 | Yoshikawa et al. | |
| 9,095,152 B2 | 8/2015 | Munger | |
| 9,102,125 B2 | 8/2015 | Battersby et al. | |
| 9,283,173 B2 * | 3/2016 | Lederman | A01N 3/00 |
| 9,284,432 B2 | 3/2016 | Yoshikawa et al. | |
| 9,475,643 B1 | 10/2016 | Odman et al. | |
| 9,714,399 B2 * | 7/2017 | Verkuijl | A61K 8/37 |
| 9,743,670 B2 | 8/2017 | Grund | |
| 9,743,679 B2 | 8/2017 | Perez et al. | |
| 9,770,041 B2 | 9/2017 | Dong et al. | |
| 10,150,132 B2 | 12/2018 | Hamamoto et al. | |
| 2001/0042341 A1 | 11/2001 | Hamersky et al. | |
| 2002/0043577 A1 | 4/2002 | Krasutsky et al. | |
| 2002/0123546 A1 | 9/2002 | Bigg et al. | |
| 2003/0044488 A1 | 3/2003 | Roskam | |
| 2003/0124228 A1 | 7/2003 | Goto | |
| 2003/0194445 A1 | 10/2003 | Kuhner et al. | |
| 2004/0022906 A1 | 2/2004 | Petcavich | |
| 2004/0120919 A1 | 6/2004 | Nguyen et al. | |
| 2004/0220283 A1 | 11/2004 | Zhang et al. | |
| 2005/0053593 A1 | 3/2005 | Wang et al. | |
| 2005/0233039 A1 | 10/2005 | Wolfe et al. | |
| 2005/0249856 A1 | 11/2005 | Marangoni | |
| 2006/0037892 A1 | 2/2006 | Blanc | |
| 2006/0057187 A1 | 3/2006 | Eskuchen et al. | |
| 2006/0057259 A1 | 3/2006 | Ripoll et al. | |
| 2006/0153912 A1 | 7/2006 | Habich et al. | |
| 2006/0198924 A1 | 9/2006 | Song et al. | |
| 2006/0292281 A1 | 12/2006 | Kragh et al. | |
| 2007/0278103 A1 | 12/2007 | Hoerr et al. | |
| 2008/0026120 A1 | 1/2008 | Petcavich | |
| 2008/0038471 A1 | 2/2008 | Boger et al. | |
| 2008/0119772 A1 | 5/2008 | Coffee | |
| 2008/0254987 A1 | 10/2008 | Liu et al. | |
| 2008/0262190 A1 | 10/2008 | Koskimies et al. | |
| 2008/0310991 A1 | 12/2008 | Webster et al. | |
| 2009/0035414 A1 | 2/2009 | Cheng et al. | |
| 2009/0042985 A1 | 2/2009 | Bhaggan et al. | |
| 2009/0104446 A1 | 4/2009 | Guillet et al. | |
| 2009/0123632 A1 | 5/2009 | Klemann et al. | |
| 2009/0142453 A1 | 6/2009 | Lobisser et al. | |
| 2009/0163729 A1 | 6/2009 | Li | |
| 2009/0325240 A1 | 12/2009 | Daniell | |
| 2010/0029778 A1 | 2/2010 | Bailey et al. | |
| 2010/0092631 A1 | 4/2010 | Sardo | |
| 2010/0210745 A1 | 8/2010 | McDaniel | |
| 2010/0278784 A1 | 11/2010 | Pojasek et al. | |
| 2010/0292426 A1 | 11/2010 | Hossainv | |
| 2011/0000975 A1 | 1/2011 | Gartstein et al. | |
| 2011/0003014 A1 | 1/2011 | Kulikowski | |
| 2011/0240064 A1 | 10/2011 | Wales | |
| 2011/0244095 A1 | 10/2011 | Sardo | |
| 2011/0280942 A1 | 11/2011 | Schad et al. | |
| 2012/0003356 A1 | 1/2012 | Ekanayake et al. | |
| 2012/0103790 A1 | 5/2012 | Krull et al. | |
| 2012/0251675 A1 | 10/2012 | Sowa et al. | |
| 2013/0045246 A1 | 2/2013 | Edwards et al. | |
| 2013/0095141 A1 | 4/2013 | Schad | |
| 2013/0121648 A1 | 5/2013 | Hung et al. | |
| 2013/0156970 A1 | 6/2013 | Crawford | |
| 2013/0209617 A1 | 8/2013 | Lobisser et al. | |
| 2013/0216488 A1 | 8/2013 | Hernandez-Brenes et al. | |
| 2013/0323378 A1 | 12/2013 | Stark | |
| 2014/0033926 A1 | 2/2014 | Fassel et al. | |
| 2014/0199449 A1 | 7/2014 | Hernandez et al. | |
| 2014/0205722 A1 | 7/2014 | Quintanar Guerrero et al. | |
| 2014/0221308 A1 | 8/2014 | Baker et al. | |
| 2014/0234921 A1 | 8/2014 | Nyyssola et al. | |
| 2014/0348945 A1 | 11/2014 | Dong et al. | |
| 2015/0021802 A1 * | 1/2015 | Wakita | C08L 23/06 510/188 |
| 2015/0030780 A1 | 1/2015 | Rogers | |
| 2015/0079248 A1 | 3/2015 | Nussinovitch et al. | |
| 2015/0210855 A1 | 7/2015 | Firth | |
| 2015/0359217 A1 | 12/2015 | Narita | |
| 2015/0366230 A1 | 12/2015 | Malefyt et al. | |
| 2016/0002483 A1 | 1/2016 | Zhao et al. | |
| 2016/0100597 A1 | 4/2016 | Immaraju | |
| 2016/0213030 A1 | 7/2016 | Schad | |
| 2016/0256429 A1 | 9/2016 | Spanova et al. | |
| 2016/0304410 A1 * | 10/2016 | Schultz | B01J 2/30 |
| 2016/0324172 A1 | 11/2016 | Williams et al. | |
| 2017/0049119 A1 | 2/2017 | Perez et al. | |
| 2017/0073532 A1 * | 3/2017 | Perez | A01N 3/00 |

(56) References Cited

U.S. PATENT DOCUMENTS

| | | | |
|---|---|---|---|
| 2017/0251673 | A1 | 9/2017 | Cifuentes |
| 2017/0332650 | A1 | 11/2017 | Holland |
| 2018/0092811 | A1 | 4/2018 | Klee |
| 2018/0303732 | A1 | 10/2018 | Wehner et al. |
| 2018/0317509 | A1 | 11/2018 | Van Velzen |
| 2018/0368427 | A1 | 12/2018 | Rogers et al. |
| 2019/0104748 | A1 | 4/2019 | Kaun et al. |
| 2019/0269145 | A1 | 9/2019 | Bakus, II et al. |
| 2020/0352184 | A1 | 11/2020 | Frazier et al. |
| 2020/0383343 | A1 | 12/2020 | Rodriguez et al. |
| 2021/0282432 | A1 | 9/2021 | Hernandez et al. |
| 2021/0337817 | A1 | 11/2021 | Lee et al. |
| 2022/0039416 | A1 | 2/2022 | Kaun et al. |
| 2022/0064859 | A1 | 3/2022 | Hernandez et al. |
| 2022/0135510 | A1 | 5/2022 | Bakus, II et al. |

FOREIGN PATENT DOCUMENTS

| | | | | | |
|---|---|---|---|---|---|
| CN | 1215420 | A | | 4/1999 | |
| CN | 1616561 | A | | 5/2005 | |
| CN | 1817147 | | | 8/2006 | |
| CN | 1856261 | | | 11/2006 | |
| CN | 1870912 | | | 11/2006 | |
| CN | 101035926 | A | | 9/2007 | |
| CN | 101356012 | A | | 1/2009 | |
| CN | 101454406 | | | 6/2009 | |
| CN | 101708013 | | | 5/2010 | |
| CN | 102119719 | | | 7/2011 | |
| CN | 102291986 | A | | 12/2011 | |
| CN | 102335142 | A | | 2/2012 | |
| CN | 102349555 | | | 2/2012 | |
| CN | 103283830 | A | | 9/2013 | |
| CN | 103478233 | | | 1/2014 | |
| CN | 103719261 | | | 4/2014 | |
| CN | 103734280 | | | 4/2014 | |
| CN | 104606076 | A | * | 5/2015 | |
| CN | 104642528 | | | 5/2015 | |
| CN | 105341619 | | | 2/2016 | |
| CN | 105494615 | | | 4/2016 | |
| CN | 106280909 | A | * | 1/2017 | |
| CN | 107828560 | | | 3/2018 | |
| CN | 110255947 | | | 9/2019 | |
| CN | 112898630 | | | 6/2021 | |
| DE | 25 05 428 | | | 8/1976 | |
| DE | 36 22 191 | | | 1/1988 | |
| EP | 0104043 | A2 | | 3/1984 | |
| EP | 0655201 | | | 5/1995 | |
| EP | 1020124 | A2 | | 7/2000 | |
| EP | 1681281 | | | 7/2006 | |
| EP | 2389814 | | | 11/2011 | |
| EP | 2644185 | A1 | * | 10/2013 | ............ A61K 8/342 |
| EP | 2684879 | | | 1/2014 | |
| EP | 3354264 | A1 | * | 8/2018 | ............ A61K 47/02 |
| ES | 1041955 | | | 8/1999 | |
| GB | 421649 | | | 12/1934 | |
| IN | 192832 | | | 5/2004 | |
| JP | S54-139645 | | | 10/1979 | |
| JP | S54-139645 | A | | 10/1979 | |
| JP | S58-034034 | A | | 2/1983 | |
| JP | S58-89140 | | | 5/1983 | |
| JP | 62-126931 | | | 6/1987 | |
| JP | S63-062574 | A | | 3/1988 | |
| JP | H04-016173 | | | 1/1992 | |
| JP | H0416173 | A | * | 1/1992 | .......... A23L 3/3517 |
| JP | H04-507192 | A | | 12/1992 | |
| JP | H06-506166 | | | 7/1994 | |
| JP | H07-075519 | | | 3/1995 | |
| JP | H08-056564 | | | 3/1996 | |
| JP | 2519455 | B2 | * | 7/1996 | |
| JP | H10-298003 | | | 11/1998 | |
| JP | 2002-531075 | A | | 9/2002 | |
| JP | 2003-522130 | | | 7/2003 | |
| JP | 2007-502271 | | | 2/2007 | |
| JP | 2007-510014 | | | 4/2007 | |
| JP | 2008-504442 | A | | 2/2008 | |
| JP | 2009-527357 | A | | 7/2009 | |
| JP | 2010-530795 | | | 9/2010 | |
| JP | 2012087072 | A | * | 5/2012 | |
| JP | 2012-515561 | A | | 7/2012 | |
| JP | 2013-139433 | | | 7/2013 | |
| JP | 2014231481 | A | * | 12/2014 | |
| WO | WO 93/06735 | | | 4/1993 | |
| WO | WO 2001/001980 | | | 1/2001 | |
| WO | WO 2004/030455 | | | 4/2004 | |
| WO | WO 2007/100654 | | | 9/2007 | |
| WO | WO 2008/142393 | | | 11/2008 | |
| WO | WO 2009/119730 | | | 10/2009 | |
| WO | 2010/031929 | | | 3/2010 | |
| WO | WO 2011/014831 | | | 2/2011 | |
| WO | WO 2012/042404 | | | 4/2012 | |
| WO | WO 2012/164561 | | | 12/2012 | |
| WO | WO 2012/173262 | | | 12/2012 | |
| WO | 2014/162238 | | | 10/2014 | |
| WO | WO 2014/206911 | | | 12/2014 | |
| WO | WO 2015/017450 | | | 2/2015 | |
| WO | WO 2015/028299 | | | 3/2015 | |
| WO | WO 2015/052433 | | | 4/2015 | |
| WO | WO 2015/074144 | | | 5/2015 | |
| WO | WO 2015/176020 | | | 11/2015 | |
| WO | WO 2016/168319 | | | 10/2016 | |
| WO | WO 2016/187581 | | | 11/2016 | |
| WO | WO 2017/048951 | | | 3/2017 | |
| WO | WO-2017043972 | A1 | * | 3/2017 | ............ A01N 25/04 |
| WO | WO 2017/100636 | | | 6/2017 | |
| WO | WO 2017/132281 | | | 8/2017 | |
| WO | WO 2017/172951 | | | 10/2017 | |
| WO | WO 2018/009846 | | | 1/2018 | |
| WO | WO 2018/042435 | | | 3/2018 | |
| WO | WO 2018/094269 | | | 5/2018 | |
| WO | 2019/096844 | | | 5/2019 | |

OTHER PUBLICATIONS

English language machine translation of Huang (CN 106280909 A) (Year: 2016).*

Alvaro, J et al. "Effects of peracetic acid disinfectant on the postharvest of some fresh vegetables", Journal of Food Engineering, 2009, vol. 95, pp. 11-15.

Andrade et al. "Atomizing spray systems for application of edible coatings", *Comprehensive Reviews in Food Science and Food Safety*, vol. 11, No. 3, 2012, pp. 323-337.

Ayala-Zavala, J.F et al., "High Relative Humidity In-Package of Fresh-Cut Fruits and Vegetables: Advantage or Disadvantage Considering Microbiological Problems and Antimicrobial Delivering Systems?" 2008, *J Food Science*, vol. 73, p. R41-R47.

Banerjee, S., et al., "Review Article: Electrospray Ionization Mass Spectrometry: A Technique to Access the Information Beyond the Molecular Weight of the Analyte," International Journal of Analytical Chemistry, Nov. 2011, vol. 2012, Article ID 282574, 40 pages.

Bateman, A., et al., "The Effect of Solvent on the Analysis of Secondary Organic Aerosol Using Electrospray Ionization Mass Spectrometry," Environ. Sci. Technol., 2008, vol. 42, No. 19, pp. 7341-7346.

Ben-Yehoshua, S. et al. "Modified-atmosphere packaging of fruits and vegetables: reducing condensation of water in bell peppers and mangoes", 1998, *Acta Hort* (*ISHS*), vol. 464, p. 387-92.

Bewick, T., et al. "Evaluation of Epicuticular Wax Removal from Whole Leaves with Chloroform," Weed Technology, Jul.—SePages, 1993, vol. 7, No. 3, pp. 706-716.

Bourtoom, T., "Edible films and coatings: characteristics and properties", *International Food Research Journal*, 2008, vol. 15, No. 3, pp. 237-248.

Cantwell, M., "Properties and recommended conditions for long-term storage of fresh fruits and vegetables," Nov. 2001, 8 Pages.

Cech, N., et al., "Practical Implications of Some Recent Studies in Electrospray Ionization Fundamentals," Mass Spectrometry Reviews, 2001, vol. 20, pp. 362-387.

Chen, D-R., et al., "Electrospraying of Conducting Liquids for Monodisperse Aerosol Generation in the 4 nm to 1.8 .mu.m Diameter Range," J. Aerosol Sci., 1995, vol. 26, No. 6, pp. 963-977.

(56) References Cited

OTHER PUBLICATIONS

Cochran, H.D. “Salvation in supercritical water”, Fluid Phase Equilibria, 1992, vol. 71, pp. 1-16.
Deell Jr et al. “Addition of sorbitol with KMn04 improves broccoli quality retention in modified atmosphere packages”, 2006, *J Food Qua!*, vol. 29, p. 65-75.
Elgimabi and Ahmed, “Effects of Bactericides and Sucrose-Pulsing on Vase Life of Rose Cut Flowers (*Rosa hybirida*)”, 2009, *Botany Research International*, 2(3) pp. 164-168.
Enke, C., “A Predictive Model for Matrix and Analyte Effects in Electrospray Ionization of Singly-charged Ionic Analytes,” Analytical Chemistry, 1997, vol. 69, No. 23, pp. 4885-4893.
Extended European Search Report for European Patent Application No. EP 14831592.2, Mar. 2, 2017, 9 Pages.
First Office Action for Chinese Patent Application No. CN 201480050446.3, Jun. 4, 2018, 30 Pages.
Gabler, M., et al. “Impact of Postharvest Hot Water or Ethanol Treatment of Table Grapes on Gray Mold Incidence, Quality, and Ethanol Content,” Plant Disease, Mar. 2005, vol. 89, No. 3, pp. 309-316.
Gaskell, S., “Special Feature: Tutorial—Electrospray: Principles and Practice,” J. Mass Spectrom, 1997, vol. 32, pp. 677-688.
Gil, M. et al. “Fresh-cut product sanitation and wash water disinfection: Problems and solutions”, International Journal of Food Microbiology, 2009, vol. 134, pp. 37-45.
Graca, J. et al., “Glycerol and glyceryl esters of o-hydroxyacids in cutins,” Phytochemistry, 2002, vol. 61, pp. 205-215.
Graca, J. et al., “Linear and branched poly (omega-hydroxyacid) esters in plant cutins,” J. Agric. Food Chem., 2010, vol. 58, No. 17, pp. 9666-9674.
Hardenburg, R., et al., “The Commercial Storage of Fruits, Vegetables, and Florist and Nursery Stocks,” United States Department of Agriculture, Agriculture Handbook No. 66, Sep. 1986, pp. 6-7, 30, 50-51.
Hauff, S. et al. “Determination of hydroxylated fatty acids from the biopolymer of tomato cutin and their fate during incubation in soil, ” Phytochemical Analysis, Aug. 26, 2010, vol. 21, No. 6, pp. 582-589.
He et al. “Stem end blockage in cut *Grevillea* ‘Crimson Yul-lo’ inflorescences”, *Postharvest Biolo y and Technolozv*, 2006, vol. 41, pp. 78-84.
Hojjati et al. “Chemical Treatments of *Eustoma* Cut Flower Cultivars for Enhanced Vase Life”, 2007, *Journal of Azriculture and Social Sciences*, vol. 3, No. 3, DD. 75-78.
Holcroft, D., “Water Relations in Harvested Fresh Produce,” PEF White Paper No. 15-01, The Postharvest Education Foundation (PEF), May 2015, 16 Pages.
Huang, N., et al., “Automation of a Fourier Transform Ion Cyclotron Resonance Mass Spectrometer for Acquisition, Analysis, and E-mailing of High-resolution Exact-mass Electrospray Ionization Mass Spectral Data,” J. Am Soc Mass Spectrom, 1999, vol. 10, pp. 1166-1173.
Huang, T-Y., et al., “Electron Transfer Reagent Anion Formation via Electrospray Ionization and Collision-induced Dissociation,” Anal Chem., 2006, vol. 78, No. 21, pp. 7387-7391.
Hudson, B., “Fatty Acids,” Encyclopedia of Food Sciences and Nutrition (Second Edition), 2003, pp. 2297-2300.
Javad et al. “Effect of Cultivar on Water Relations and Postharvest Quality of Gerbera (*Gerbera jamesonii* Bolus ex. Hook f.) Cut Flower”, 2012, *World Applied Sciences Journal* vol. 18, No. 5, pp. 698-703.
Javad et al. “Postharvest evaluation of vase life, stem bending and screening of cultivars of cut gerbera (*Gerberajamesonii* Bolux ex. Hook f.) flowers”, *African Journal of Biotechnology* 2011, 10(4), pp. 560-566.
Jaworek, A., “Electrospray Droplet Sources for Thin Film Deposition,” J. Mater Sci, 2007, vol. 42, pp. 266-297.
Jenkins, S. et al., “Isolation and Compositional Analysis of Plant Cuticle Lipid Polyester Monomers,” Journal of Visualized Experiments, 105 e53386, 10 pages, URL: https://www.jove.com/video/53386.
Jerome, F., et al. ““One pot” and selective synthesis of monoglycerides over homogeneous and heterogeneous guanidine catalysts” Green Chem., 2004, vol. 6, pp. 72-74.
Jones et al. “Pulsing with Triton X-100 Improves Hydration and Vase Life of Cut Sunflowers (*Helianthus annuus* L.)”, 1993, *HortScience*, vol. 28, No. 12, pp. 1178-1179.
Karabulut, O. et al. “Postharvest ethanol and hot water treatments of table grapes to control gray mold”, Postharvest Biology and Technology, 2004, vol. 34, pp. 169-177.
Kebarle, P., “Special Feature: Commentary—A Brief Overview of the Present Status of the Mechanisms Involved in Electrospray Mass Spectrometry,” J. Mass Spectrom, 2000, vol. 35, pp. 804-817.
Keller, B., et al., “Review Article: Interferences and Contaminants Encountered in Modern Mass Spectrometry,” Analytica Chimica Acta, 2008, vol. 627, pp. 71-81.
Kolattukudy, P. E., “Biopolyester Membranes of Plants: Cutin and Suberin,” Science, 1980, vol. 208, No. 4447, pp. 990-1000.
Kolattukudy, P.E., “Cutin from plants,” Biopolymers Online, 3a, 2005, 40 pages.
Krammer, P., et al. “Hydrolysis of esters in subcritical and supercritical water”, Journal of Supercritical Fluids, 2000, vol. 16, pp. 189-206.
Kroll, B., et al., “Review: Chemistry of Secondary Organic Aerosol: Formation and Evolution of Low-volatility Organics in the Atmosphere,” Atmospheric Environment, 2008, vol. 42, pp. 3593-3624.
Li, M., et al., “Direct Quantification of Organic Acids in Aerosols by Desorption Electrospray Ionization Mass Spectrometry,” Atmospheric Environment, 2009, vol. 43, pp. 2717-2720.
Loppinet-Serani, A. et al. “Supercritical water for environmental technologies”, J Chem Technol Biotechnol, Jan. 12, 2010, vol. 85, pp. 583-589.
Matic, M., “The chemistry of Plant Cuticles: a study of cutin form *Agave americana* L.,” 1956, Biochemical Journal, 1956, vol. 63, No. 1, pp. 168-176.
Mattson and Volpenhein. Synthesis and properties of glycerides. *J Lipid Research*, (1962) 3(3) pp. 281-296.
Morton, H. “The Relationship of Concentration and Germicidal Efficiency of Ethyl Alcohol”, Annals New York Academy of Sciences, 53(1), 1950, pp. 191-196.
Nizkorodov, S., et al., “Molecular Chemistry of Organic Aerosols through the Application of High Resolution Mass Spectrometry,” Phys. Chem. Chem. Phys, 2011, vol. 13, pp. 3612-3629.
Notice of Reasons for Rejection for Japanese Patent Application No. JP 2016-531832, Jul. 3, 2018, 13 Pages.
Oh, D. et al. “Antimicrobial activity of ethanol, glycerol monolaurate or lactic acid against Listeria monocytogenes”, International Journal of Food Microbiology, 1993, vol. 20, pp. 239-246.
Olmez, H et al. “Potential alternative disinfection methods for organic fresh-cut industry for minimizing water consumption and environmental impact”, LWT—Food Science and Technology, 2009, vol. 42, pp. 686-693.
Osman, S. F., et al., “Preparation, Isolation, and Characterization of Cutin Monomers and oligomers from Tomato Peels,” J. Agric, Food Chem, 1999, vol. 47, No. 2, pp. 799-802.
PCT International Search Report and Written Opinion in PCT/US2014/048707, mailed Nov. 13, 2014, 12 pages.
PCT International Search Report and Written Opinion for PCT/US2016/051936, Jan. 31, 2017, 18 Pages.
PCT International Search Report and Written Opinion for PCT/US2016/065917, Mar. 9, 2017, 10 Pages.
PCT International Search Report and Written Opinion for PCT/US2017/014978, Apr. 10, 2017, 13 Pages.
PCT International Search Report and Written Opinion in PCT/US2017/024799, Jun. 8, 2017, 13 pages.
PCT International Search Report and Written Opinion in PCT/US2017/041167, Oct. 9, 2017, 20 pages.
PCT International Search Report and Written Opinion, PCT Application No. PCT/US16/33617, Aug. 26, 2016, 20 Pages.

(56) References Cited

OTHER PUBLICATIONS

PCT International Search Report and Written Opinion, PCT Application No. PCT/US17/62399, Feb. 16, 2018, 17 Pages.
Roy, et al. "Modified atmosphere and modified humidity packaging of fresh mushrooms" 1996, *J Food Sci.*, vol. 61, p. 391-7.
Rutala, W et al. "Guideline for Disinfection and Sterilization in Healthcare Facilities, 2008" CDC, 2008, 158 Pages.
Sasaki, M., et al. "Cellulose hydrolysis in subcritical and supercritical water", Journal of Supercritical Fluids, 1998, vol. 13, pp. 261-268.
Sasaki, M., et al. "Dissolution and Hydrolysis of Cellulose in Subcritical and Supercritical Water", Ind. Eng. Chem. Res., 2000, vol. 39, pp. 2883-2890.
Savage, P., "Organic Chemical Reactions in Supercritical Water", Chem. Rev., 1999, vol. 99, pp. 603-621.
Schreiber, L., "Transport barriers made of cutin, suberin and associated waxes", Trends in Plant Science, 2010, vol. 15, No. 10, pp. 546-553.
Schweizer, P., et al. "Perception of free cutin monomers by plant cells", The Plant Journal, 1996, vol. 10, No. 2, pp. 331-341.
Schweizer, P., et al. "Plant Protection by Free Cutin Monomers in Two Cereal Pathosystems", Advances in Molecular Genetics of Plant-Microbe Interactions, 1994, pp. 371-374.
Shirazi A, et al. "Controlling relative humidity in modified atmosphere packages of tomato fruit", 1992, HortScience, vol. 27, p. 336-9.
Steuter et al. "Water Potential of Aqueous Polyethylene Glycol", 1981, *Plant Physiol.*, vol. 67 pp. 64-67.
Takats, Z., et al., "Special Feature: Perspective—Ambient Mass Spectrometry Using Desorption Electrospray Ionization (DESI): Instrumentation, Mechanisms and Applications in Forensics, Chemistry, and Biology," J. Mass Spectrom, 2005, vol. 40, pp. 1261-1275.
Tanaka et al. Quantitative determination of isomeric glycerides, free fatty acids and triglycerides by thin layer chromatography-flame ionization detector system. *Lipids*, (1980) 15(10) pp. 872-875.
Tegelaar, E.W. et al., "Some mechanisms of flash pyrolysis of naturally occurring higher plant polyesters," Journal of Analytical and Applied Pyrolysis, 1989, vol. 15, 2 pages.
United States Office Action, U.S. Appl. No. 16/151,268, filed Dec. 14, 2018, 11 pages.
United States Office Action, U.S. Appl. No. 15/660,260, filed Feb. 21, 2019, 19 pages.
United States Office Action, U.S. Appl. No. 15/669,304, filed Jan. 10, 2018, 13 pages.
United States Office Action, U.S. Appl. No. 15/669,304, filed Jul. 24, 2018, seven pages.
Van Doorn et al. "Effects of surfactants on the longevity of dry-stored cut flowering stems of rose, *Bouvardia*, and *Astilbe*", 1993, *Postharvest Biology and Technology*, vol. 3, pp. 69-76.
Van Doorn, W.G., et al. "Alkylethoxylate surfactants for rehydration of roses and Bouvardia flowers", Postharvest Biology and Technology, 2002, vol. 24, pp. 327-333.
Van Meeteren, U., "Water Relations and Keeping-Quality of Cut Gerbera Flowers. I. The Cause of Stem Break", Scientia Horticulturae, 1978, vol. 8, pp. 65-74.
Wang, R., et al., "Evolution of the Solvent Polarity in an Electrospray Plume," J. Am Soc Mass Spectrom, 2010, vol. 21, pp. 378-385.
Weingartner, H., et al. "Supercritical water as a solvent", Angewandte Chemie, 2005, vol. 44, Issue 18, pp. 2672-2692.
Wikipedia, Anonymous "Paint-Wikipedia", Jul. 2013, 7 Pages. https://en.wikipedia.org/w/index.php?title=Paint&oldid=563291624.
Yeats, T., et al. "The identification of cutin synthase: formation of the plant polyester cutin," Nat Chem Biol. Jul. 2012, vol. 8, No. 7, pp. 609-611.
Zhu, J., et al., "Focus: Electrospray—Formation and Decompositions of Chloride Adduct Ions, [M + Cl], in Negative Ion Electrospray Ionization Mass Spectrometry," J. Am Soc Mass Spectrom, 2000, vol. 11, pp. 932-941.
Zhu, J., et al., "Ranking of a Gas-phase Acidities and Chloride Affinities of Monosaccharides and Linkage Specificity in Collision-induced Decompositions of Negative Ion Electrospray-generated Chloride Adducts of Oligosaccharides," J. Am Soc Mass Spectrom, 2001, vol. 12, pp. 1193-1204.
Al Vira, et al., "Pretreatment Technologies for an Efficient Bioethanol Production Process Based on Enzymatic Hydrolysis: A Review," Bio resource Technology, 2010, 101(13):4851-4861.
Baker et al., "Cutin Degradation by Plant Pathogenic Fungi," The American Phytopathological Society, May 15, 1978, 68:1577-1584.
Bateman, A., et al, "Supporting Information for Manuscript es-2008-01226w—The Effect of Solvent on the Analysis of Secondary Organic Aerosol Using Electrospray Ionization Mass Spectrometry," [online] 2008; available from the Internet URL: http://aerosol.chem.uci.edu/publications/Irvine/2008.sub.--Bateman.sub.---EST.sub.--SOA.sub.--solvent.sub.--effects.sub.--supporting.sub.--info.pdf, 6 pages.
Bell et al., "The activity of (S)-hydroprene space spray against three stored products pests in a simulated food production environment," Journal of Stored Products Research, Apr. 1999,35(2):117-126.
Dhall "Advances in edible coatings for fresh fruits and vegetables: a review", Crit. Rev. Food Sci. Nutr., 2013, 53(5), pp. 435-450.
Duoren et al., "Green Plasticizers," Scientific and Technological Literature Publishing House, the 1st Edition, Oct. 2011, 339-340, 7 pages (with English translation).
Graca, "Suberin: the biopolyester at the frontier of plants," Frontiers in Chemistry, Oct. 2015, 3(62):1-11 (2015).
Herrero et al., "Compressed fluids for the extraction of bioactive compounds," TrAC Trends in Analytical Chemistry, 2013, 43(1):67-83.
Hongyou, "Homemade Fruit and Vegetable Coating Preservative," Vegetables, Nov. 30, 2005, p. 39, 2 pages (with English translation).
Jensen et al., "Estimation of the Monoglyceride Content of Milk," Journal of Dairy Science, 1959, 42(2):232-239.
Jiabin, "Rubberized fabrics and products thereof," World Rubber Industry, Dec. 2000, 6:27-32, 24 pages (with English translation).
Jingmei et al., "Preparation of modified starch/polylactic acid bleeds," New Chemical Materials, Jun. 2011, 39(6):125-126 and 129 (with English abstract).
Khan et al., "Application of Edible Coating for Improving Meat Quality: A Review," Pakistan Journal of Food Sciences, 2013, 23(2):71-79.
Kubo et al., "Modes of antifungal action of alkanols against *Saccharomyces cerevisiae*," Bioorganic & Medicinal Chemistry, Mar. 2003, 11(6):1117-1122.
Kubo et al., "Structural functions of antimicrobial long-chain alcohols and phenols," Bioorganic & Medicinal Chemistry, Jul. 1995, 3(7):873-880.
Kulkarni et al., "Natural Polymers—A comprehensive review," International Journal of Research in Pharmaceutical and Biomedical Sciences, Dec. 2012, 3(4):1597-1613.
Martin, "Preparation of Saturated and Unsaturated Symmetrical Monoglycerides," Journal of American Chemical Society, Jun. 1953, 75(20):5482-5483.
Meihu et al., "Research on Coating of Preserved Egg for Quality-keeping and Fresh-keeping," Wan Fang, Aug. 2007, 17 pages (with English translation).
Mukherjee et al., "Antibacterial activity of long-chain fatty alcohols against mycobacteria," FEMS Microbiol. Lett., Jan. 2013, 338(2):177-183.
Nemoto et al., "Polyols of a cascade type as a water-solubilizing element of carborane derivatives for boron neutron capture therapy," The Journal of Organic Chemistry, Jan. 1992, 57(2):435.
Orts et al., "Edible Films and Coatings: Why, What, and How?," Edible Films and Coatings for Food Applications, 2009, Chapter 1:1-23.
PCT International Preliminary Report on Patentability in International Appln. No. PCT/US2016/051936, mailed Mar. 29, 2018, 12 pages.
PCT International Search Report and Written Opinion in International Appln. No. PCT/US2019/042693, dated Oct. 2, 2019, 8 pages.

(56) References Cited

OTHER PUBLICATIONS

PCT International Search Report and Written Opinion in International Appln. No. PCT/US2019/045784, mailed Oct. 22, 2019, 14 pages.
PCT International Search Report and Written Opinion in International Appln. No. PCT/US2019/049585, mailed Jan. 13, 2020, 14 pages.
PCT International Search Report and Written Opinion in International Appln. No. PCT/US2020/036174, dated Sep. 7, 2020, 32 pages.
PCT International Search Report and Written Opinion in PCT/US18/46998, Dec. 27, 2018, 31 pages.
PCT International Search Report and Written Opinion, PCT Application No. PCT/US2018/46994, Dec. 20, 2018, 28 pages.
Perkins et al., "Ultrasonic fog application of organic acids delays postharvest decay in red bayberry," Postharvest Biology and Technology, Nov. 2017, 13:41-47.
Rujun et al., "Surface Modification and Physical properties of Inorganic Nanomaterials," University of Technology Press, 1st Edition, Oct. 2009, 43-45, 11 pages (with English translation).
Technical Evaluation Report, "Glycerides (mono and di) Handling/Processing," Compiled by OMRI for the USDA National Organic Program, Jan. 27, 2015, 1-14.
The Fountainhead Group, Inc., "Burgess Electric Professional Fogger," Manual No. 161128, Revision D, Feb. 25, 2015, retrieved on Jan. 12, 2021, retrieved from URL <https://www.jondon.com/media/pdf/manuals/FG-EGF-EA_manual.pdf>, 8 pages.
TW Search Report in Taiwan Appln. No. 105130215, dated Aug. 6, 2020, 12 pages (with English translation).
Vardar et al., "The application of various disinfectants by fogging for decreasing postharvest diseases of strawberry," Postharvest Biology and Technology, Apr. 2012, 66:30-34.
Xizhong et al., "Spray drying," the 2nd edition, Chemical Industry Press, Feb. 28, 2003, 147-151, 9 pages.
Yang et al., "Progress on Graft Polymerization of Cellulose," Journal of Cellulose Science and Technology, Sep. 2009, 17(3), 6 pages (with English abstract).
Lin et al., "Innovations in the Development and Application of Edible Coatings for Fresh and Minimally Processed Fruits and Vegetables," Compr. Rev. Food Sci. Food Saf., Jun. 2007, 6(3):60-75.
PCT International Preliminary Report on Patentability in International Appln. No. PCT/US2019/049585, mailed Mar. 18, 2021, 10 pages.
Siekmann et al., "Preparation and structural investigations of colloidal dispersions prepared from cubic monoglyceride-water phases," Int. J. Pharm., Sep. 2002, 244(1-2):33-43.
Spicer et al., "Novel Process for Producing Cubic Liquid Crystalline Nanoparticles (Cubosomes)," Langmuir, Aug. 2001, 17(19):5748-5756.
Extended European Search Report in European Patent Appln. No. EP 19857630.8, dated May 20, 2022, 9 pages.
Adkins et al., "Manipulating Avocado Fruit Ripening with 1-Methylcyclopropene," Postharvest Biol. Technol., Jan. 2005, 35(1):33-42.
Baldwin et al., "Edible Coatings for Lightly Processed Fruits and Vegetables," HortScience, Feb. 1995, 30(1):35-38.
Dao et al., "Control of Food Spoilage Fungi by Ethanol," Food Control, Mar. 2011, 22(3-4):360-368.
International Search Report and Written Opinion in International Appln. No. PCT/US2021/057448, mailed Feb. 18, 2022, 17 pages.
Kumitasu.com [online], "About fruit wax and chenpi," Jul. 26, 2015, retrieved on Aug. 16, 2021, retrieved from URL https://web.archive.org/web/20160409110129/https://www.kumitasu.com/contents/hyoji/806>, 5 pages (with machine translation).
PCT International Preliminary Report on Patentability in International Appln. No. PCT/US2020/036174, mailed Dec. 16, 2021, 9 pages.
PCT International Search Report and Written Opinion in International Appln. No. PCT/US2021/020692, mailed Jun. 1, 2021, 13 pages.
PCT International Search Report and Written Opinion in International Appln. No. PCT/US2021/044535, mailed Nov. 17, 2021, 16 pages.
PCT International Search Report and Written Opinion in International Appln. No. PCT/US2021/048301, mailed Dec. 7, 2021, 12 pages.
postharvest.ucdavis.edu [online], "Fact Sheets," available on or before Aug. 9, 2016, via Internet Archive: Wayback Machine URL <https://web.archive.org/web/20160809075048/http://postharvest.ucdavis.edu/Commodity_Resources/Fact_Sheets/>, retrieved on Aug. 16, 2021, URL <http://postharvest.ucdavis.edu/Commodity_Resources/Fact_Sheets/>, 3 pages.
Quiros-Sauceda et al., "Edible coatings as encapsulating matrices for bioactive compounds: a review," Journal of Food Science and Technology, Jan. 2014, 51(9), pp. 1674-1685, 12 pages.
United States Environmental Protection Agency, "Containers and Packaging: Product-Specific Data," Nov. 6, 2019, last updated Jan. 28, 2021, retrieved on Oct. 6, 2021, retrieved from URL <https://www.epa.gov/facts-and-figures-about-materials-waste-and-recycling/containers-and-packaging-product-specific-data>, 12 pages.
Vargas et al., "Development of Edible Coatings for Fresh Fruits and Vegetables: Possibilities and Limitations," Fresh Produce, Jan. 2008, 2(2):32-40.
Watkins, "The Use of 1-Methylcyclopropene (1-MCP) on Fruits and Vegetables, " Biotech. Adv., Jul.-Aug. 2006, 24 (4):389-409.
Dinani et al., "Optimization of Carboxymethyl Cellulose and Calcium Chloride Dip-Coating on Mushroom Slices Prior to Hot Air Drying Using Response Surface Methodology," Journal of Food Processing and Prevention, Jun. 2014, 38 (3):1269-1278.
Rahman et al., "The Effect of a New Coating on the Drying Performance of Fruit and Vegetables Products: Experimental Investigation and Artificial Neural Network Modeling," Foods, Mar. 2020, 9(3), 308, 1-13.

* cited by examiner

COMPOUNDS AND FORMULATIONS FOR PROTECTIVE COATINGS

STATEMENT OF RELATED APPLICATIONS

This application claims the benefit of U.S. Provisional Application 62/727,501, filed Sep. 5, 2018, and incorporated herein for all purposes.

FIELD OF THE DISCLOSURE

The present disclosure relates to compounds and formulations for forming protective coatings and methods of making and using thereof.

BACKGROUND

Common agricultural products are susceptible to degradation and decomposition (i.e., spoilage) when exposed to the environment. Such agricultural products can include, for example, eggs, fruits, vegetables, produce, seeds, nuts, flowers, and/or whole plants (including their processed and semi-processed forms). Edible non-agricultural products (e.g., vitamins, candy, etc.) can also be vulnerable to degradation when exposed to the ambient environment. The degradation of agricultural and other edible products can occur via abiotic means as a result of evaporative moisture loss from an external surface of the products to the atmosphere, oxidation by oxygen that diffuses into the products from the environment, mechanical damage to the surface, and/or light-induced degradation (i.e., photodegradation). Biotic stressors such as bacteria, fungi, viruses, and/or pests can also infest and decompose the products.

The cells that form the aerial surface of most plants (such as higher plants) include an outer envelope or cuticle, which provides varying degrees of protection against water loss, oxidation, mechanical damage, photodegradation, and/or biotic stressors, depending upon the plant species and the plant organ (e.g., fruit, seeds, bark, flowers, leaves, stems, etc.). Cutin, which is a biopolyester derived from cellular lipids, forms the major structural component of the cuticle and serves to provide protection to the plant against environmental stressors (both abiotic and biotic). The thickness, density, as well as the composition of the cutin (i.e., the different types of monomers that form the cutin and their relative proportions) can vary by plant species, by plant organ within the same or different plant species, and by stage of plant maturity. The cutin-containing portion of the plant can also contain additional compounds (e.g., epicuticular waxes, phenolics, antioxidants, colored compounds, proteins, polysaccharides, etc.). This variation in the cutin composition as well as the thickness and density of the cutin layer between plant species, plant organs and/or a given plant at different stages of maturation can lead to varying degrees of resistance between plant species or plant organs to attack by environmental stressors (i.e., water loss, oxidation, mechanical injury, and light) and/or biotic stressors (e.g., fungi, bacteria, viruses, insects, etc.).

Conventional approaches to preventing degradation, maintaining quality, and increasing the life of agricultural products include refrigeration and/or special packaging. Refrigeration requires capital-intensive equipment, demands constant energy expenditure, can cause damage or quality loss to the product if not carefully controlled, must be actively managed, and its benefits are lost upon interruption of a temperature-controlled supply chain. Special packaging can also require expensive equipment, consume packaging material, increase transportation costs, and require active management. Despite the benefits that can be afforded by refrigeration and special packaging, the handling and transportation of the agricultural products can cause surface abrasion or bruising that is aesthetically displeasing to the consumer and serves as points of ingress for bacteria and fungi. Moreover, the expenses associated with such approaches can add to the cost of the agricultural product.

There exists a need for new, more cost-effective approaches to prevent degradation, maintain quality, and increase the life of agricultural products. Such approaches may require less or no refrigeration, special packaging, etc.

SUMMARY

Compositions and formulations for forming protective coatings and methods of making and using thereof are described herein. The compositions can include a first group of compounds, where each compound of the first group is selected from fatty acids, fatty acid esters, and fatty acid salts, and each compound of the first group has a carbon chain length of at least 14 carbons. The compositions can also include a second group of compounds selected from fatty acids, fatty acid esters, fatty acid salts, and combinations thereof, wherein each compound of the second group has a carbon chain length from 7 to 13 carbons. At least some of the compounds of the first group (e.g., fatty acid salts) can function as emulsifiers, allowing the composition to be dissolved, suspended, or dispersed in a solvent. At least some of the compounds of the second group can function as wetting agents or surfactants in order to improve the surface wetting of items to be coated when solutions, suspensions, or colloids that include the compositions are applied to the items. The fatty acid salts having a carbon chain length of less than 14 (e.g., from 7 to 13 carbons) can also (or alternatively) function as emulsifiers, allowing the composition to be dissolved, suspended, or dispersed in a solvent.

Accordingly, in a first aspect, a composition can include from about 50% to about 99.9% by mass of one or more first compounds selected from the group consisting of fatty acids, fatty acid esters, fatty acid salts, and combinations thereof, wherein each of the one or more first compounds has a carbon chain length of at least 14. The composition can further include from about 0.1% to about 35% by mass of one or more second compounds selected from the group consisting of fatty acids, fatty acid esters, fatty acid salts, and combinations thereof, wherein each of the one or more second compounds has a carbon chain length in a range of 7 to 13.

In a second aspect, a composition can include from about 50% to about 99.8% by mass of one or more first compounds selected from the group consisting of fatty acids, fatty acid esters, and combinations thereof, wherein each compound of the first group has a carbon chain length of at least 14. The composition can further include from about 0.1% to about 35% by mass of one or more wetting agents. The composition can further include from about 0.1% to about 25% by mass of one or more fatty acid salts, wherein each fatty acid salt has a carbon chain length of at least 14.

In a third aspect, a composition can include from about 50% to about 99.8% by mass of a first group of compounds, wherein each compound of the first group is a compound of Formula I having a carbon chain length of at least 14, and where Formula I is as defined throughout. The composition can further include from about 0.1% to about 35% by mass of a second group of compounds, wherein each compound of the second group is a compound of Formula I having a carbon chain in a range of 7 to 13. The composition can further include from about 0.1% to about 25% by mass of a third group of compounds, wherein each compound of the third group is a salt comprising a compound of Formula II. For the first and second groups of compounds, R can be selected from —H, -glyceryl, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl or heteroaryl is optionally substituted with one or more groups selected from halogen, hydroxyl, nitro, —CN, —$NH_2$, —SH, —$SR^{15}$, —$OR^{14}$, —$NR^{14}R^{15}$, —$C_1$-$C_6$ alkyl, —$C_2$-$C_6$ alkenyl, or —$C_2$-$C_6$ alkynyl. For the third group of compounds, X can be a cationic moiety.

In a fourth aspect, a composition can include from about 50% to about 99% by mass of one or more fatty acid esters having carbon chain length of at least 14, and from about 1% to about 50% by mass of one or more fatty acid salts having a carbon chain length of at least 14.

In a fifth aspect, a composition can include (i) from 50% to 99% by mass of a first group of compounds, wherein each compound of the first group is a compound of Formula I, and (ii) from 1% to 50% by mass of a second group of compounds, wherein each compound of the second group is a salt of Formula II or Formula III, where Formulas I, II, and III are as defined throughout.

In a sixth aspect, a mixture (e.g., a solution, suspension, or colloid) can include a composition in a solvent, wherein the composition comprises (i) from 50% to 99% by mass of a first group of compounds, wherein each compound of the first group is a compound of Formula I, and (ii) from 1% to 50% by mass of a second group of compounds, wherein each compound of the second group is a salt of Formula II or Formula III, where Formulas I, II, and III are as defined throughout.

Any of the compositions or mixtures described herein can include one or more of the following features, either alone or in combination. The second compounds or wetting agents can have a carbon chain length of 8, 10, 11, or 12. Any of the compounds of the composition can be compounds of Formula I. The cationic moiety can be an organic or an inorganic ion. The cationic moiety can include sodium. Each of the one or more second compounds can be a wetting agent. The one or more first compounds can include monoacylglycerides and/or fatty acid salts. The fatty acid esters can include monacylglycerides. A mass ratio of the fatty acid esters (e.g., monoacylglycerides) to the fatty acid salts can be in a range of about 2 to 100 or about 2 to 99. Accordingly, a mass ratio of the first group of compounds to the second group of compounds can be in a range of 2 to 99 or 2 to 100. The composition can comprise less than 10% by mass of diglycerides. The composition can comprise less than 10% by mass of triglycerides. Each compound of the first and/or second group of compounds can have a carbon chain length of at least 14. In Formula I, R can -glyceryl. The second group of compounds can comprise SA-Na, PA-Na, MA-Na, SA-K, PA-K, or MA-K. The composition can comprise from 70% to 99% by mass of the first group of compounds and from 1% to 30% by mass of the second group of compounds. The solvent can be water, or can be at least 50% or at least 70% water by volume. A concentration of the composition in the mixture can be in a range of 0.5 to 200 mg/mL The first group of compounds can comprise one or more compounds selected from the group consisting of:

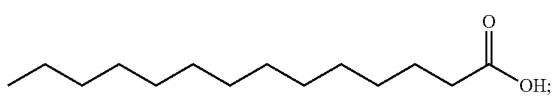

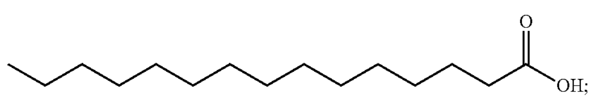

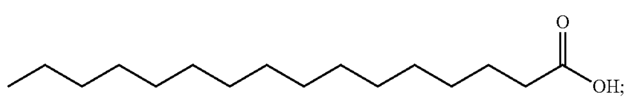

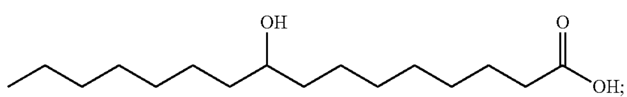

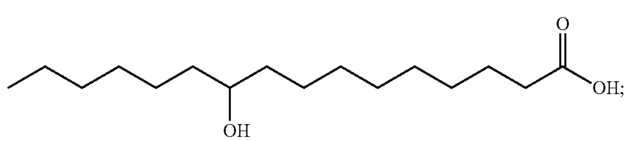

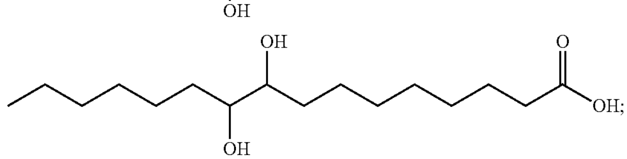

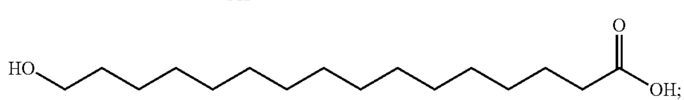

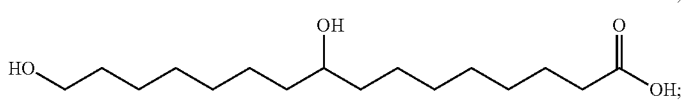

-continued
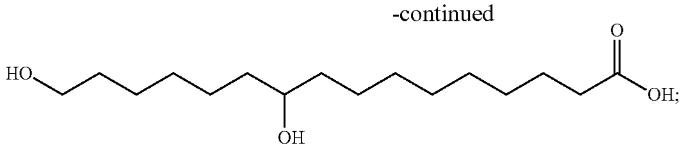
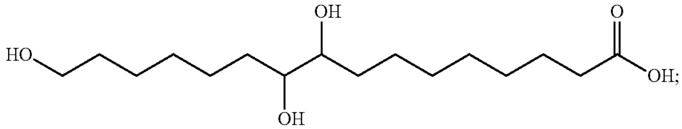
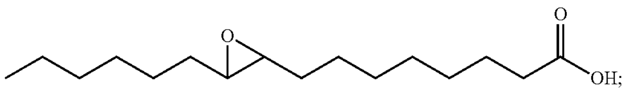
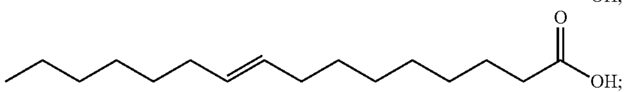
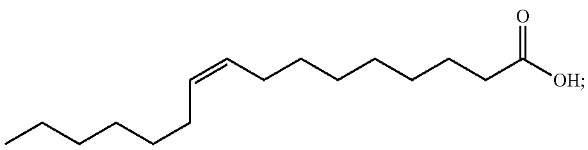
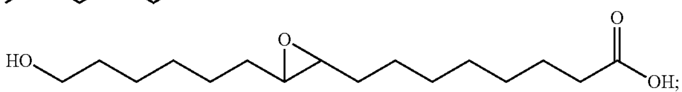
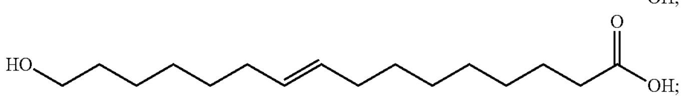
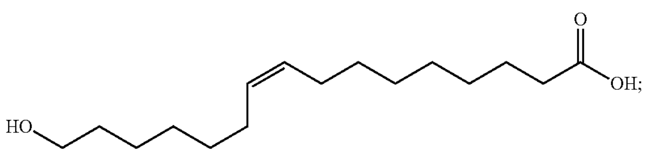
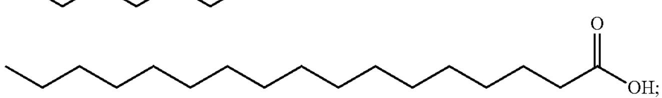
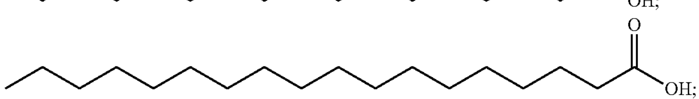
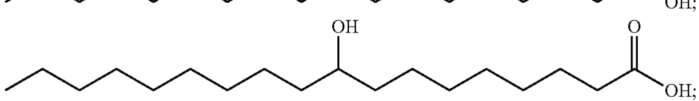
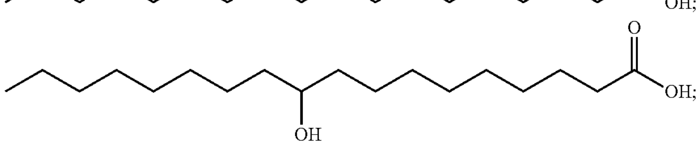
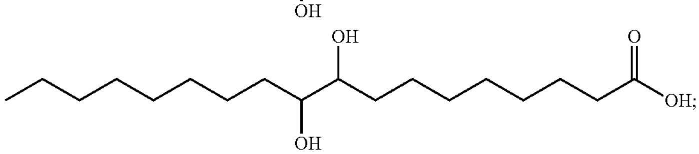
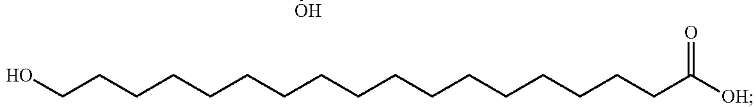
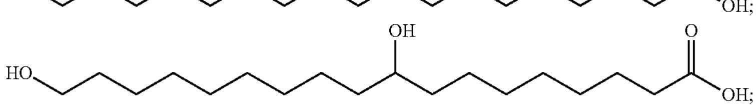
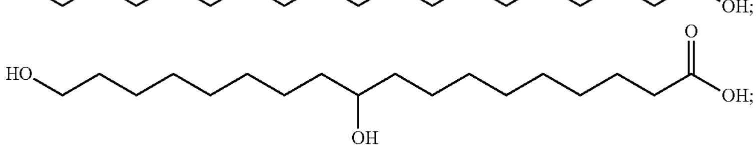

-continued
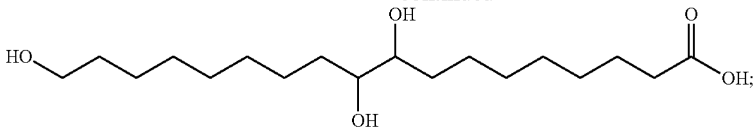
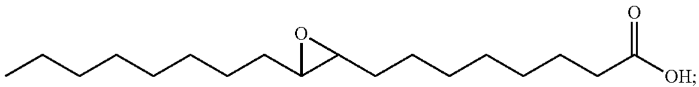
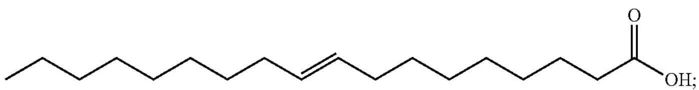
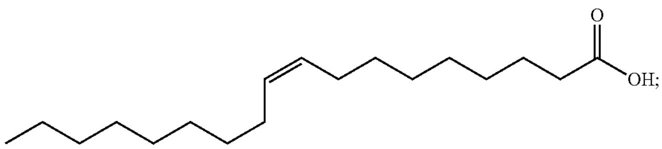
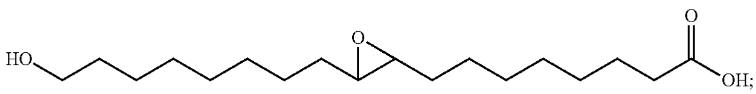
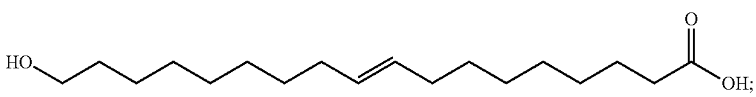
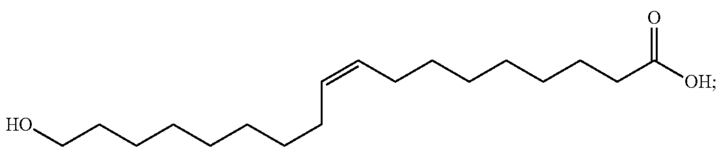
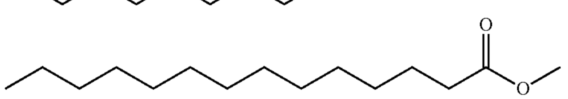
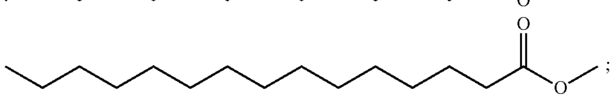
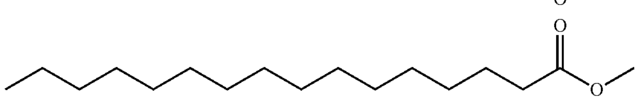
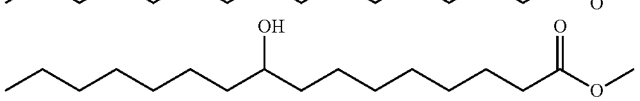
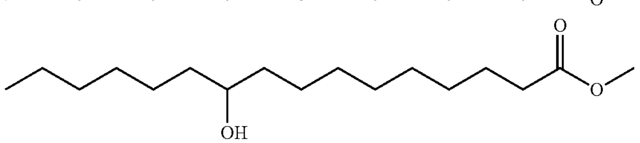
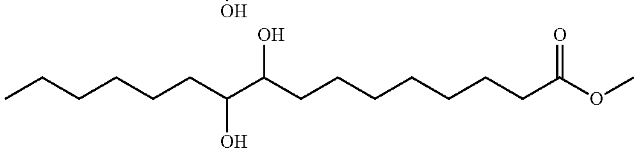
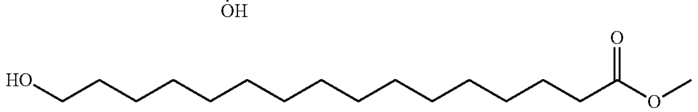
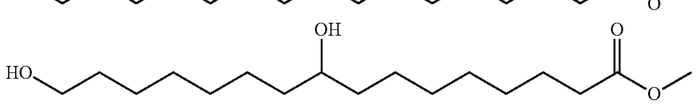
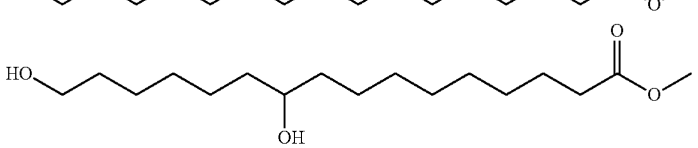

-continued
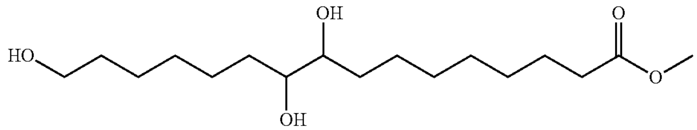
;
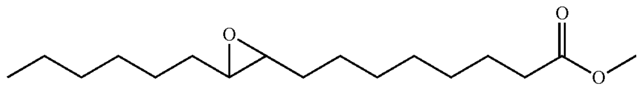
;
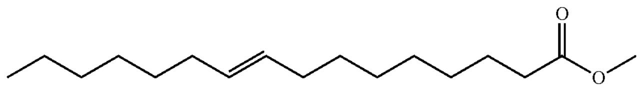
;
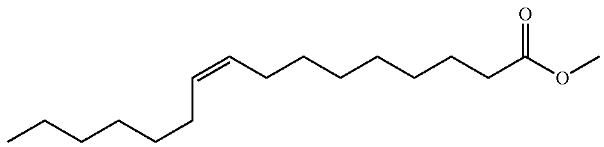
;
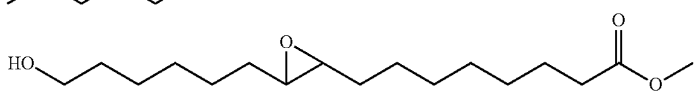
;
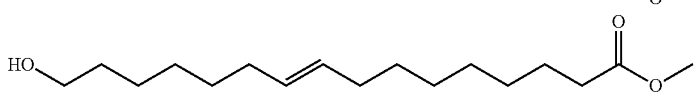
;
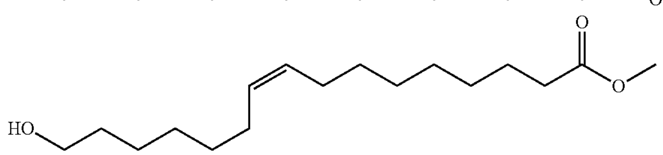
;
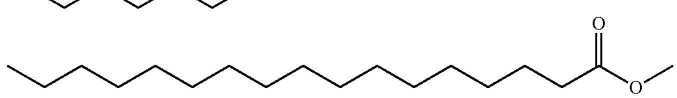
;
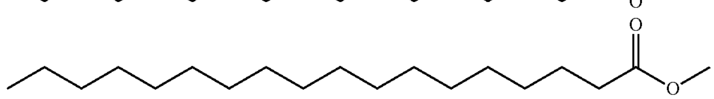
;
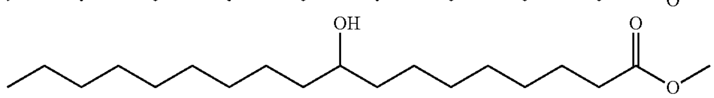
;
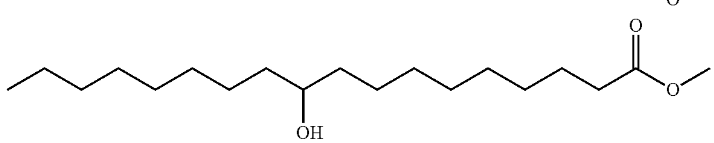
;
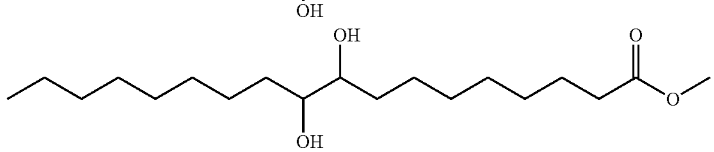
;
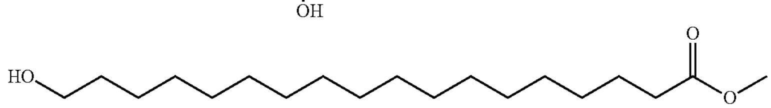
;
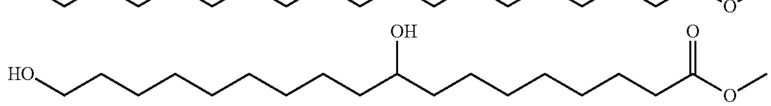
;
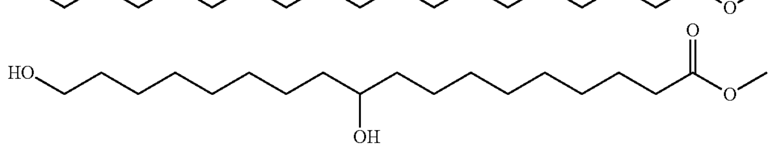
;
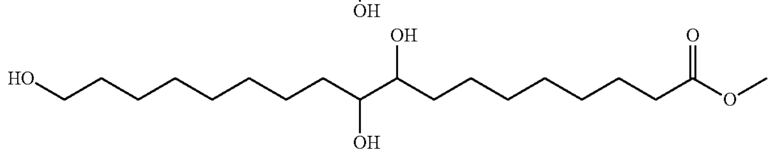
;

-continued
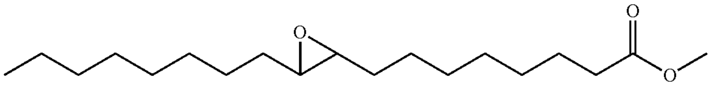
;
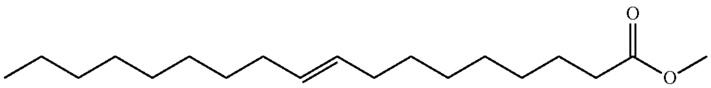
;
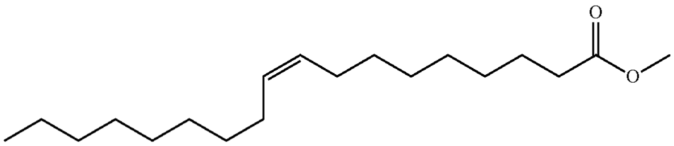
;
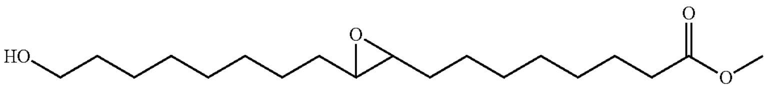
;
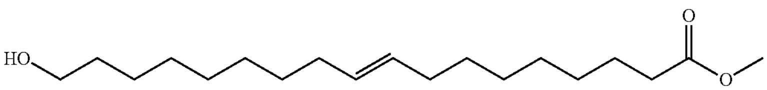
;
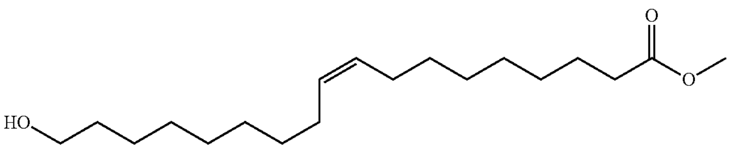
;
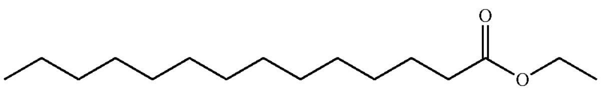
;
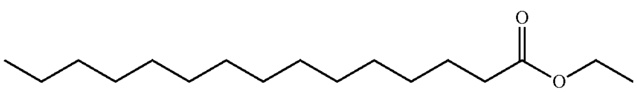
;
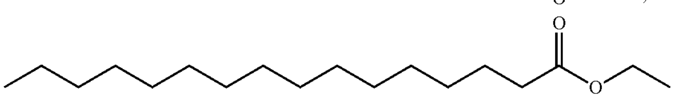
;
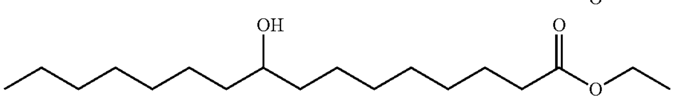
;
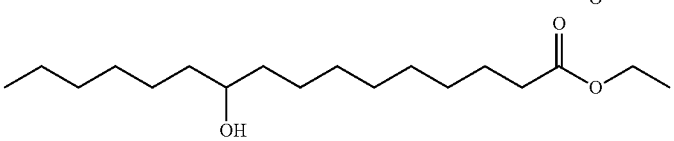
;
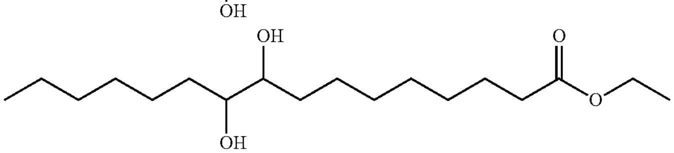
;
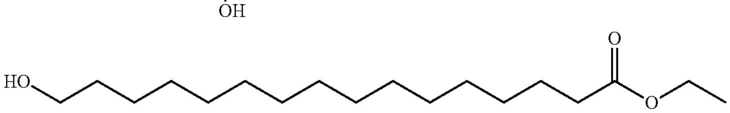
;
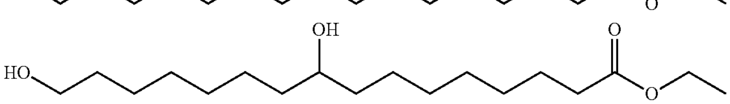
;
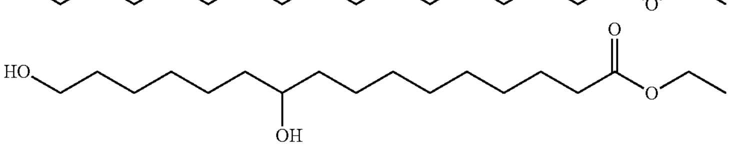
;
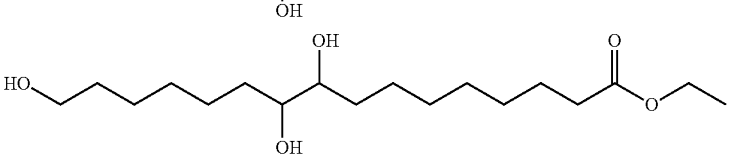
;

-continued
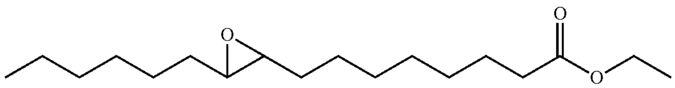
;
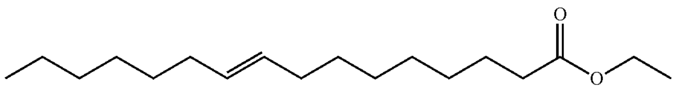
;
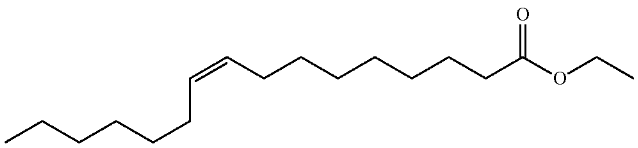
;
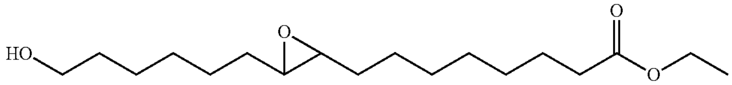
;
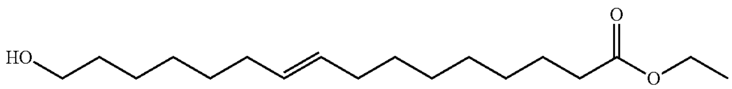
;
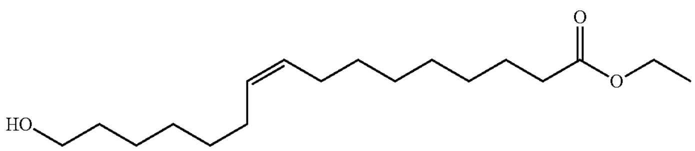
;
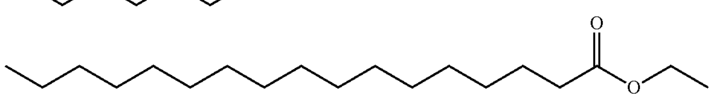
;
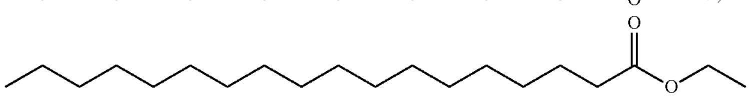
;
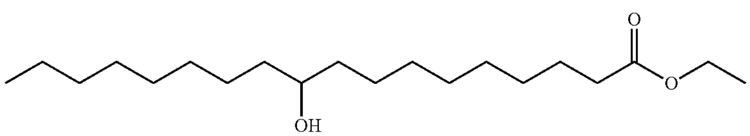
;
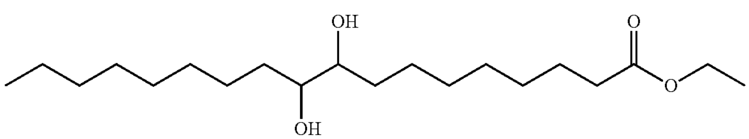
;
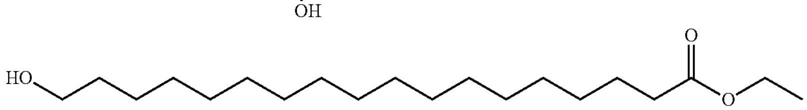
;
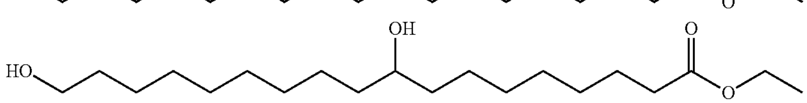
;
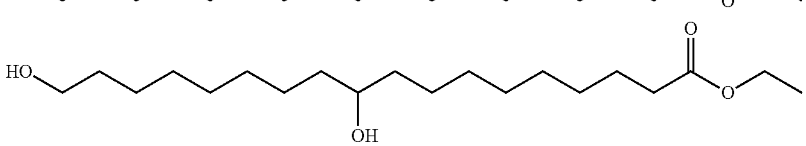
;
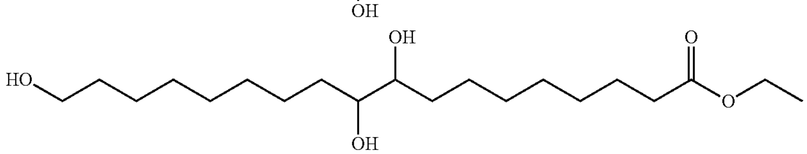
;
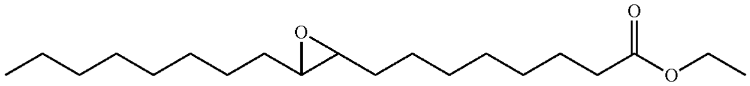
;
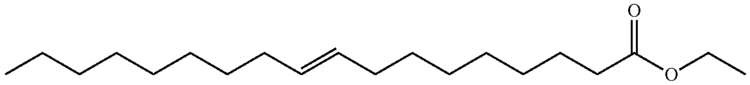
;

-continued
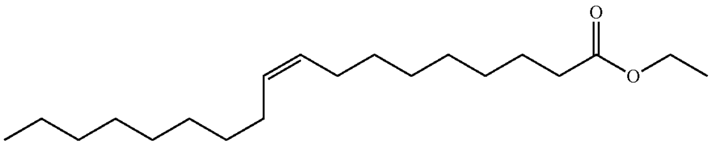
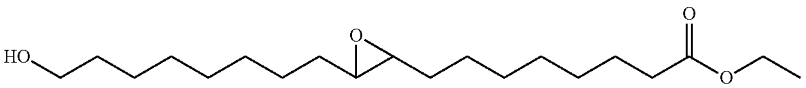
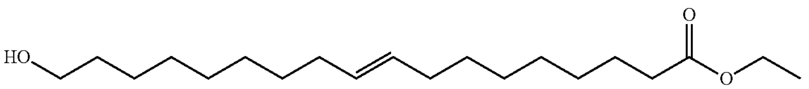
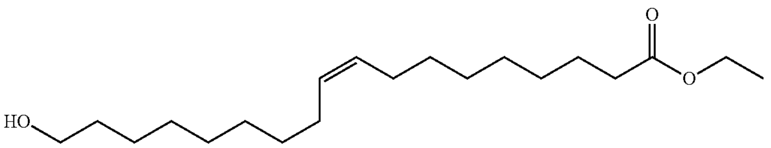
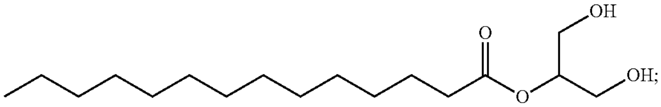
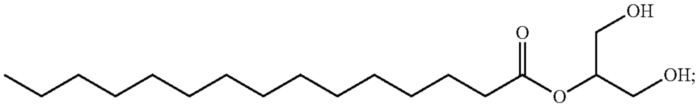
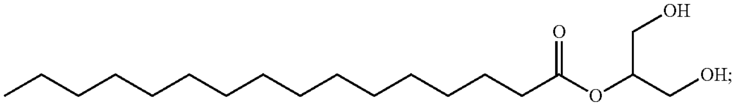
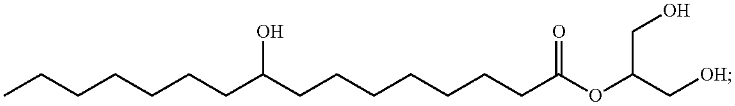
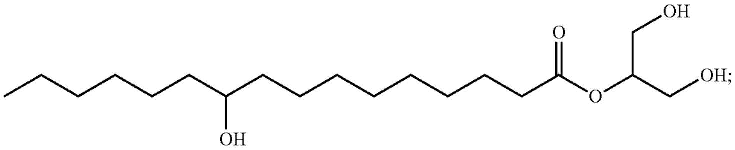
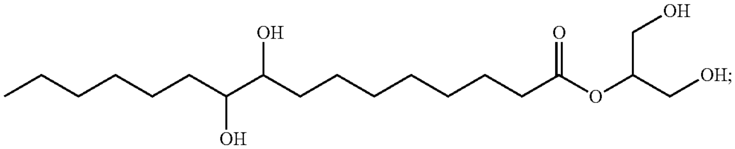
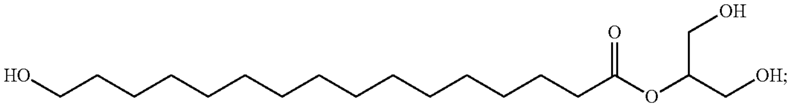
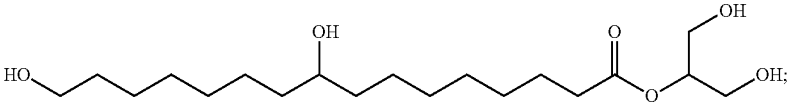
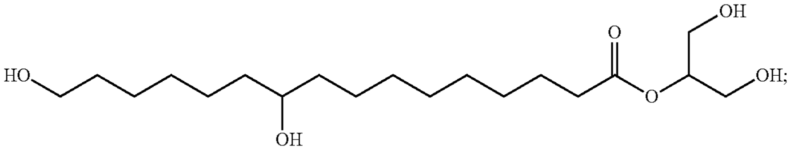
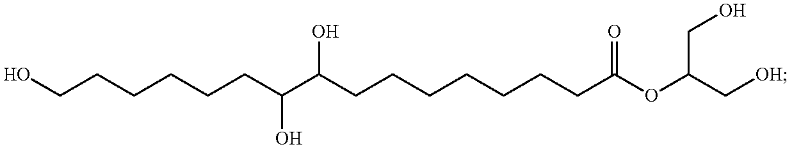

-continued
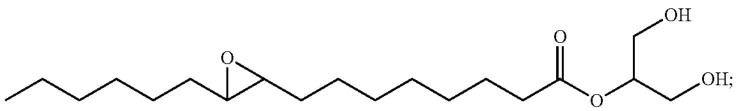
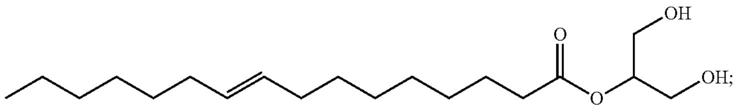
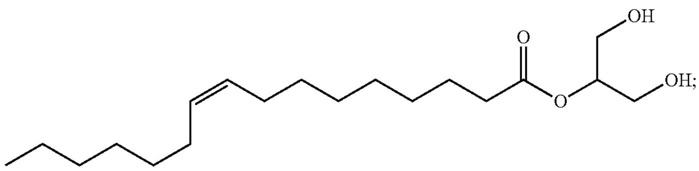
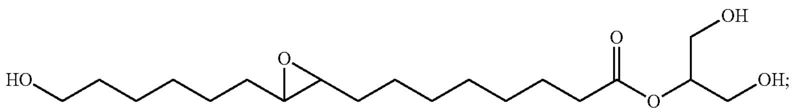
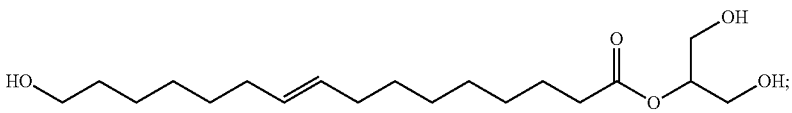
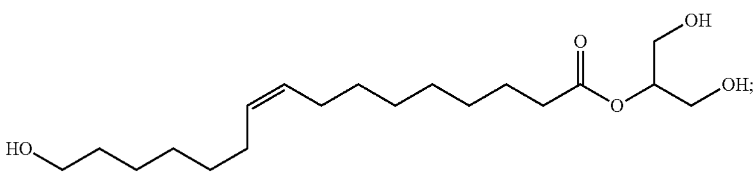
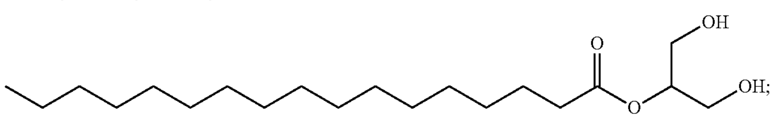
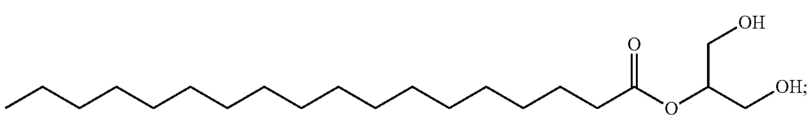
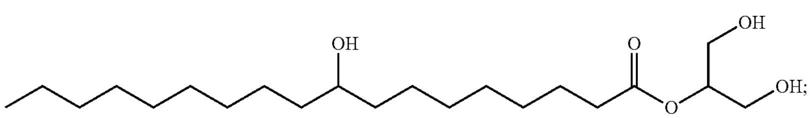
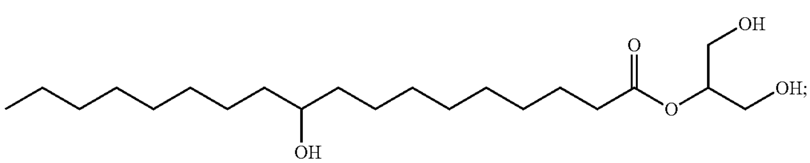
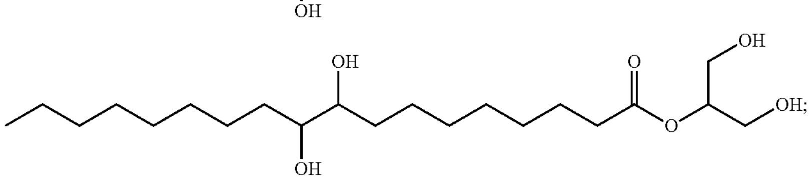
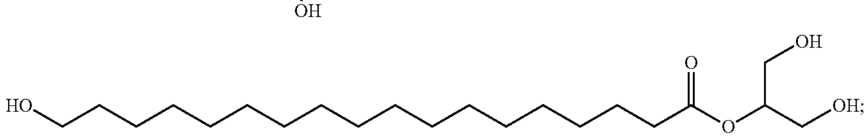
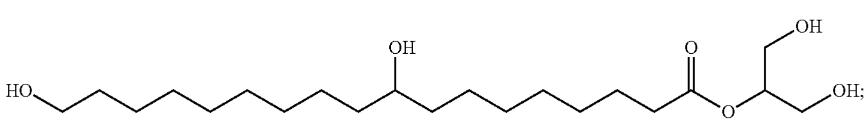

-continued
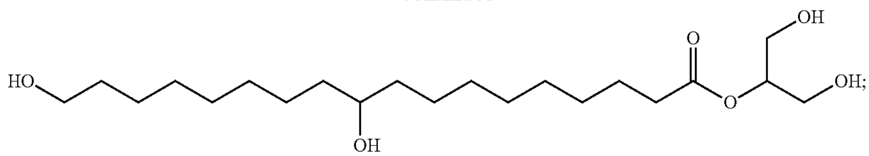
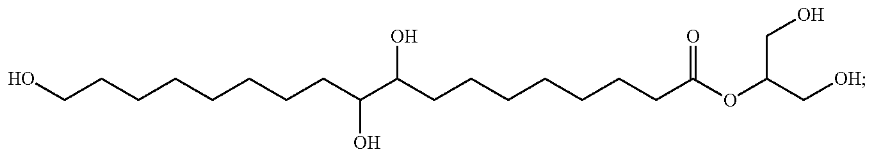
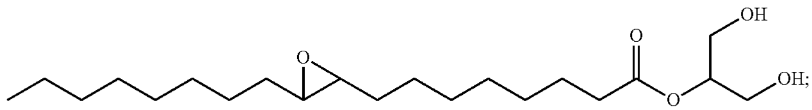
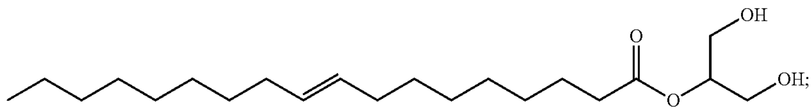
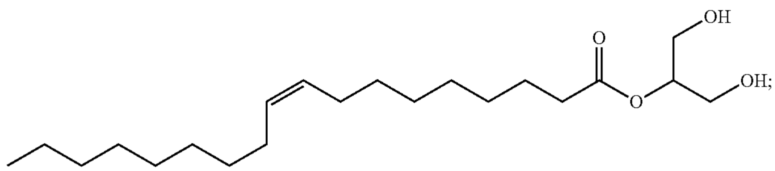
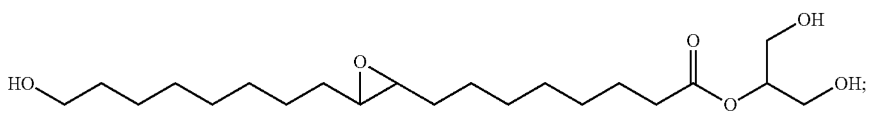
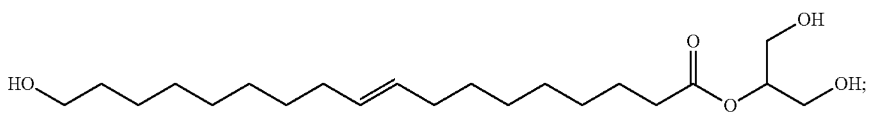
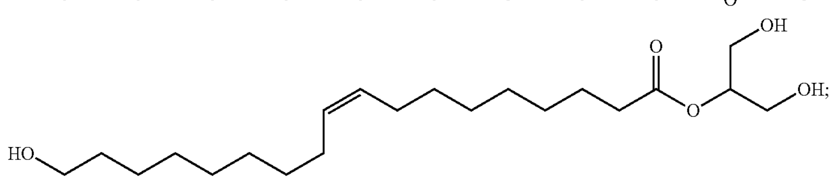
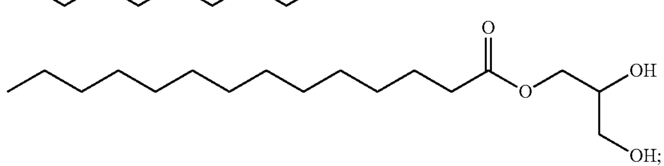
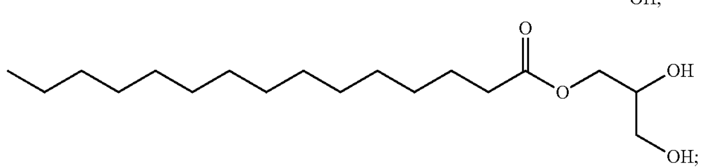
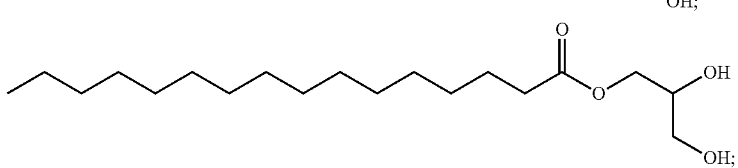
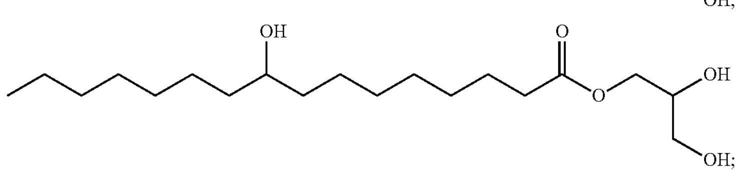

-continued
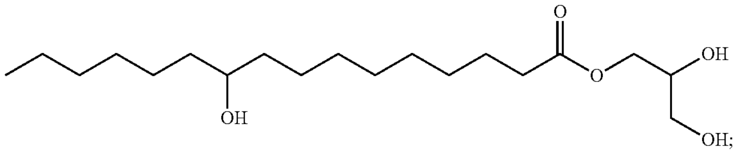
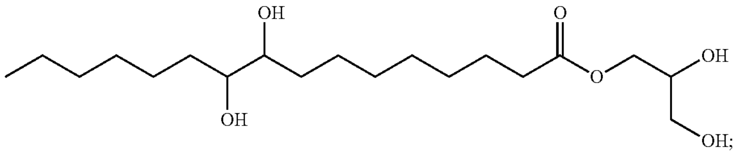
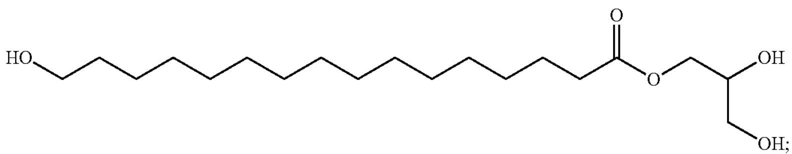
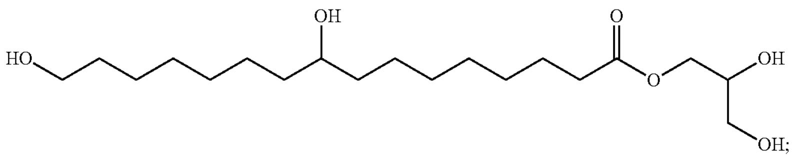
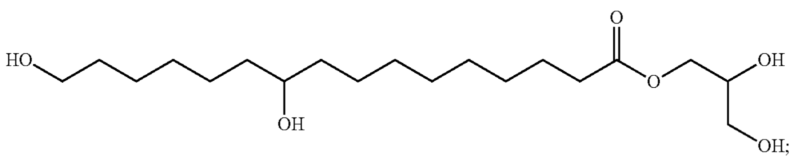
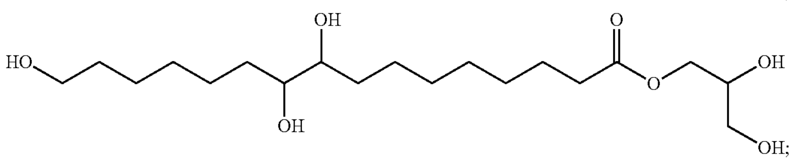
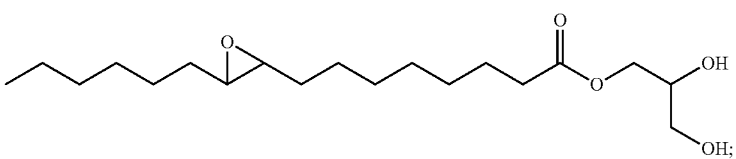
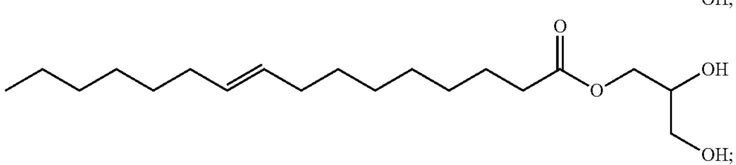
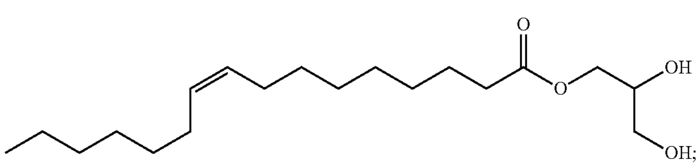
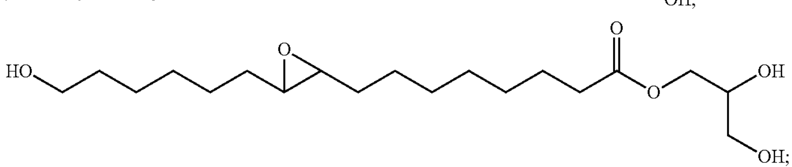
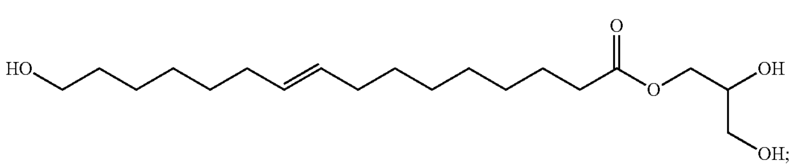

-continued
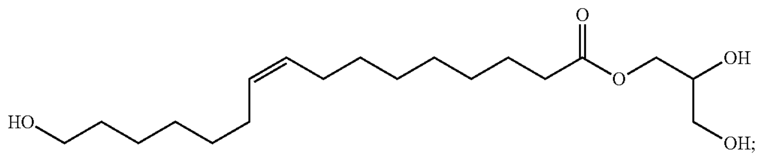
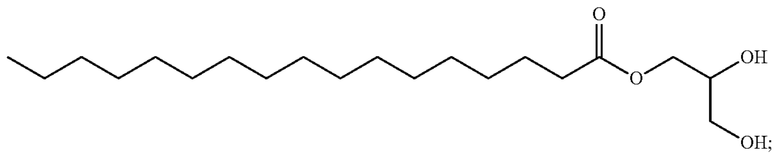
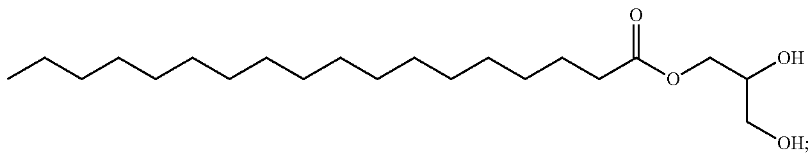
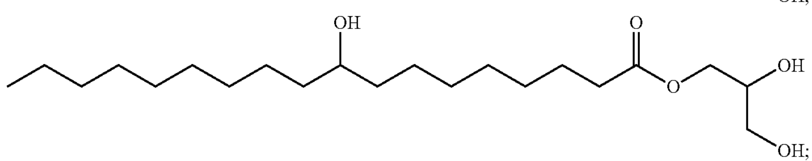
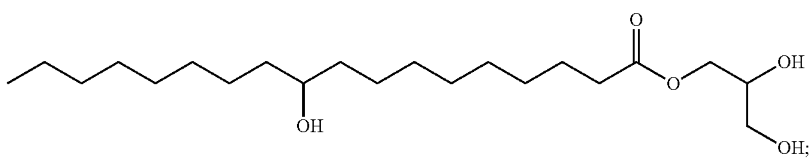
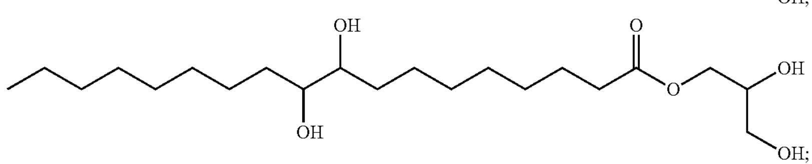
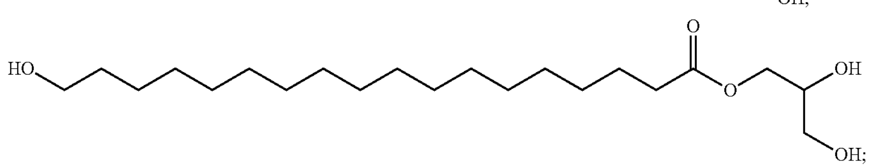
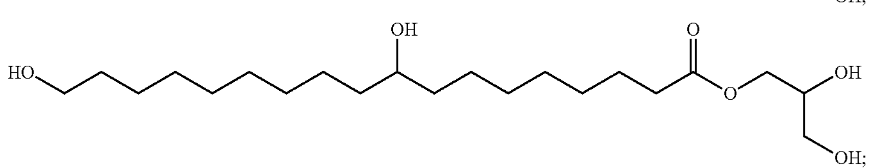
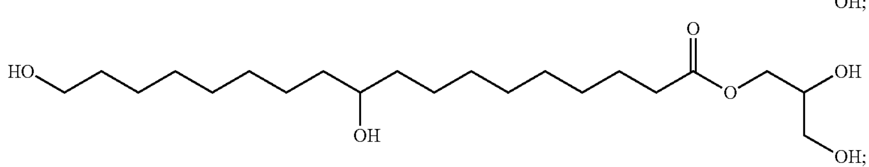
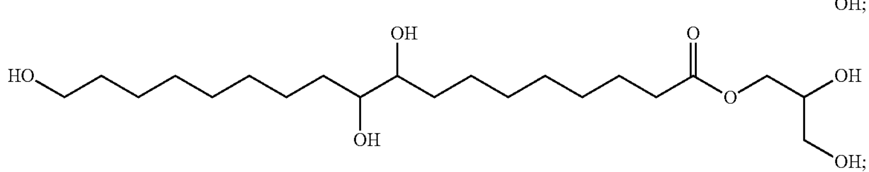
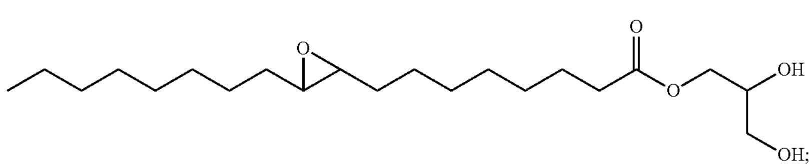

-continued
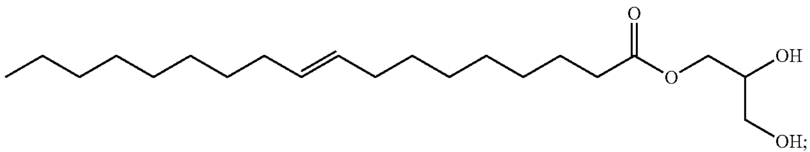
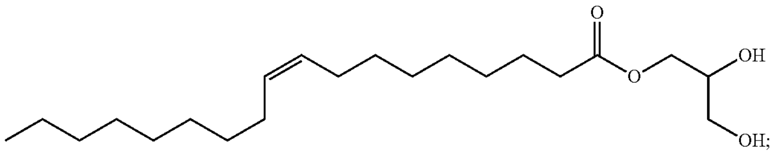
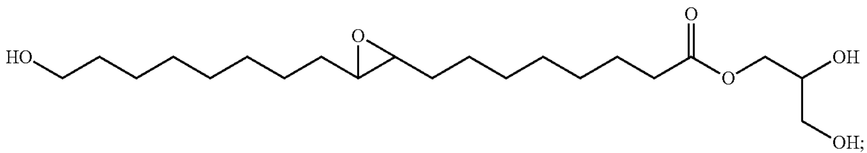
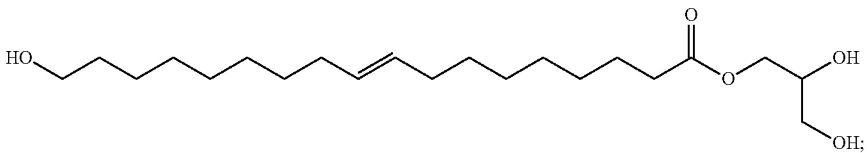
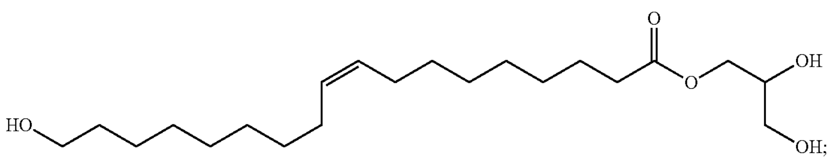
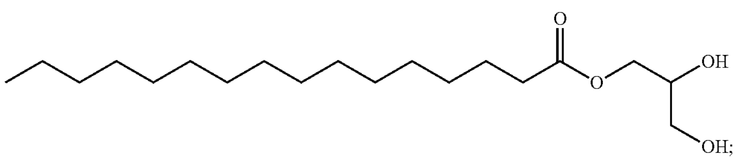
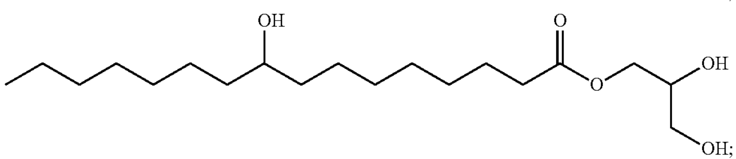
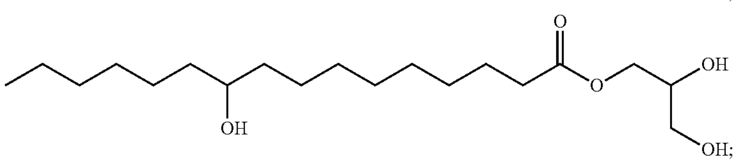
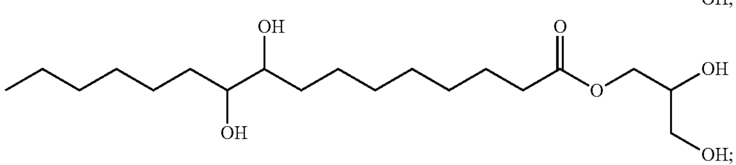
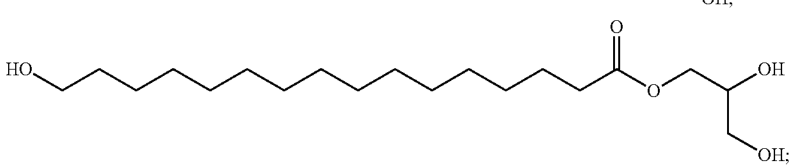
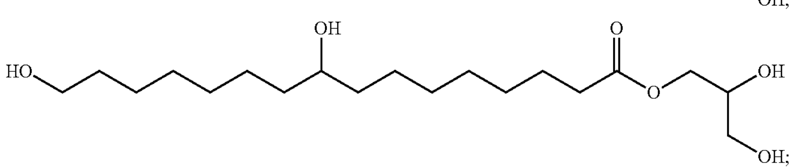

-continued

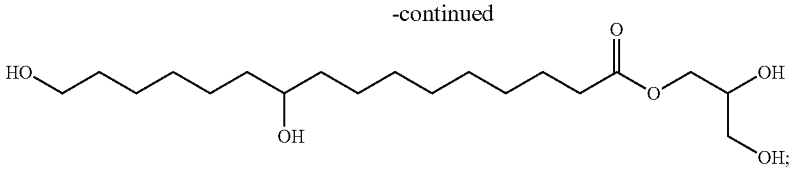

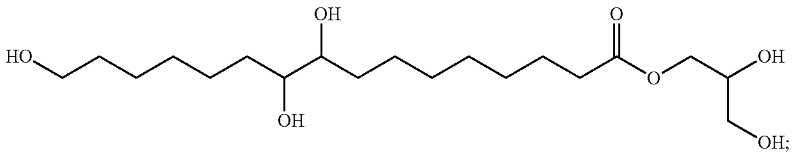

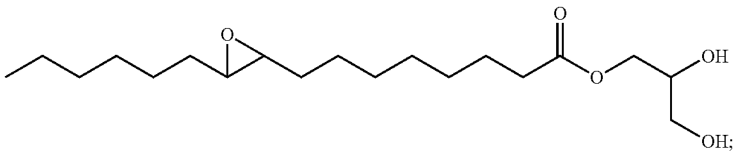

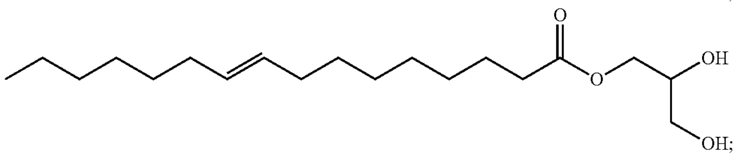

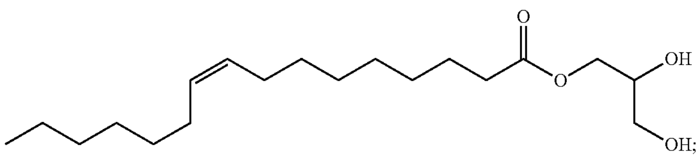

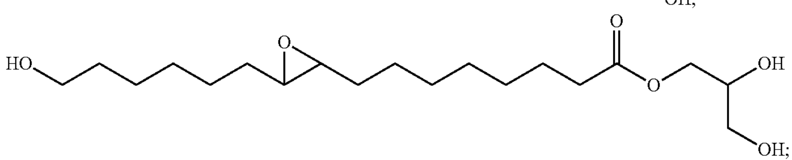

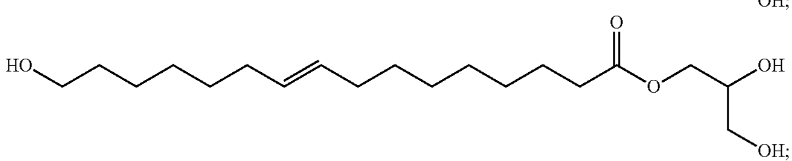

and

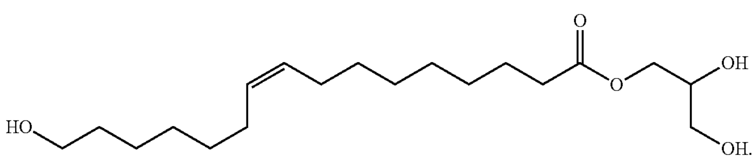

In another aspect, a mixture (e.g., a solution, suspension, or colloid) can include any of the compositions described herein in a solvent (e.g., dissolved, suspended, or dispersed in a solvent). Any of the mixtures described herein can include one or more of the following features. The solvent can be characterized as having a contact angle of at least about 70 degrees on carnauba wax. The solvent can be water or can be at least 70% water by volume. The solvent can include ethanol. The solvent can include water and ethanol. The mixture can include an antimicrobial agent, which can for example be citric acid. A concentration of the composition in the mixture can be in a range of 0.5 to 200 mg/mL. A concentration of the wetting agents in the mixture can be at least about 0.1 mg/mL.

In another aspect, a method of forming a mixture can include providing a solvent that is characterized as exhibiting a contact angle of at least about 70° (e.g., at least about 75°, at least about 80°, at least about 85°, or at least about 90°) when disposed on the surface of carnauba wax. The method can further include adding a composition to the solvent to form the mixture. The composition can include one or more fatty acids or salts or esters thereof, and/or can include compounds of Formula I, Formula II, and/or Formula III. The resulting mixture is characterized as exhibiting a contact angle less than about 85° (e.g., less than about 80°, less than about 75°, less than about 70°, or less than about 65°) when disposed on carnauba wax. The contact angle of the resulting mixture on carnauba wax can be less than the contact angle of the solvent (prior to the addition of the composition) on carnauba wax. Optionally, at least one of the fatty acids or salts or esters thereof of the composition can have a carbon chain length of 13 or less. Optionally, at least one of the fatty acids or salts or esters thereof of the composition can have a carbon chain length of 14 or greater. Optionally, the solvent can be water or can be at least 70% water by volume.

In another aspect, a method of forming a protective coating over a substrate (e.g., an agricultural product) can include applying a mixture (e.g., a solution, a suspension, or a colloid) to a surface of the substrate, the mixture comprising a composition in a solvent. The method can further include removing the solvent from the surface of the substrate, thereby causing the protective coating to be formed from the composition over the surface of the substrate. The composition can include compounds of Formula I, Formula II, and/or Formula III, where Formulas I, II, and III are as described throughout. For example, the composition can include include (i) from 50% to 99% by mass of a first group of compounds, wherein each compound of the first group is a compound of Formula I, and (ii) from 1% to 50% by mass of a second group of compounds, wherein each compound of the second group is a salt of Formula II or Formula III.

DEFINITIONS

As used herein, the term "plant matter" refers to any portion of a plant, including, for example, fruits (in the botanical sense, including fruit peels and juice sacs), vegetables, leaves, stems, barks, seeds, flowers, peels, or roots. Plant matter includes pre-harvest plants or portions thereof as well as post-harvest plants or portions thereof, including, e.g., harvested fruits and vegetables, harvested roots and berries, and picked flowers.

As used herein, a "coating agent" refers to a composition including a compound or group of compounds from which a protective coating can be formed.

As used herein, the term "mass loss factor" is defined as the ratio of the average mass loss rate of uncoated produce (measured for a control group) to the average mass loss rate of the corresponding coated produce. Hence a larger mass loss factor corresponds to a greater reduction in average mass loss rate for the coated produce.

Figure 17:
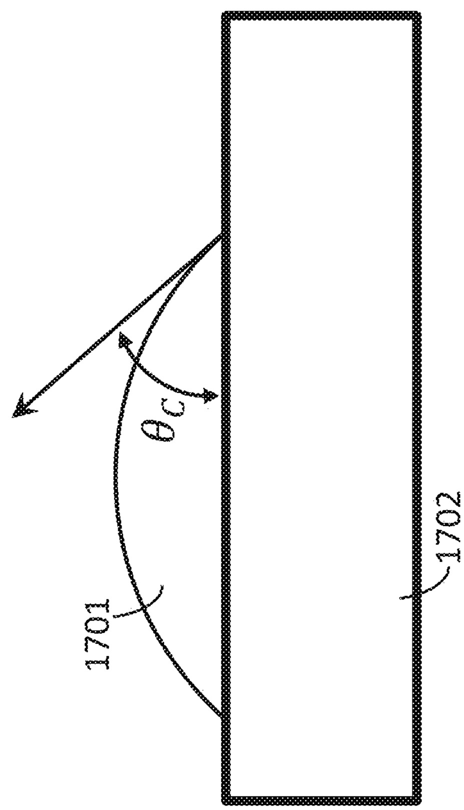
FIG. 17 shows the contact angle of a droplet on a solid surface.

As used herein, the term "contact angle" of a liquid on a solid surface refers to an angle of the outer surface of a droplet of the liquid measured where the liquid-vapor interface meets the liquid-solid interface. For example, as shown in FIG. 17, the angle $\theta_C$ defines the contact angle of the droplet 1701 on the surface of solid 1702. The contact angle quantifies the wettability of the solid surface by the liquid.

As used herein, the terms "wetting agent" or "surfactant" each refer to a compound that, when added to a solvent, suspension, colloid, or solution, reduces the difference in surface energy between the solvent/suspension/colloid/solution and a solid surface on which the solvent/suspension/colloid/solution is disposed.

As used herein, the "carbon chain length" of a fatty acid or salt or ester thereof refers to the number of carbon atoms in the chain including the carbonyl carbon.

As used herein, a "long chain fatty acid", a "long chain fatty acid ester", or a "long chain fatty acid salt" refers to a fatty acid or ester or salt thereof, respectively, for which the carbon chain length is greater than 13 (i.e., is at least 14).

As used herein, a "medium chain fatty acid", a "medium chain fatty acid ester", or a "medium chain fatty acid salt" refers to a fatty acid or ester or salt thereof, respectively, for which the carbon chain length is in a range of 7 to 13 (inclusive of 7 and 13).

As used herein, a "cationic counter ion" is any organic or inorganic positively charged ion associated with a negatively charged ion. Examples of a cationic counter ion include, for example, sodium, potassium, calcium, and magnesium.

As used herein, a "cationic moiety" is any organic or inorganic positively charged ion.

The following abbreviations are used throughout. Hexadecanoic acid (i.e., palmitic acid) is abbreviated to "PA". Octadecanoic acid (i.e., stearic acid) is abbreviated to "SA". Tetradecanoic acid (i.e., myristic acid) is abbreviated to "MA". (9Z)-Octadecenoic acid (i.e., oleic acid) is abbreviated to "OA". Dodecanoic acid (e.g., lauric acid) is abbreviated to "LA". Undecanoic acid (e.g., undecylic acid) is abbreviated to "UA". Decanoic acid (e.g., capric acid) is abbreviated to "CA". 1,3-dihydroxypropan-2-yl palmitate (i.e., 2-glyceryl palmitate) is abbreviated to "PA-2G". 1,3-dihydroxypropan-2-yl octadecanoate (i.e., 2-glyceryl stearate) is abbreviated to "SA-2G". 1,3-dihydroxypropan-2-yl tetradecanoic acid (i.e., 2-glyceryl myristate) is abbreviated to "MA-2G". 1,3-dihydroxypropan-2-yl (9Z)-octadecenoate (i.e., 2-glyceryl oleate) is abbreviated to "OA-2G". 2,3-dihydroxypropan-1-yl palmitate (i.e., 1-glyceryl palmitate) is abbreviated to "PA-1G". 2,3-dihydroxypropan-1-yl octadecanoate (i.e., 1-glyceryl stearate) is abbreviated to "SA-1G". 2,3-dihydroxypropan-1-yl tetradecanoate (i.e., 1-glyceryl myristate) is abbreviated to "MA-1G". 2,3-dihydroxypropan-1-yl (9Z)-octadecenoate (i.e., 1-glyceryl oleate) is abbreviated to "OA-1G". 2,3-dihydroxypropan-1-yl dodecanoate (i.e., 1-glyceryl laurate) is abbreviated to "LA-1G". 2,3-dihydroxypropan-1-yl undecanoate (i.e., 1-glyceryl undecanoate) is abbreviated to "UA-1G". 2,3-dihydroxypropan-1-yl decanoate (i.e., 1-glyceryl caprate) is abbreviated to "CA-1G". Sodium salt of stearic acid is abbreviated to "SA-Na". Sodium salt of myristic acid is abbreviated to "MA-Na". Sodium salt of palmitic acid is abbreviated to "PA-Na". Potassium salt of stearic acid is abbreviated to "SA-K". Potassium salt of myristic acid is abbreviated to "MA-K". Potassium salt of palmitic acid is abbreviated to "PA-K". Calcium salt of stearic acid is abbreviated to "$(SA)_2$-Ca". Calcium salt of myristic acid is abbreviated to "$(MA)_2$-Ca". Calcium salt of palmitic acid is abbreviated to "$(PA)_2$-Ca". Magnesium salt of stearic acid is abbreviated to "$(SA)_2$-Mg". Magnesium salt of myristic acid is abbreviated to "$(MA)_2$-Mg". Magnesium salt of palmitic acid is abbreviated to "$(PA)_2$-Mg".

"Substituted" or "substituent", as used herein, means an atom or group of atoms is replaced with another atom or group of atoms. Exemplary substituents include, but are not limited to, halogen, hydroxyl, nitro, cyano, alkyl, alkenyl, alkynyl, cycloalkyl, cycloalkenyl, formyl, acyl, ether, ester, keto, aryl, heteroaryl, etc.

DETAILED DESCRIPTION

Described herein are solutions, suspensions, or colloids containing a composition (e.g., a coating agent) in a solvent that can be used to form protective coatings over substrates such as plant matter, agricultural products, or food products. The protective coatings can, for example, prevent water loss from the substrates, oxidation of the substrates, and/or can shield the substrates from threats such as bacteria, fungi, viruses, and the like. The coatings can also protect the substrates from physical damage (e.g., bruising) and photodamage. Accordingly, the coating agents, solutions/suspensions/colloids, and the coatings formed thereof can be used to help store agricultural or other food products for extended periods of time without spoiling. In some instances, the coatings and the coating agents from which they are formed can allow for food to be kept fresh in the absence of refrigeration. The coating agents and coatings described herein can also be edible (i.e., the coating agents and coatings can be non-toxic for human consumption). In some particular implementations, the solutions/suspensions/colloids include a wetting agent or surfactant which cause the solution/suspension/colloid to better spread over the entire surface of the substrate during application, thereby improving surface coverage as well as overall performance of the resulting coating. In some particular implementations, the solutions/suspensions/colloids include an emulsifier which improves the solubility of the coating agent in the solvent and/or allows the coating agent to be suspended or dispersed in the solvent. The wetting agent and/or emulsifier can each be a component of the coating agent, or can be separately added to the solution/suspension/colloid.

Plant matter (e.g., agricultural products) and other degradable items can be protected against degradation from biotic or abiotic stressors by forming a protective coating over the outer surface of the product. The coating can be formed by adding the constituents of the coating (herein collectively a "coating agent") to a solvent (e.g., water and/or ethanol) to form a mixture (e.g., a solution, suspension, or colloid), applying the mixture to the outer surface of the product to be coated, e.g., by dipping the product in the mixture or by spraying the mixture over the surface of the product, and then removing the solvent from the surface of the product, e.g., by allowing the solvent to evaporate, thereby causing the coating to be formed from the coating agent over the surface of the product. The coating agent can be formulated such that the resulting coating provides a barrier to water and/or oxygen transfer, thereby preventing water loss from and/or oxidation of the coated product. The coating agent can additionally or alternatively be formulated such that the resulting coating provides a barrier to $CO_2$, ethylene and/or other gas transfer.

Coating agents including long chain fatty acids (e.g., palmitic acid, stearic acid, myristic acid, and/or other fatty acids having a carbon chain length greater than 13) and/or esters or salts thereof can both be safe for human consumption and can be used as coating agents to form coatings that are effective at reducing mass loss and oxidation in a variety of produce. For example, coatings formed from coating agents that include various combinations of palmitic acid, myristic acid, stearic acid, 1-glyceryl esters of palmitic acid (i.e., 2,3-dihydroxypropan-1-yl palmitate, herein "PA-1G"), 2-glyceryl esters of palmitic acid (i.e., 1,3-dihydroxypropan-2-yl palmitate, herein "PA-2G"), 1-glyceryl esters of myristic acid (i.e., 2,3-dihydroxypropan-1-yl tetradecanoate, herein "MA-1G"), 1-glyceryl esters of stearic acid (i.e., 2,3-dihydroxypropan-1-yl octadecenoate, herein "SA-1G"), and/or other long chain fatty acids or salts or esters thereof have been shown to be effective at reducing mass loss rates in many types of produce, for example finger limes, avocados, blueberries, and lemons. Specific examples of a variety of coatings and their effects in reducing mass loss rates in various types of produce are provided in Examples 1-4 below.

Figure 5:
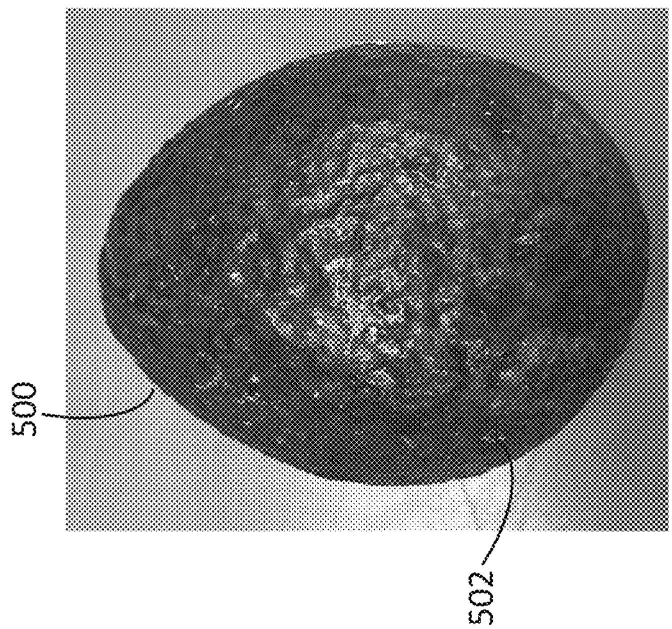
FIG. 5 is a high-resolution photograph of an avocado treated with a mixture of 1-glyceryl esters of undecanoic acid suspended in water.

Medium chain fatty acids (e.g., having a carbon chain length in a range of 7 to 13) and/or salts or esters thereof can also be used as coating agents to form coatings over produce or other plant matter or agricultural products using the methods described above. However, these compounds have typically been found to cause damage to the produce or plant matter, and also typically result in minimal to no reduction in mass loss rates. For example, treating avocados with a solution of 1-glyceryl esters of undecanoic acid (i.e., 2,3-dihydroxypropan-1-yl undecanoate, herein "UA-1G") suspended in water at a concentration as low as 5 mg/mL (UA-1G has a carbon chain length of 11) was shown to cause the avocados' skins to change from being virtually entirely green to having a high density of black discolored regions as a result of skin damage caused by the UA-1G. As seen in FIG. 5, which is a high-resolution photograph of one of the avocados 500 after treatment with the suspension described above, the skin of the previously green avocado exhibited numerous black discolored regions 502 after treatment.

It is generally expected that for coatings that are formulated to prevent water loss from or oxidation of coated substrates such as produce, thicker coatings will be less permeable to water and oxygen as compared to thinner coatings formed from the same coating agent, and should therefore result in lower mass loss rates as compared to thinner coatings. Thicker coatings can be formed by increasing the concentration of the coating agent in the solution/suspension/colloid and applying a similar volume of solution/suspension/colloid to each piece of (similarly sized) produce. The effect of increasing the coating thickness on harvested produce is demonstrated in FIG. 6, which shows plots of the percent mass loss over the course of 5 days in untreated blueberries (602), blueberries treated with a first solution including 10 mg/mL of coating agent compounds dissolved in ethanol (604), and blueberries treated with a second solution including 20 mg/mL of coating agent compounds dissolved in ethanol (606). The coating agents in both the first and second solutions were about 75% PA-2G and about 25% PA-1G by mass. As shown, the mass loss rates of the blueberries decreased significantly with increasing coating thickness.

Figure 7:
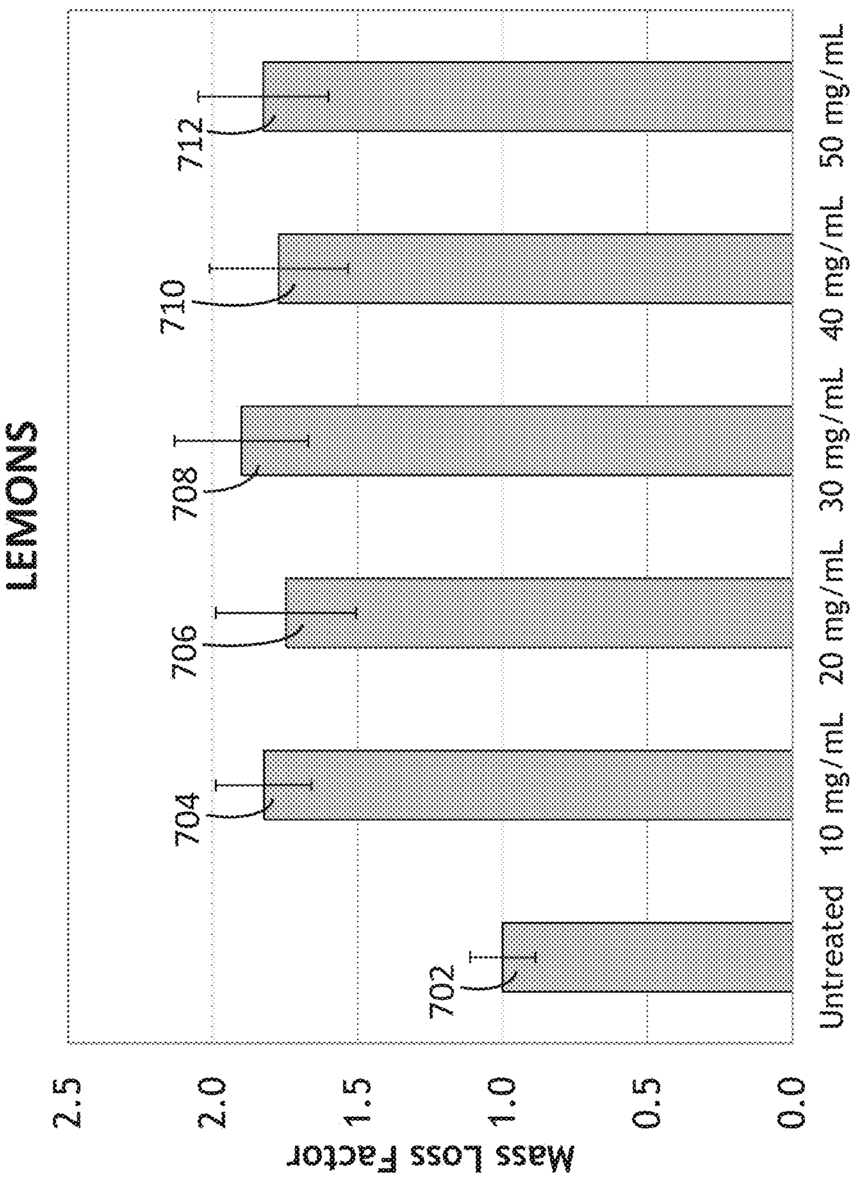
FIG. 7 shows a plot of mass loss factors of lemons treated with various concentrations of SA-1G and SA-Na (mass ratio 4:1) suspended in water.

For certain solutions/suspensions/colloids including long chain fatty acids and/or salts or esters thereof dissolved or suspended or dispersed in a solvent, protective coatings formed over certain types of produce by the methods described above were found to reduce the mass loss rate of the produce but did not result in lower mass loss rates as the thickness of the coating was increased, as in the blueberries described above. Instead, the mass loss rate in these cases was found to be lower than in uncoated produce but was approximately the same for thinner and thicker coatings. For example, FIG. 7 shows a plot of mass loss factor of lemons treated with various concentrations of a coating agent (e.g., SA-1G and SA-Na combined at a mass ratio of 4:1) suspended or dispersed in water. Bar 702 corresponds to a group of untreated lemons. Bar 704 corresponds to a group of lemons for which the concentration of coating agent in the solvent was 10 mg/mL. Bar 706 corresponds to a group of lemons for which the concentration of coating agent in the solvent was 20 mg/mL. Bar 708 corresponds to a group of lemons for which the concentration of coating agent in the solvent was 30 mg/mL. Bar 710 corresponds to a group of lemons for which the concentration of coating agent in the solvent was 40 mg/mL. Bar 712 corresponds to a group of lemons for which the concentration of coating agent in the solvent was 50 mg/mL. As shown in FIG. 7, while the mass loss factor for all the coated lemons was greater than 1 (indicating that the coating was causing a reduction in the mass loss rate), the mass loss rate was approximately the same for all coating agent concentrations tested in a range of 10 mg/mL to 50 mg/mL and hence did not vary with concentration.

Surprisingly, for many cases in which the mass loss rate did not vary with coating thickness (as with the lemons in FIG. 7), it was found that if a small concentration of medium chain fatty acids and/or salts or esters thereof was added to the mixture (i.e., the solution, suspension, or colloid) prior to application to produce (e.g., by including them in the coating agent at a lower concentration than that of the long chain fatty acids and/or salts or esters thereof, or by separately adding them to the mixture), then mass loss rates did increase with coating thickness. Furthermore, in many of these cases, the resulting mass loss rates for coatings that included a small concentration of medium chain fatty acids and/or salts or esters thereof were substantially lower as compared to coatings formed from coating agents that lacked the medium chain fatty acids and/or salts or esters thereof but were otherwise identical, and surface damage to the produce in these cases was either absent or minimal. These results were particularly surprising in view of the fact that medium chain fatty acids and/or salts or esters thereof were generally found to cause damage to produce or other plant matter when applied individually at similar concentrations, as shown in FIG. 5.

Figure 8:
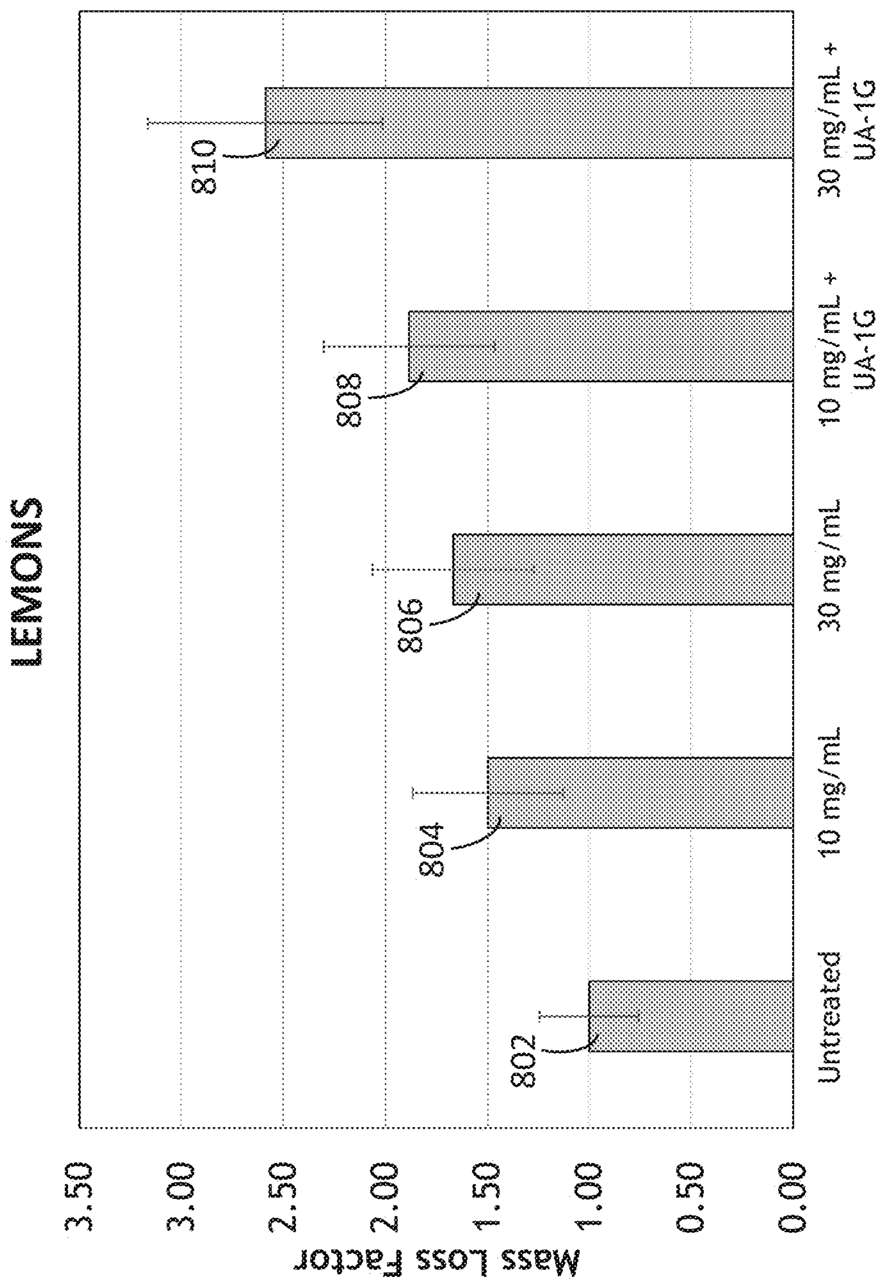
FIG. 8 shows a plot of mass loss factors of lemons treated with mixtures including various coating agents suspended in water.

The beneficial effects of adding small concentrations of medium chain fatty acids or salts or esters thereof to coating solutions/suspensions/colloids that include long chain fatty acids or salts/esters thereof are shown in FIG. 8. FIG. 8 is a graph showing mass loss factors of untreated lemons (802), lemons treated with suspensions in which the coating agent included only long chain fatty acid esters and fatty acid salts (804 and 806), and lemons treated with suspensions in which the coating agent included a small concentration of medium chain fatty acids or salts or esters thereof in combination with a larger concentration of long chain fatty acid esters and fatty acid salts (808 and 810). Specifically, bar 804 corresponds to lemons treated with 10 mg/mL of the long chain fatty acid esters/salts suspended in water. Bar 806 corresponds to lemons treated with 30 mg/mL of the long chain fatty acid esters/salts solvent in water. Bar 808 corresponds to lemons treated with 10 mg/mL of long chain fatty acid esters/salts plus 5 mg/mL of medium chain fatty acid esters solvent in water. Bar 810 corresponds to lemons treated with 30 mg/mL of long chain fatty acid esters/salts plus 5 mg/mL of medium chain fatty acid esters solvent in water.

While treating the lemons with the coating agents that only included long chain fatty acid salts and esters (804 and 806) did reduce the average mass loss rate of the lemons, the mass loss factor did not substantially increase when the concentration of the coating agent compounds in the mixture was increased from 10 mg/mL (804) to 30 mg/mL (806). However, the mass loss factor did increase substantially when a small concentration of medium chain fatty acid esters (5 mg/mL of UA-1G) was added to each of the mixtures. Specifically, adding 5 mg/mL of medium chain esters to the mixture with 10 mg/mL of long chain fatty acid esters/salts caused the mass loss factor of the lemons due to the resulting coatings to increase from about 1.5 (bar 804) to about 1.9 (bar 808), corresponding to an increase in mass loss factor of over 25%. Adding 5 mg/mL of medium chain esters to the mixture with 30 mg/mL of long chain fatty acid esters/salts caused the mass loss factor of the lemons due to the resulting coatings to increase from about 1.7 (bar 806) to about 2.6 (bar 810), corresponding to an increase in mass loss factor of over 50%. The mass loss factor of the lemons corresponding to bar 810 was in fact substantially larger than that of groups of lemons coated with any of the concentrations of long chain fatty acid esters/salts in solution for which medium chain fatty acids or salts/esters thereof were not also added.

Figure 9:
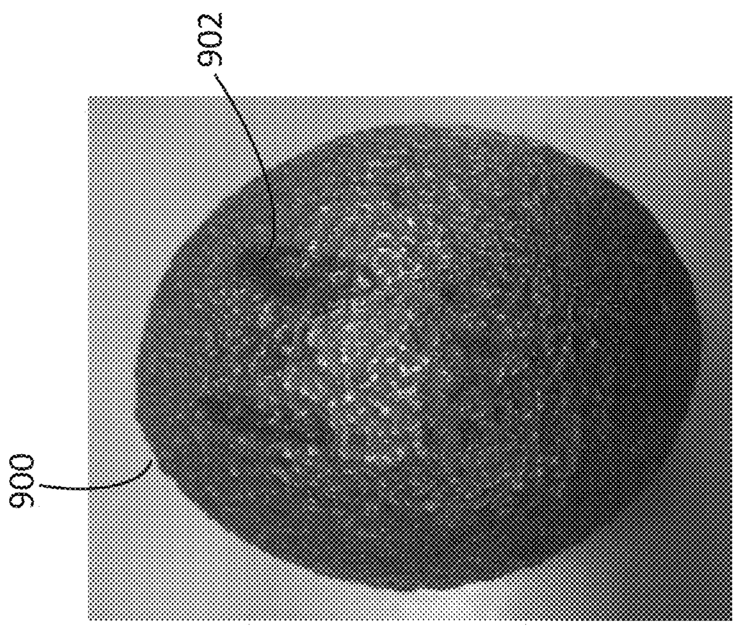
FIG. 9 is a high-resolution photograph of an avocado treated with a mixture including a combination of medium and long chain fatty acid esters/salts suspended in water.

FIG. 9 is a high-resolution photograph of an avocado 900 treated with the same mixture used to treat the lemons of bar 810 in FIG. 8 (5 mg/mL of UA-1G plus 30 mg/mL of long chain fatty acid esters/salts suspended in water). Prior to treatment, the avocado skin was virtually entirely green (not shown). As seen in FIG. 9, after treatment the avocado skin was mostly still green, with only a small density of black discolored regions 902, indicating that the treatment caused very little skin damage to the avocado. In contrast, the avocado shown in FIG. 5, which was treated with a solution that included the same concentration of UA-1G in water (5 mg/mL) but lacked the long chain fatty acid esters/salts, displayed extensive skin damage.

Without wishing to be bound by theory, it is believed that many of the mixtures (i.e., solutions, suspensions, or colloids) that lacked the medium chain fatty acids or salts/esters thereof were not sufficiently wetting the entire surface of the produce to which they were applied due to a difference in surface energy of the mixture as compared to that of the surface of the produce. Consequently, the coatings formed from these mixtures did not completely cover the surface of the produce. As such, mass loss was dominated by water loss through the openings in the coating, and was relatively unaffected by increasing the coating thickness. Thus, in cases where this effect was believed to occur (e.g., in lemons coated from a water-based solution such as in FIG. 7), mass loss rates were relatively unaffected by increasing the thickness of the coating.

It is further believed that the medium chain fatty acids that were added to the mixtures acted as surfactants/wetting agents, reducing the contact angle of the mixture on the surface of the produce. The addition of the wetting agents was believed to improve coverage of the mixture over the surface of the produce, thereby allowing a substantially contiguous coating to be formed over the entire surface. Consequently, the mass loss rates of coated produce were found to decrease with increasing coating thickness, and overall mass loss rates were found to be substantially reduced as compared to produce coated with similar mixtures that lacked the wetting agents. Furthermore, the long chain fatty acids and/or salts or esters thereof appeared to suppress surface damage to the produce observed in cases where the wetting agent was dissolved, dispersed, or suspended in the mixture and applied on its own without also including the long chain fatty acids and/or salts or esters thereof. Additional evidence of these effects is provided below.

Through extensive experimentation, it was found that the contact angle of droplets of some solvents and coating solutions/suspensions on the surfaces of at least some types of produce was quite large, indicating a large difference in surface energy of the droplets as compared to the surface of the produce. This effect was particularly evident in cases where the coating solution/suspension was at least 70% water by volume, since the surfaces of many plants or other agricultural products often tend to be hydrophobic due to the presence of epicuticular waxes. This phenomenon was characterized as follows. Droplets of solvent or coating solution/suspension/colloid (i.e., solvent with coating agent dissolved, suspended or dispersed therein) were deposited either directly on produce surfaces or directly on carnauba, candellila, or paraffin wax (carnauba, candellila, and paraffin wax all tend to have similar native hydrophobicity to that of the surfaces of lemons as well as many other types of produce, see FIG. 12 for example), and contact angles were determined with image analysis software. Results of various studies are summarized as follows.

Figure 10:
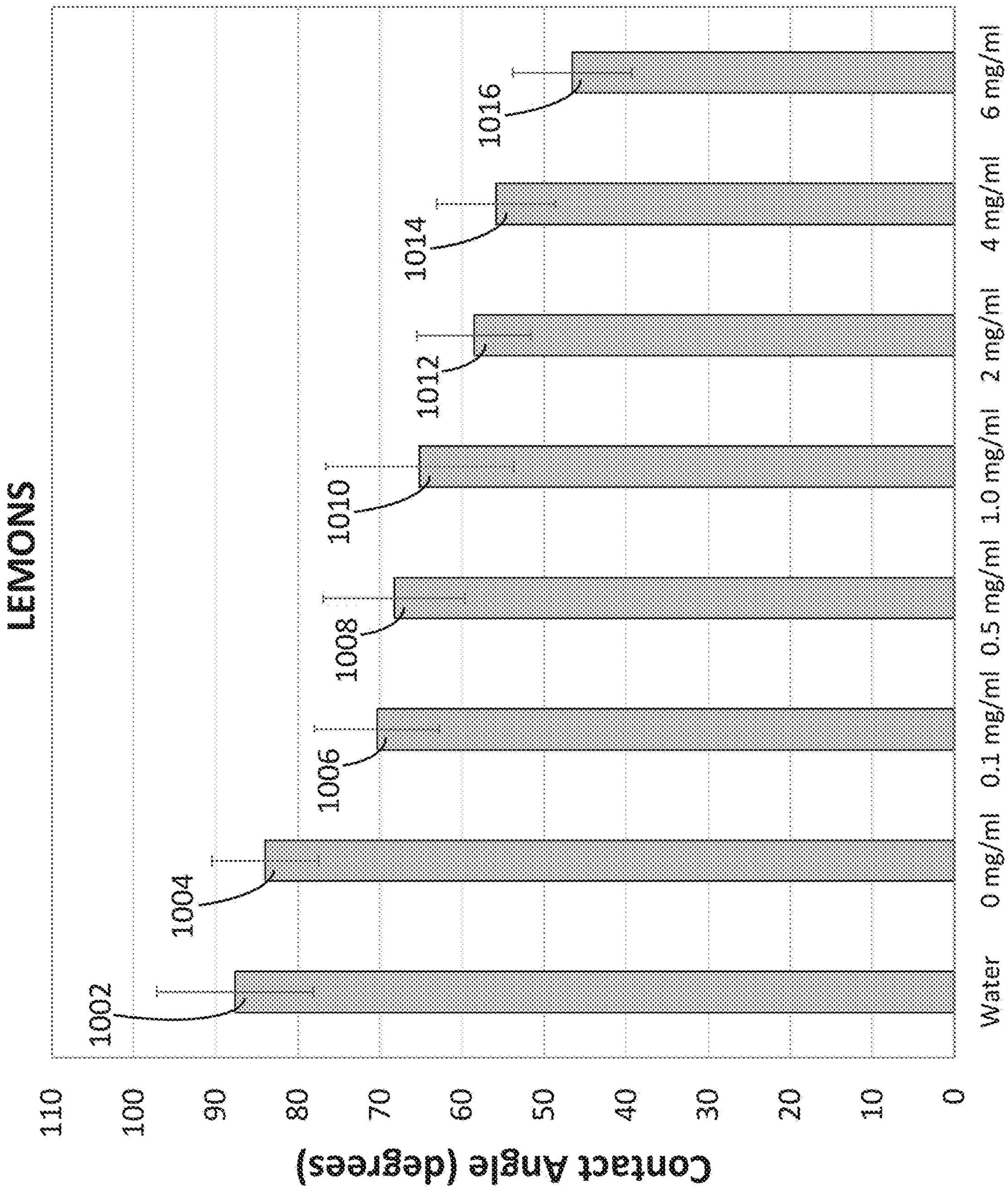
FIGS. 10 and 11 show graphs of contact angles of various mixtures on the surfaces of non-waxed lemons.

Increasing the concentration of the wetting agent (e.g., the medium chain fatty acids and/or salts or esters thereof) in water-based or high water content coating mixtures generally decreased the contact angle of the solution/suspension/colloid on the produce or wax surface. For example, as shown in FIG. 10, water (bar 1002) exhibited a contact angle of about 88° on the surface of non-waxed lemons, and coating mixtures containing only long chain fatty acid esters/salts (SA-1G and MA-Na combined at a mass ratio of 95:5) suspended in water at a concentration of 30 mg/mL (bar 1004) exhibited a contact angle of about 84°. However, as small concentrations of medium chain fatty acid esters (e.g., CA-1G) were added, the contact angle gradually decreased from about 70° for 0.1 mg/mL of CA-1G (bar 1006) to about 47° for 6 mg/mL of CA-1G (bar 1016).

Figure 11:
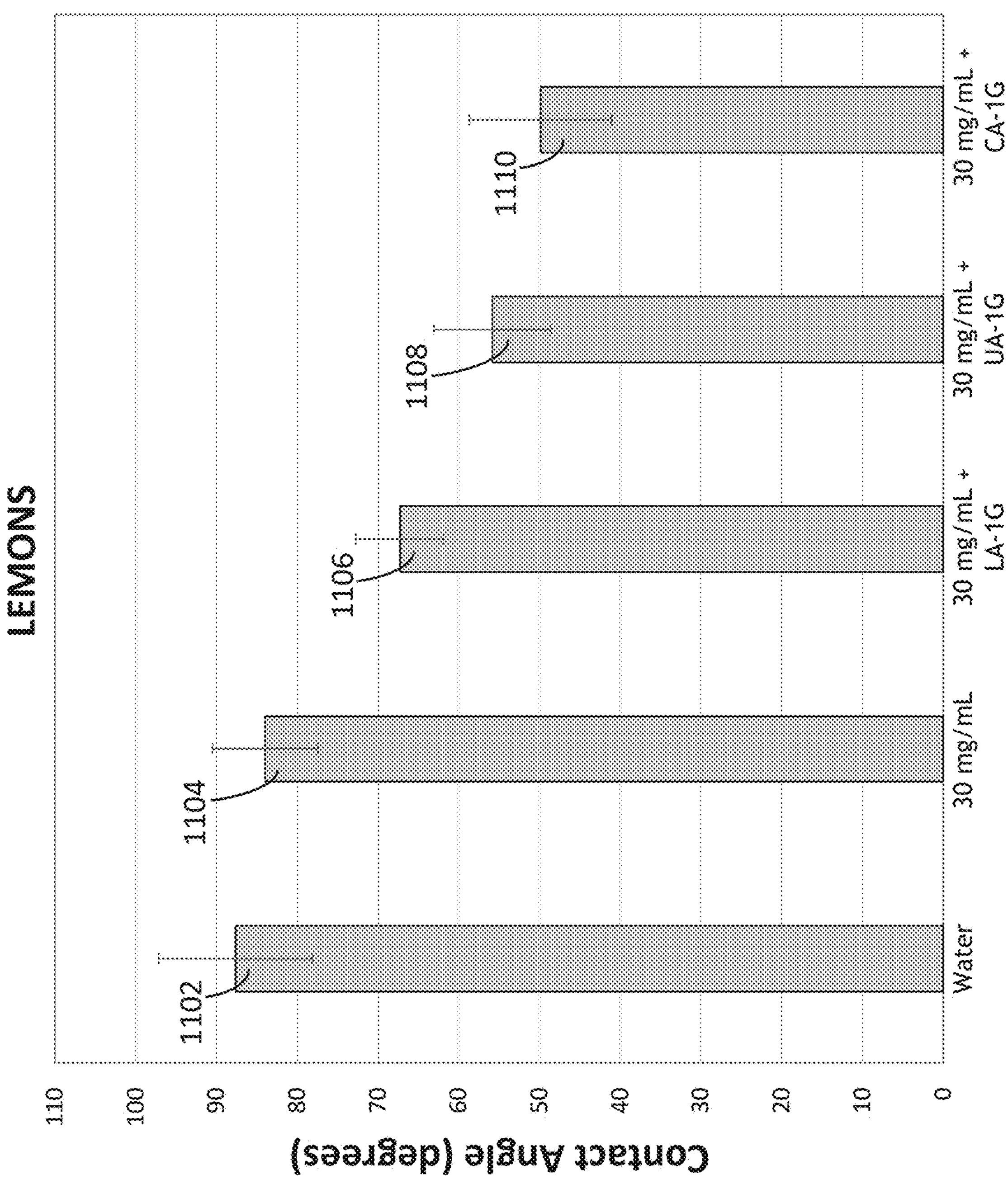

It was further found that for many mixtures, the addition of medium chain fatty acids and/or salts or esters thereof having a smaller chain length caused a larger reduction in contact angle of droplets on produce than addition of similar concentrations of medium chain fatty acids and/or salts or esters thereof having a longer chain length. For example, FIG. 11 shows results of a study in which different medium chain fatty acid esters (C10, C11, and C12) were added to water-based coating mixtures, and contact angles of droplets of the various mixtures on non-waxed lemons were measured. Bar 1102 corresponds to droplets of water. Bar 1104 corresponds to SA-1G and MA-Na combined at a mass ratio of 95:5 and suspended in water at a concentration of 30 mg/mL. Bars 1106, 1108, and 1110 correspond to the same mixture as bar 1104 but with the addition of 4 mg/mL of LA-1G (for bar 1106), 4 mg/mL of UA-1G (for bar 1108), or 4 mg/mL of CA-1G (for bar 1110).

As seen in FIG. 11, drops of water (1102) on lemons as well as drops of the mixture that included only long chain fatty acid esters/salts (1104) on lemons exhibited larger contact angles than mixtures for which a small concentration of medium chain fatty acid esters (1106, 1108, and 1110) were added. Furthermore, for a given concentration of medium chain fatty acid esters, the contact angle decreased with decreasing carbon chain length. Specifically, the mixtures that lacked the medium chain fatty acid esters (1102 and 1104) exhibited contact angles of about 84° to 88°. Adding 4 mg/mL of LA-1G (carbon chain length of 12) decreased the contact angle to about 67°, adding 4 mg/mL of UA-1G (carbon chain length of 11) decreased the contact angle to about 56°, and adding 4 mg/mL of CA-1G (carbon chain length of 10) decreased the contact angle to about 50°.

Figure 12:
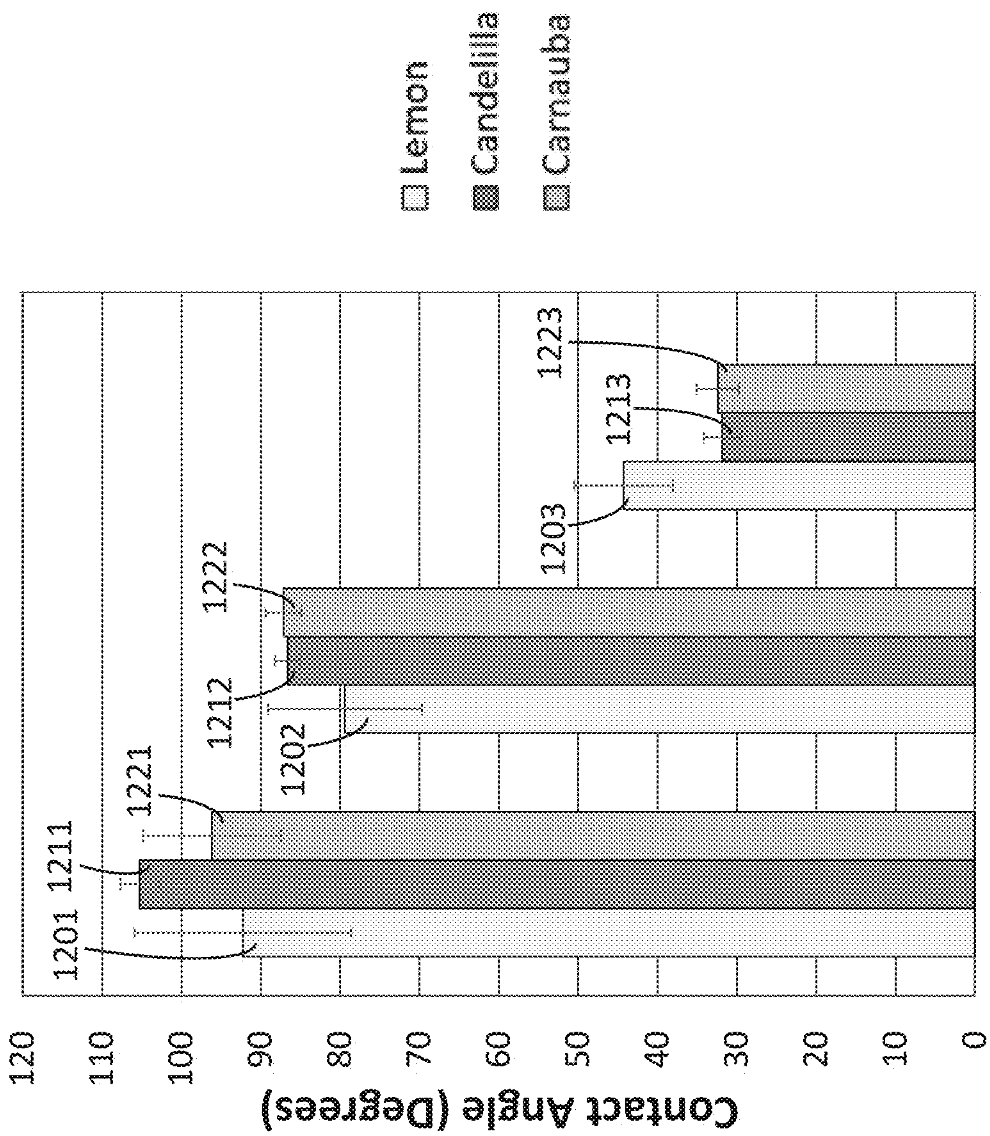
FIG. 12 shows a graph of contact angles of various solvents and mixtures on the surfaces of non-waxed lemons, candelilla wax, and carnauba wax.

As previously described, carnauba, candellila, and paraffin wax were all found to have similar native hydrophobicity to that of the surfaces of lemons (as well as other produce). Hence the wetting properties (e.g., contact angle) of mixtures characterized on carnauba, candellila, or paraffin wax surfaces are typically predictive of the wetting properties of the mixtures on produce. For example, FIG. 12 shows contact angles of water as well as two other mixtures on the surfaces of lemons (bars 1201-1203), candellila wax (bars 1211-1213), and carnauba wax (bars 1221-1223). The first group of bars (1201, 1211, and 1221) each correspond to water, and the contact angle on all 3 surfaces was in a range of about 92° to 105°. The second group of bars (1202, 1212, and 1222) correspond to a suspension for which the solvent was water and the coating agent included 30 mg/mL of SA-1G and SA-Na (long chain fatty acid salts/esters) combined at a mass ratio of 94:6, as well as 0.25 mg/mL of citric acid and 0.325 mg/mL of sodium bicarbonate. As shown, the contact angle on all 3 surfaces was in a range of about 80° to 88°, which was slightly lower than for pure water but was still generally quite large. The third group of bars (1203, 1213, and 1223) correspond to a suspension which was the same as that of the second group of bars but also included 3 mg/mL of CA-1G (medium chain fatty acid ester). As shown, the contact angles on all 3 surfaces remained quite similar to one another and were greatly reduced as compared to the solutions which lacked the medium chain fatty acid esters, each being in a range of about 31° to 44°.

Figure 13:
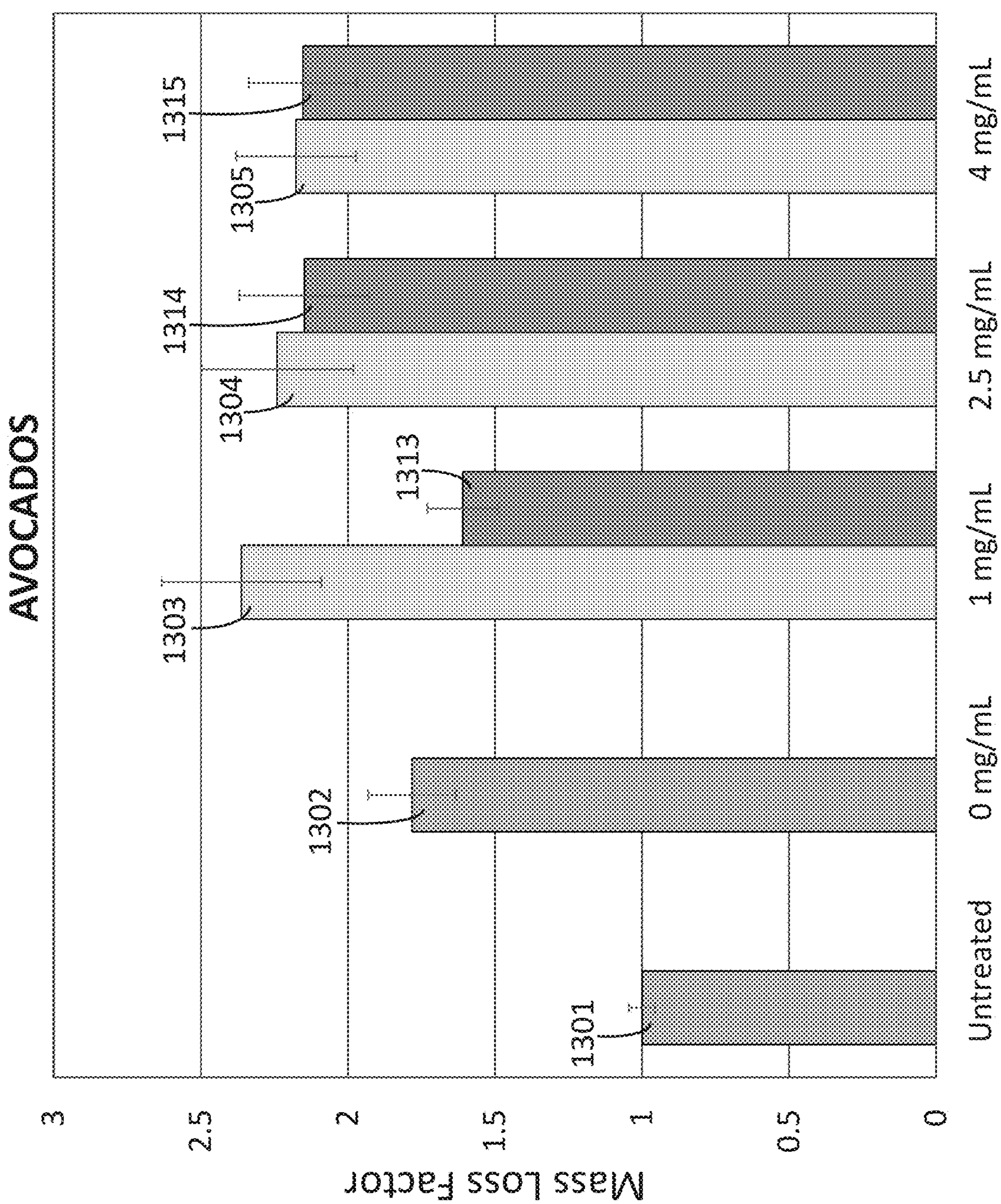
FIG. 13 shows a plot of mass loss factors of avocados treated with mixtures including various combinations of medium and long chain fatty acid esters/salts suspended in water.

The effects of adding small concentrations of LA-1G and CA-1G to coating mixtures used to form coatings on avocados is shown in the graph of FIG. 13. As seen, avocados coated from a mixture that included SA-1G and MA-Na (long chain fatty acid esters/salts) combined at a mass ratio of 94:6 and suspended in water at a concentration of 30 mg/mL (bar 1302) exhibited a mass loss factor of about 1.78. Bars 1303-1305 show the effects of adding CA-1G to the mixture at concentrations of 1 mg/mL, 2.5 mg/mL, and 4 mg/mL, respectively, and bars 1313-1315 show the effects of adding LA-1G to the mixture at concentrations of 1 mg/mL, 2.5 mg/mL, and 4 mg/mL, respectively.

The addition of the CA-1G (carbon chain length of 10) to the coating mixture increased the mass loss factor to about 2.35 for a CA-1G concentration of 1 mg/mL (bar 1303), to about 2.24 for a CA-1G concentration of 2.5 mg/mL (bar 1304), and to about 2.18 for a CA-1G concentration of 4 mg/mL (bar 1305). So while the mass loss factor was substantially larger for all concentrations of CA-1G in a range of 1 to 4 mg/mL as compared to mixtures lacking the medium chain fatty acid esters (bar 1302), the mass loss factor appeared to decrease slightly as the concentration of CA-1G was increased. Without wishing to be bound by theory, it is believed that the addition of CA-1G at all concentrations of at least 1 mg/mL was effective at improving the wetting of the solution on the surfaces of the avocados, but that increasing the concentration of the CA-1G began to cause some moderate damage to the avocados, thereby mitigating the beneficial surface wetting effects and causing a slight decrease in the mass loss factor.

Still referring to FIG. 13, the addition of the LA-1G (carbon chain length of 12) to the coating mixture caused a decrease in the mass loss factor to about 1.61 for an LA-1G concentration of 1 mg/mL (bar 1313), but caused the mass loss factor to increase to about 2.15 for LA-1G concentrations of both 2.5 mg/mL (bar 1314) and 4 mg/mL (bar 1315). Without wishing to be bound by theory, it is believed that at a concentration of 1 mg/mL of LA-1G, the surface wetting of the solution was not sufficiently improved to overcome surface damage to the avocados caused by the LA-1G, and so the mass loss factor decreased relative to treatment by the coating mixture that lacked the medium chain fatty acid esters. However, for larger concentrations of LA-1G, the surface wetting was sufficiently improved such that the mass loss factor substantially increased relative to treatment by the coating solution that lacked the medium chain fatty acid esters. This result is consistent with that of FIG. 11, which found that shorter chain fatty esters (e.g., CA-1G) caused a larger reduction in contact angle as compared to longer chain fatty esters (e.g., LA-1G) when added to water-based coating mixtures at the same concentration.

Figure 14:
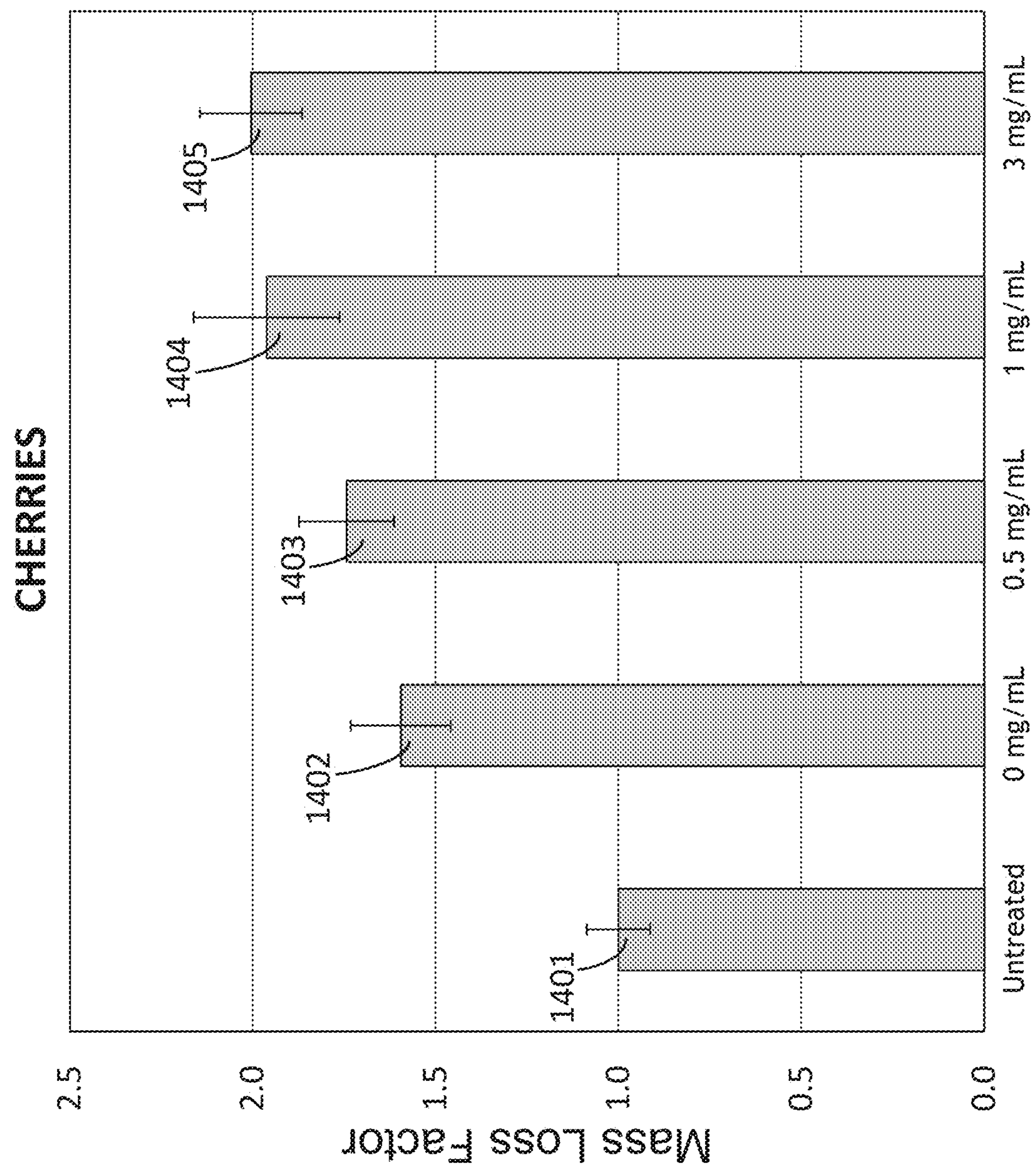
FIG. 14 shows a plot of mass loss factors of cherries treated with mixtures including various combinations of medium and long chain fatty acid esters/salts suspended in water.

The effects of adding small concentrations of CA-1G to coating mixtures used to form coatings on cherries is shown in FIG. 14. As seen, cherries coated from a mixture that included SA-1G and MA-Na (long chain fatty acid esters/salts) combined at a mass ratio of 94:6 and suspended in water at a concentration of 40 mg/mL (bar 1402) exhibited a mass loss factor of about 1.60. Bars 1403-1405 show the effects of adding CA-1G to the mixture at concentrations of 0.5 mg/mL, 1 mg/mL, and 3 mg/mL, respectively. The addition of the CA-1G (carbon chain length of 10) to the coating mixture increased the mass loss factor to about 1.75 for a CA-1G concentration of 0.5 mg/mL (bar 1403), to about 1.96 for a CA-1G concentration of 1 mg/mL (bar 1404), and to about 2.00 for a CA-1G concentration of 4 mg/mL (bar 1405). As shown, the addition of small concentrations of CA-1G to the mixture increased the mass loss factor of the coated cherries. This increase was believed to result from the improved surface wetting resulting from the addition of the CA-1G to the coating mixture.

Figure 15:
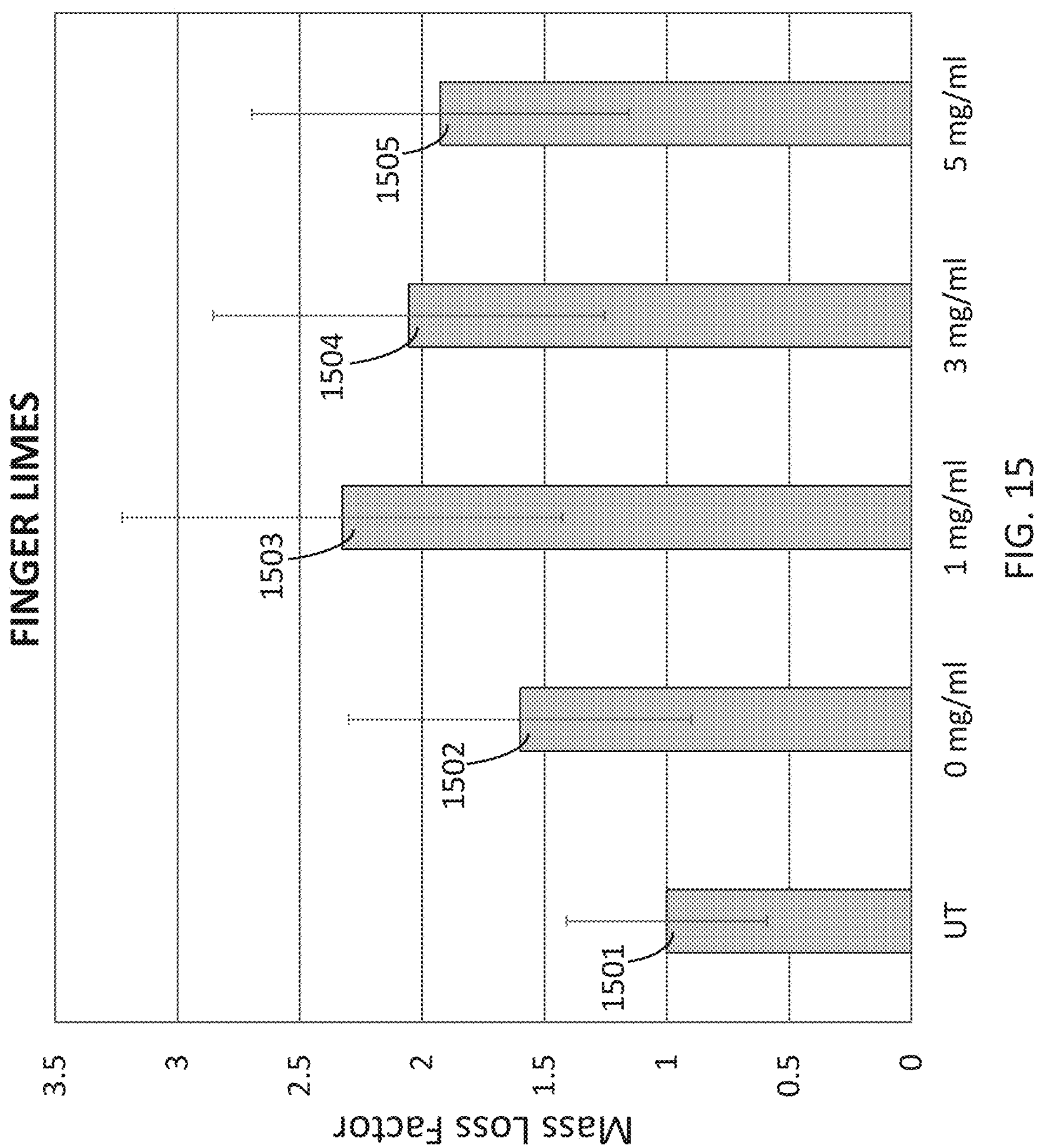
FIG. 15 shows a plot of average daily mass loss rates of finger limes treated with mixtures including various combinations of medium and long chain fatty acid esters/salts suspended in water.

The effects of adding small concentrations of UA-1G to coating mixtures used to form coatings on finger limes is shown FIG. 15. As seen, finger limes coated from a mixture that included SA-1G and SA-Na (long chain fatty acid esters/salts) combined at a mass ratio of 94:6 and suspended in water at a concentration of 30 mg/mL (bar 1502) exhibited a mass loss factor of about 1.61. Bars 1503-1505 show the effects of adding UA-1G to the mixture at concentrations of 1 mg/mL, 3 mg/mL, and 5 mg/mL, respectively. The addition of the UA-1G (carbon chain length of 11) to the mixture increased the mass loss factor to about 2.33 for a UA-1G concentration of 1 mg/mL (bar 1503), to about 2.06 for a UA-1G concentration of 3 mg/mL (bar 1504), and to about 1.93 for a UA-1G concentration of 5 mg/mL (bar 1505). Although the addition of UA-1G did increase the mass loss factor of the finger limes at all concentrations in a range of 1 to 5 mg/mL, the peak mass loss factor occurred at 1 mg/mL, and the mass loss factor decreased as the concentration of UA-1G increased. Without wishing to be bound by theory, it is believed that increasing the concentration of UA-1G began to damage the surface of the finger limes, and that any improvements in surface wetting caused by the increased UA-1G concentration were not sufficient to mitigate this effect, thus resulting in gradually decreasing mass loss factors with increasing UA-1G concentrations.

As described throughout, wetting agents can be included in coating solutions/suspensions/colloids in order to improve the surface wetting of substrates to which the solutions/suspensions/colloids are applied, thereby resulting in improved surface coverage of the coatings that are formed thereover. The wetting agents can be included within or as part of the coating agent that is dissolved or suspended in the solvent to form the coating solution/suspension/colloid. That is, a sub-group of the compounds of the coating agent can cause a change in surface energy of the solvent to which the coating agent is added, thereby acting as a wetting agent. Alternatively, the wetting agent can be a separate compound (or group of compounds) from the coating agent, and can be added to the solvent either before, after, or at the same time as the coating agent.

Alternatively, the wetting agent can be a separate compound (or group of compounds) from the coating agent and can be applied to the surface prior to applying the coating agent. For example, the wetting agent can first be added to a separate solvent to form a wetting agent solution/suspension/colloid. The wetting agent solution/suspension/colloid can then be applied to the surface, after which the coating solution/suspension/colloid is applied to the surface to form the coating. Priming of the surface in this manner can improve the surface wetting of the coating solution/suspension/colloid with the surface.

An example of the surface priming effect described above is shown in FIG. 16, which is a graph of contact angles of various solvents or mixtures on the surface of paraffin wax. As shown, water applied directly to the paraffin wax surface (bar 1601) exhibited an average contact angle of 74°. When a coating agent mixture of SA-1G and SA-Na combined at a mass ratio of 95:5 was dispersed in water at a concentration of 45 mg/mL and applied directly to the paraffin wax surface (bar 1602), the average contact angle was even larger (83°). However, when a wetting agent (e.g., a medium chain fatty acid or salt/ester thereof) was added to the coating agent mixture, the contact angle of the coating agent mixture was substantially reduced. Additionally, when a wetting agent (e.g., a medium chain fatty acid or salt/ester thereof) was applied to the paraffin wax surface prior to applying either the water or the coating agent mixture, the contact angle was also substantially reduce. For example, when 3 mg/mL of CA-1G was added to the mixture corresponding to bar 1602, the resulting contact angle (bar 1603) was 43°. When the paraffin wax surface was primed by applying a wetting agent mixture of CA-1G at a concentration of 3 mg/mL in water and then allowing the surface to dry prior to applying water (bar 1604) or the SA-1G/SA-Na coating agent mixture described above (bar 1605), the resulting contact angles were 24° and 30°, respectively.

The solvent to which the coating agent and wetting agent (when separate from the coating agent) is added to form the solution/suspension/colloid can, for example, be water, methanol, ethanol, isopropanol, butanol, acetone, ethyl acetate, chloroform, acetonitrile, tetrahydrofuran, diethyl ether, methyl tert-butyl ether, an alcohol, any other suitable solvent, or a combination thereof. The resulting solutions, suspensions, or colloids can be suitable for forming coatings on agricultural products. For example, the solutions, suspensions, or colloids can be applied to the surface of the agricultural product, after which the solvent can be removed (e.g., by evaporation or convective drying), leaving a protective coating formed from the coating agent on the surface of the agricultural product.

While a number of the solvents above (particularly water and ethanol) can be safely and effectively used in solutions/suspensions/colloids that are applied to edible products such as produce or other agricultural products, in many cases it can be advantageous to use either water or otherwise a solvent which is at least about 40% (and in many cases higher) water by volume. This is because water is typically cheaper than other suitable solvents and can also be safer to work with than solvents that have a higher volatility and/or a lower flash point (e.g., acetone or alcohols such as isopropanol or ethanol). Accordingly, for any of the solutions/suspensions/colloids described herein, the solvent or solution/suspension/colloid can be at least about 40%, at least about 45%, at least about 50%, at least about 55%, at least about 60%, at least about 65%, at least about 70%, at least about 75%, at least about 80%, at least about 85%, at least about 90%, at least about 95%, or at least about 99% water by mass or by volume. In some implementations, the solvent includes a combination of water and ethanol, and can optionally be at least about 40%, at least about 45%, at least about 50%, at least about 55%, at least about 60%, at least about 65%, at least about 70%, at least about 75%, at least about 80%, at least about 85%, at least about 90%, at least about 95%, or at least about 99% water by volume. In some implementations, the solvent or solution/suspension/colloid can be about 40% to 100% water by mass or volume, about 40% to 99% water by mass or volume, about 40% to 95% water by mass or volume, about 40% to 90% water by mass or volume, about 40% to 85% water by mass or volume, about 40% to 80% water by mass or volume, about 50% to 100% water by mass or volume, about 50% to 99% water by mass or volume, about 50% to 95% water by mass or volume, about 50% to 90% water by mass or volume, about 50% to 85% water by mass or volume, about 50% to 80% water by mass or volume, about 60% to 100% water by mass or volume, about 60% to 99% water by mass or volume, about 60% to 95% water by mass or volume, about 60% to 90% water by mass or volume, about 60% to 85% water by mass or volume, about 60% to 80% water by mass or volume, about 70% to 100% water by mass or volume, about 70% to 99% water by mass or volume, about 70% to 95% water by mass or volume, about 70% to 90% water by mass or volume, about 70% to 85% water by mass or volume, about 80% to 100% water by mass or volume, about 80% to 99% water by mass or volume, about 80% to 97% water by mass or volume, about 80% to 95% water by mass or volume, about 80% to 93% water by mass or volume, about 80% to 90% water by mass or volume, about 85% to 100% water by mass or volume, about 85% to 99% water by mass or volume, about 85% to 97% water by mass or volume, about 85% to 95% water by mass or volume, about 90% to 100% water by mass or volume, about 90% to 99% water by mass or volume, about 90% to 98% water by mass or volume, or about 90% to 97% water by mass or volume.

In view of the above, for some applications the solvent can be a low wetting solvent (i.e., a solvent exhibiting a large contact angle with respect to the surface to which it is applied). For example, in the absence of any added wetting agents or other surfactants, the contact angle between the solvent and either (a) carnauba wax, (b) candelilla wax, (c) paraffin wax, or (d) the surface of a non-waxed lemon can be at least about 70°, for example at least about 75°, 80°, 85°, or 90°. Addition of any of the wetting agents described herein to the solvent, either alone or in combination with other compounds or coating agents, can cause the contact angle between the resulting solution/suspension/colloid and either (a) carnauba wax, (b) candelilla wax, (c) paraffin wax, or (d) the surface of a non-waxed lemon to be less than about 85°, for example less than about 80°, 75°, 70°, 65°, 60°, 55°, 50°, 45°, 40°, 35°, 30°, 25°, 20°, 15°, 10°, 5°, or 0°.

The coating agent that is added to or dissolved, suspended, or dispersed in the solvent to form the coating solution/suspension/colloid can be any compound or combination of compounds capable of forming a protective coating over the substrate to which the solution/suspension/colloid is applied. The coating agent can be formulated such that the resulting coating protects the substrate from biotic and/or abiotic stressors. For example, the coating can prevent or suppress the transfer of oxygen and/or water, thereby preventing the substrate from oxidizing and/or from losing water via transpiration/osmosis/evaporation. In cases where the substrate is perishable and/or edible, for example when the substrate is a plant, an agricultural product, or a piece of produce, the coating agent is preferably composed of non-toxic compounds that are safe for consumption. For example, the coating agent can be formed from or include fatty acids and/or salts or esters thereof. The fatty acid esters can, for example, be ethyl esters, methyl esters, or glyceryl esters (e.g., 1-glyceryl or 2-glyceryl esters).

Coating agents formed from or containing a high percentage of long chain fatty acids and/or salts or esters thereof (e.g., having a carbon chain length of at least 14) have been found to be effective at forming protective coatings over a variety of substrates that can prevent water loss from and/or oxidation of the substrate. The addition of one or more medium chain fatty acids and/or salts or esters thereof (or other wetting agents) can further improve the performance of the coatings. Accordingly, the coating agents herein can include one or more compounds of Formula I, wherein Formula I is:

(Formula I)

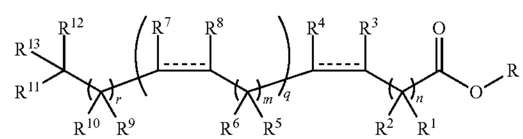

wherein:

R is selected from —H, -glyceryl, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl or heteroaryl is optionally substituted with one or more groups selected from halogen (e.g., C1, Br, or I), hydroxyl, nitro, —CN, —$NH_2$, —SH, —$SR^{15}$, —$OR^{14}$, —$NR^{14}R^{15}$, $C_1$-$C_6$ alkyl, $C_2$-$C_6$ alkenyl, or $C_2$-$C_6$ alkynyl;

$R^1$, $R^2$, $R^5$, $R^6$, $R^9$, $R^{10}$, $R^{11}$, $R^{12}$ and $R^{13}$ are each independently, at each occurrence, —H, —(C═O)$R^{14}$, —(C═O)H, —(C═O)OH, —(C═O)$OR^{14}$, —(C═O)—O—(C═O)$R^{14}$, —O(C═O)$R^{14}$, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl, or heteroaryl is optionally substituted with one or more —$OR^{14}$, —$NR^{14}R^{15}$, —$SR^{14}$, or halogen;

$R^3$, $R^4$, $R^7$, and $R^8$ are each independently, at each occurrence, —H, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl wherein each alkyl, alkynyl, cycloalkyl, aryl, or heteroaryl is optionally substituted with one or more —$OR^{14}$, —$NR^{14}R^{15}$, —$SR^{14}$, or halogen; or $R^3$ and $R^4$ can combine with the carbon atoms to which they are attached to form a $C_3$-$C_6$ cycloalkyl, a $C_4$-$C_6$ cycloalkenyl, or 3- to 6-membered ring heterocycle; and/or $R^7$ and $R^8$ can combine with the carbon atoms to which they are attached to form a $C_3$-$C_6$ cycloalkyl, a $C_4$-$C_6$ cycloalkenyl, or 3- to 6-membered ring heterocycle;

$R^{14}$ and $R^{15}$ are each independently, at each occurrence, —H, aryl, heteroaryl, —$C_1$-$C_6$ alkyl, —$C_2$-$C_6$ alkenyl, or —$C_2$-$C_6$ alkynyl;

the symbol ═══ represents a single bond or a cis or trans double bond;

n is 0, 1, 2, 3, 4, 5, 6, 7 or 8;

m is 0, 1, 2 or 3;

q is 0, 1, 2, 3, 4 or 5; and r is 0, 1, 2, 3, 4, 5, 6, 7 or 8.

In some embodiments, R is selected from —H, —$CH_3$, or —$CH_2CH_3$. In some embodiments, R is selected from —H, -glyceryl, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl or heteroaryl is optionally substituted with one or more $C_1$-$C_6$ alkyl or hydroxyl.

As further described herein, the coating agents can additionally or alternatively include fatty acid salts such as sodium salts (e.g., SA-Na, PA-Na, or MA-Na), potassium salts (e.g., SA-K, PA-K, MA-K), calcium salts (e.g., $(SA)_2$-Ca, $(PA)_2$-Ca, or $(MA)_2$-Ca) or magnesium salts (e.g., $(SA)_2$-Mg, $(PA)_2$-Mg, or $(MA)_2$-Mg). Accordingly, the coating agents herein can include one or more compounds of Formula II or Formula III, wherein Formula II and Formula III are:

(Formula II)

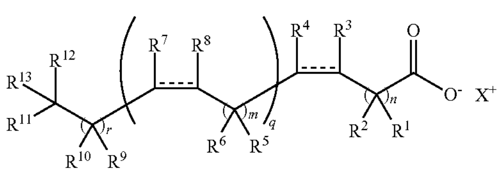

-continued (Formula III)

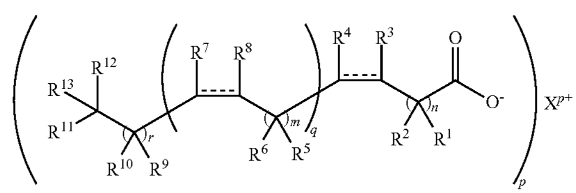

wherein for each formula:

X is a cationic moiety;

$X^{p+}$ is a cationic counter ion having a charge state p, and p is 1, 2, or 3;

$R^1$, $R^2$, $R^5$, $R^6$, $R^9$, $R^{10}$, $R^{11}$, $R^{12}$ and $R^{13}$ are each independently, at each occurrence, —H, —(C═O)$R^{14}$, —(C═O)H, —(C═O)OH, —(C═O)$OR^{14}$, —(C═O)—O—(C═O)$R^{14}$, —O(C═O)$R^{14}$, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl, or heteroaryl is optionally substituted with one or more —$OR^{14}$, —$NR^{14}R^{15}$, —$SR^{14}$, or halogen;

$R^3$, $R^4$, $R^7$, and $R^8$ are each independently, at each occurrence, —H, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl wherein each alkyl, alkynyl, cycloalkyl, aryl, or heteroaryl is optionally substituted with one or more —$OR^{14}$, —$NR^{14}R^{15}$, —$SR^{14}$, or halogen; or $R^3$ and $R^4$ can combine with the carbon atoms to which they are attached to form a $C_3$-$C_6$ cycloalkyl, a $C_4$-$C_6$ cycloalkenyl, or 3- to 6-membered ring heterocycle; and/or $R^7$ and $R^8$ can combine with the carbon atoms to which they are attached to form a $C_3$-$C_6$ cycloalkyl, a $C_4$-$C_6$ cycloalkenyl, or 3- to 6-membered ring heterocycle;

$R^{14}$ and $R^{15}$ are each independently, at each occurrence, —H, aryl, heteroaryl, —$C_1$-$C_6$ alkyl, —$C_2$-$C_6$ alkenyl, or —$C_2$-$C_6$ alkynyl;

the symbol ═══ represents a single bond or a cis or trans double bond;

n is 0, 1, 2, 3, 4, 5, 6, 7 or 8;

m is 0, 1, 2 or 3;

q is 0, 1, 2, 3, 4 or 5; and r is 0, 1, 2, 3, 4, 5, 6, 7 or 8.

Any of the coating agents described herein can include one or more of the following medium chain fatty acid compounds (e.g., compounds of Formula I):

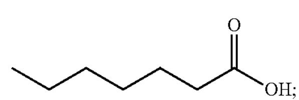

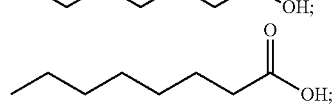

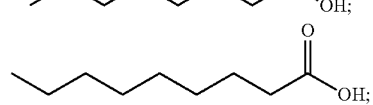

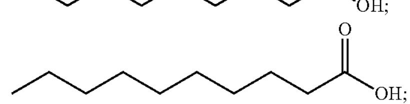

-continued
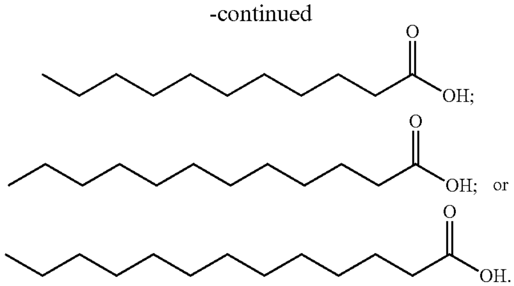
Any of the coating agents described herein can include one or more of the following long chain fatty acid compounds (e.g., compounds of Formula I):
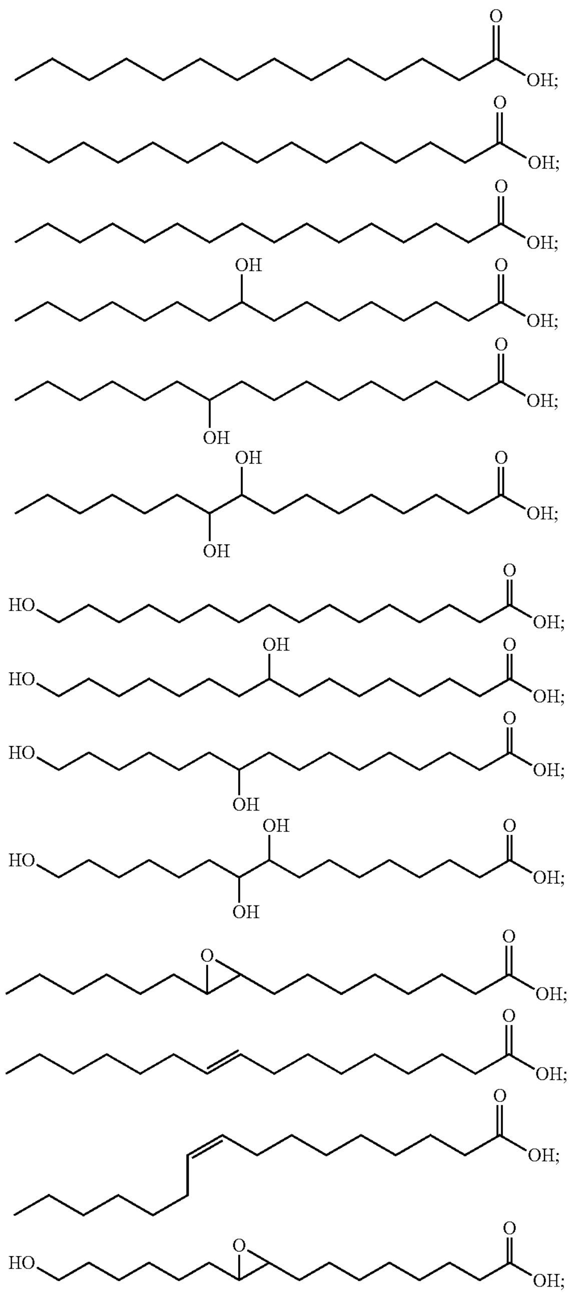
-continued
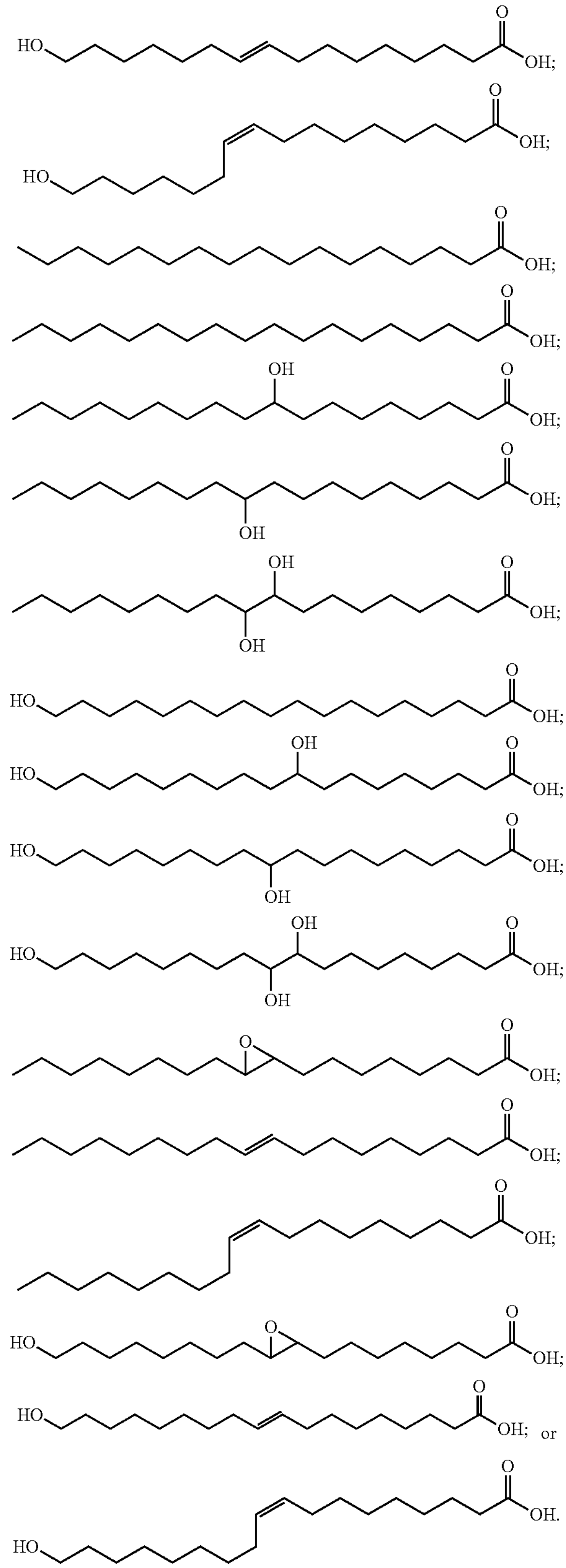
The coating agents herein can include one or more of the following medium chain fatty acid methyl ester compounds (e.g., compounds of Formula I):

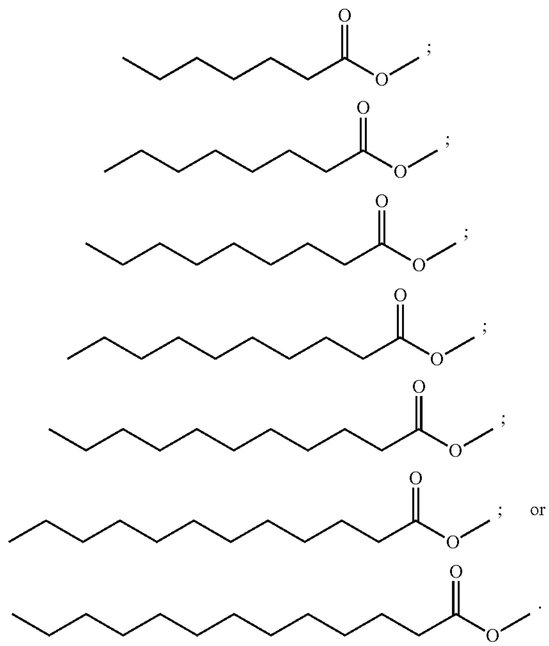
The coating agents herein can include one or more of the following long chain fatty acid methyl ester compounds (e.g., compounds of Formula I):
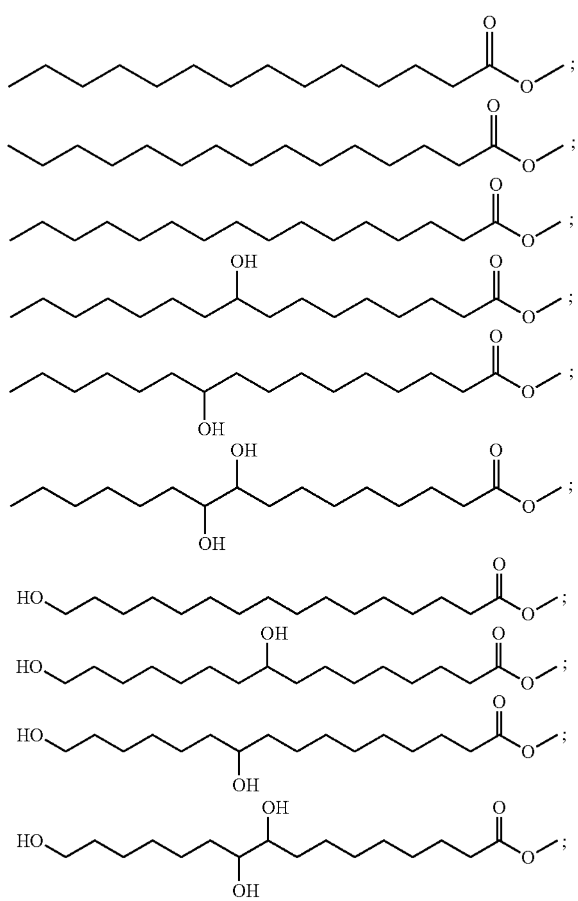
-continued
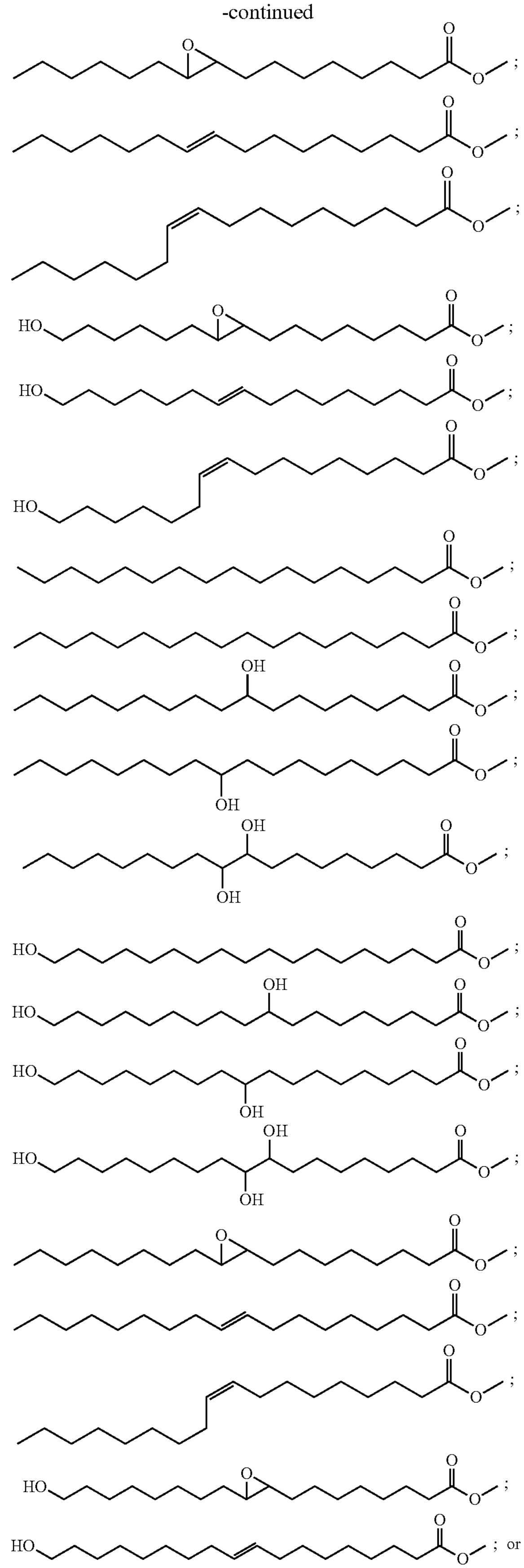

-continued
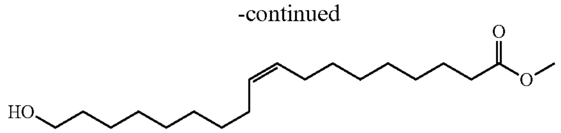
The coating agents herein can include one or more of the following medium chain fatty acid ethyl ester compounds (e.g., compounds of Formula I):
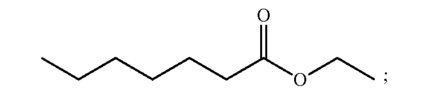
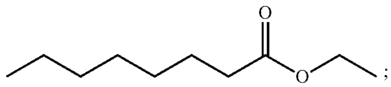
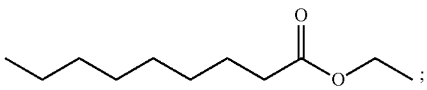
-continued
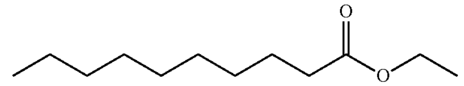
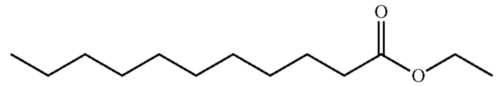
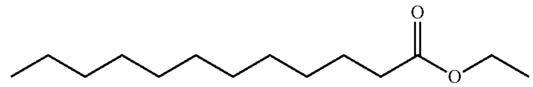
or
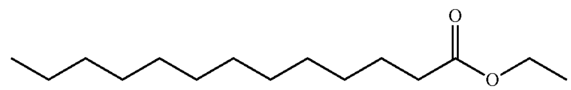
The coating agents herein can include one or more of the following long chain fatty acid ethyl ester compounds (e.g., compounds of Formula I):
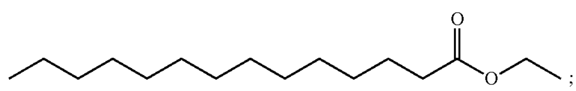
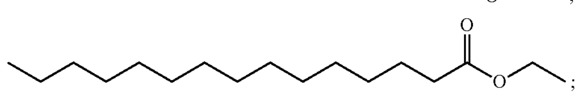
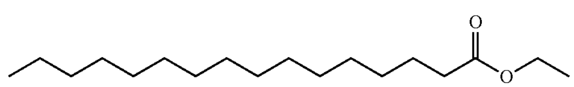
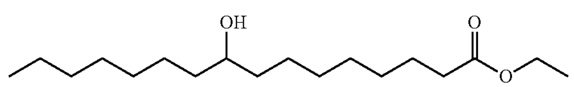
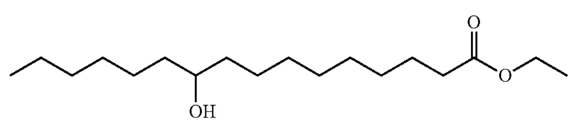
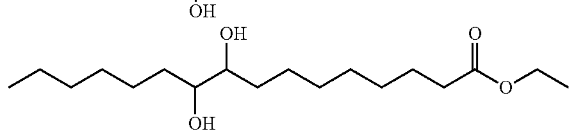
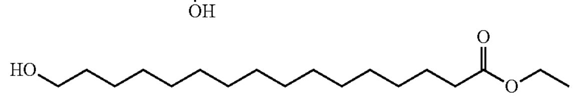
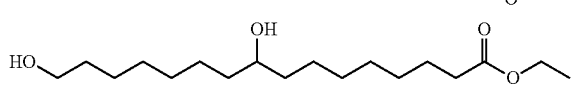
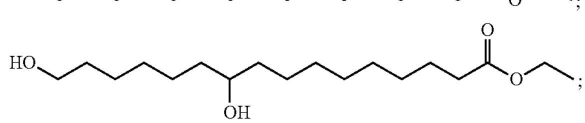
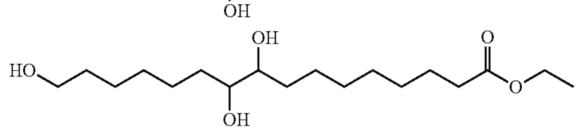
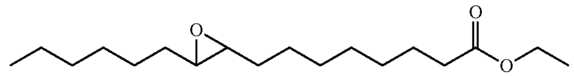
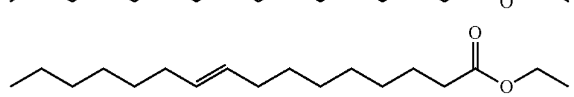

-continued
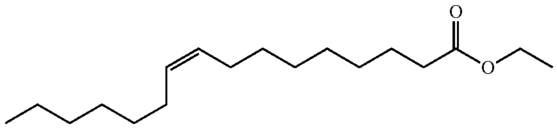
;
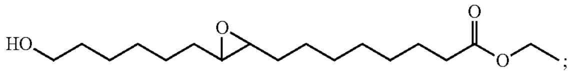
;
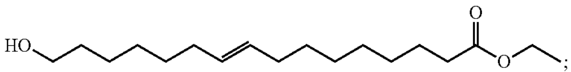
;
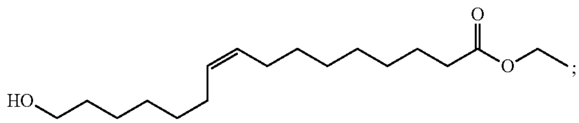
;
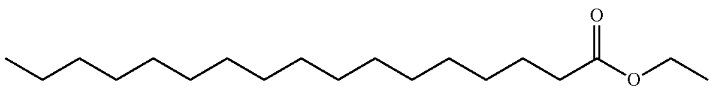
;
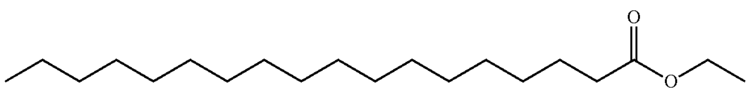
;
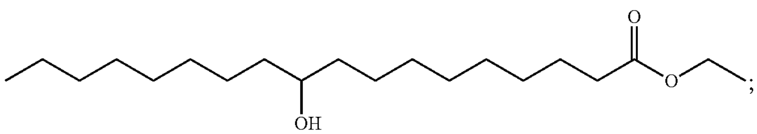
;
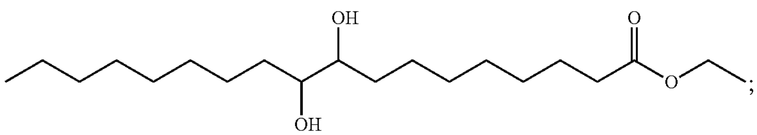
;
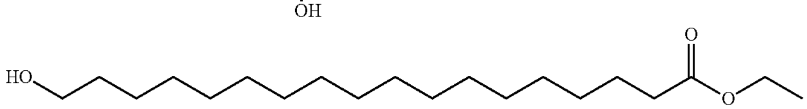
;
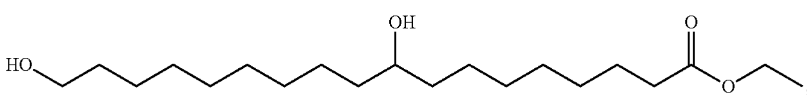
;
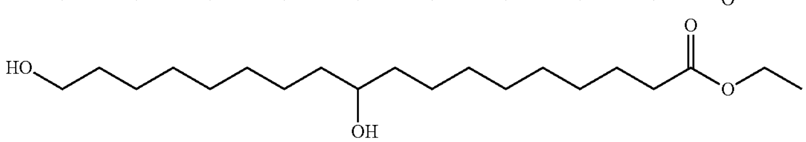
;
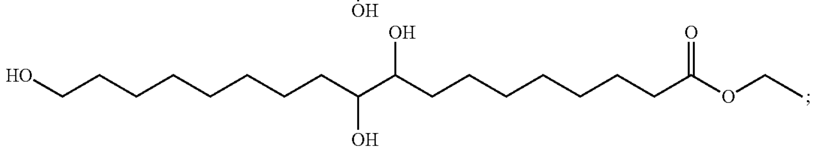
;
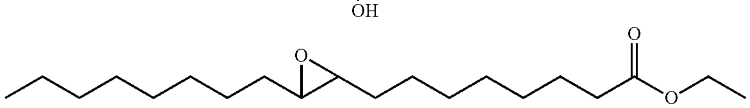
;
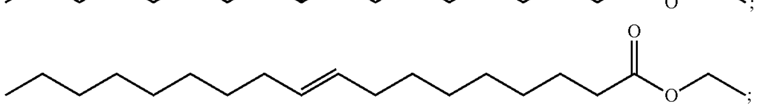
;
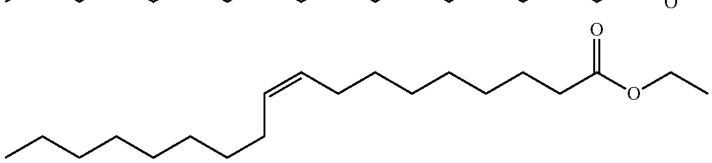
;
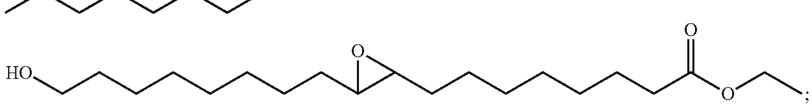
;

-continued
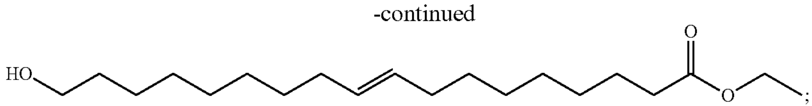
; or
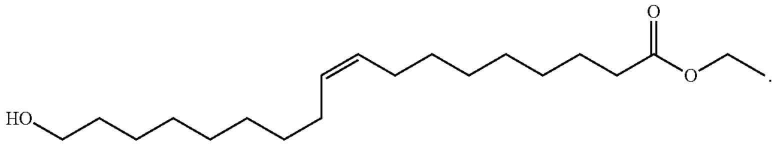
The coating agents herein can include one or more of the following medium chain fatty acid 2-glyceryl ester compounds (e.g., compounds of Formula I):
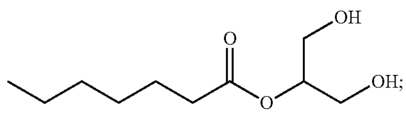
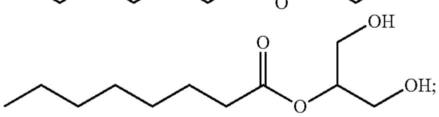
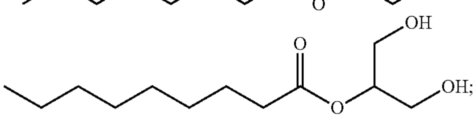
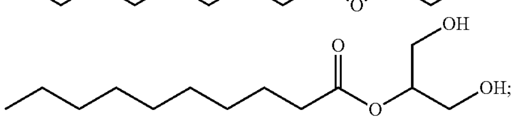
-continued
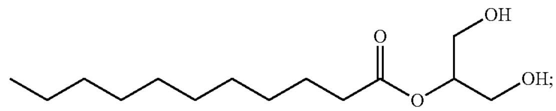
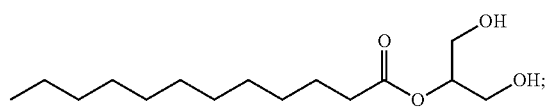
or
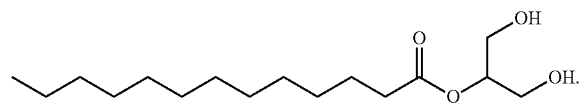
The coating agents herein can include one or more of the following long chain fatty acid 2-glyceryl ester compounds (e.g., compounds of Formula I):
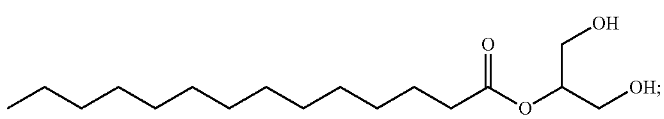
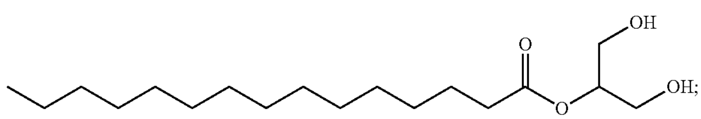
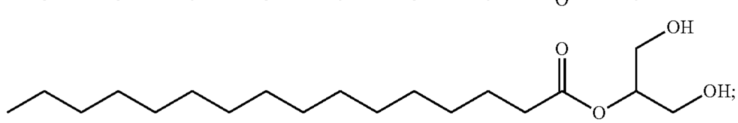
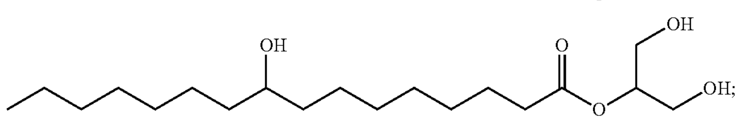
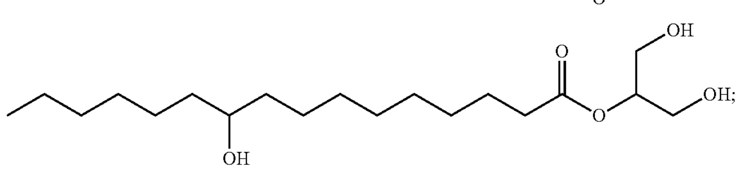
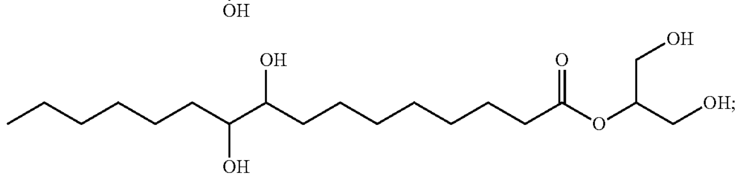

-continued
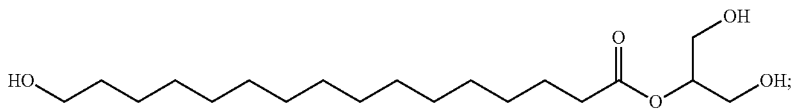
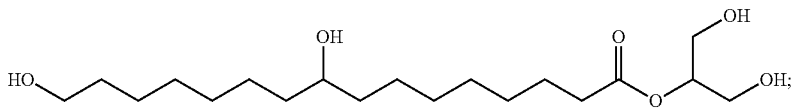
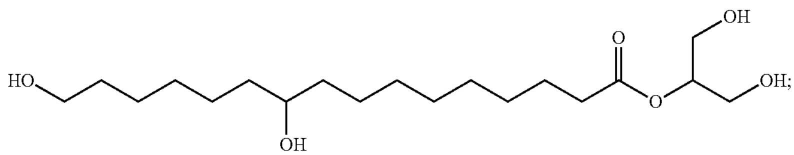
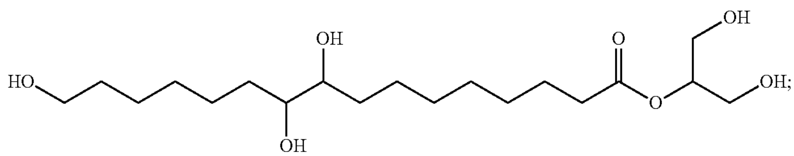
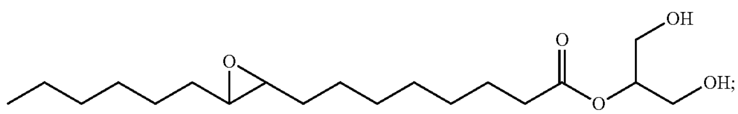
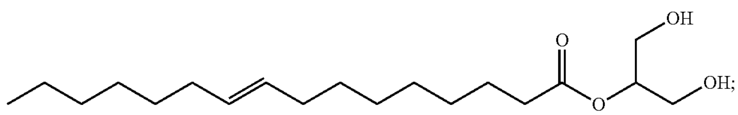
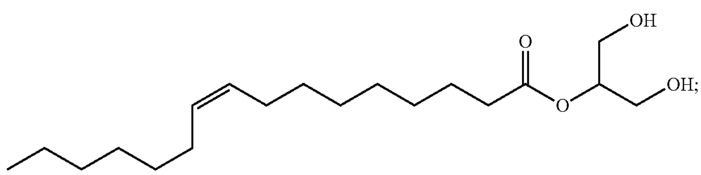
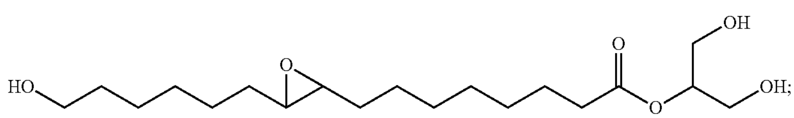
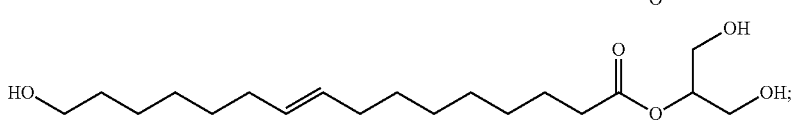
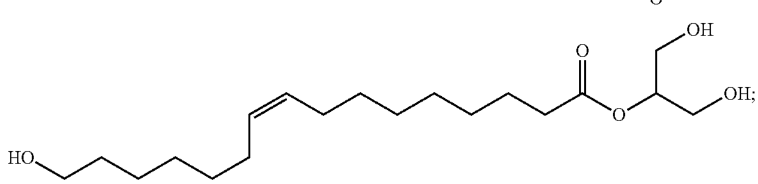
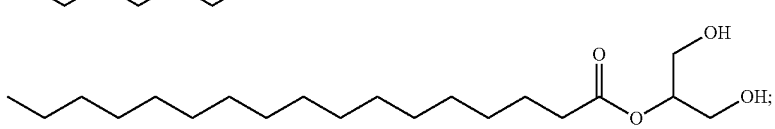
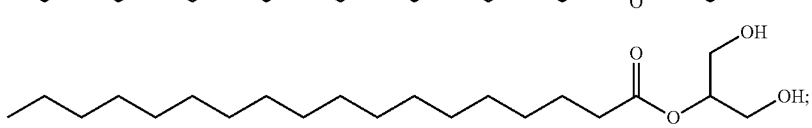
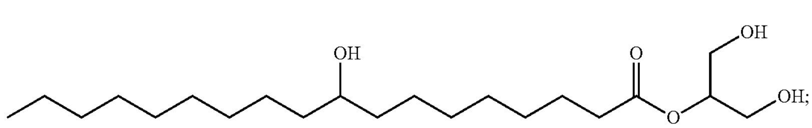

-continued
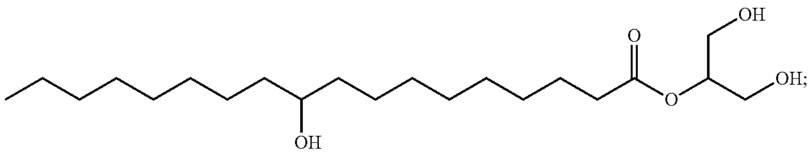
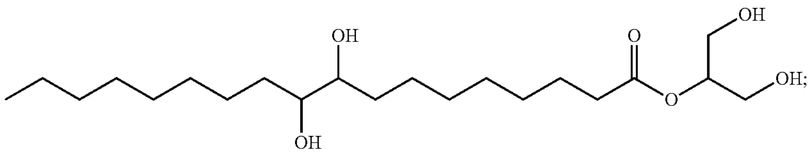
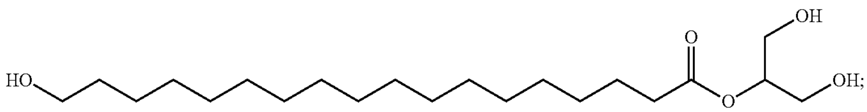
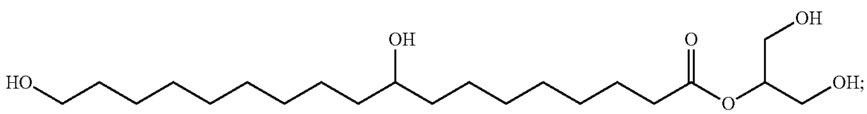
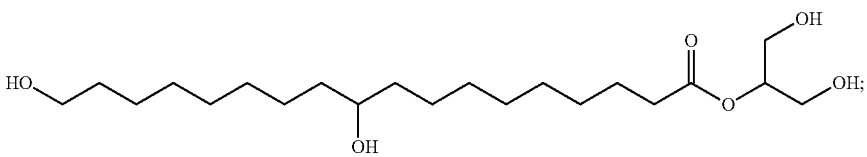
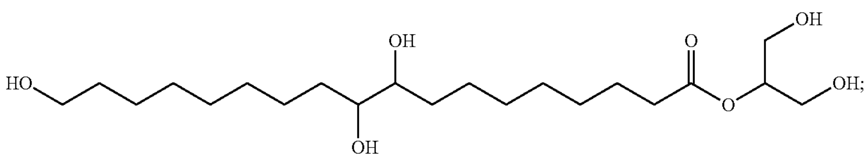
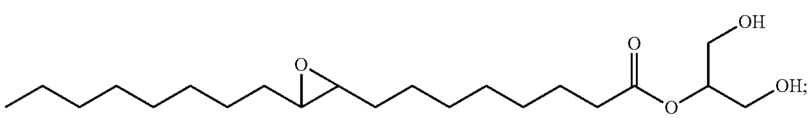
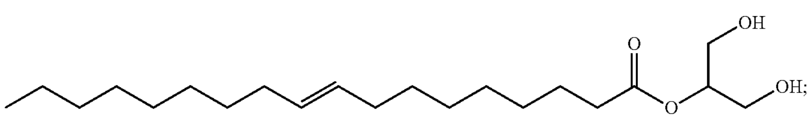
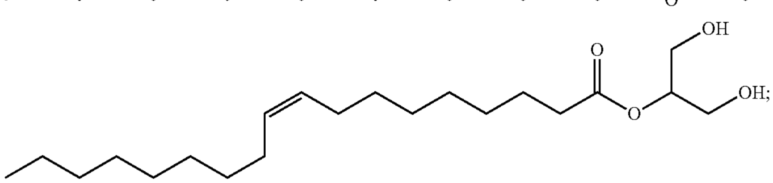
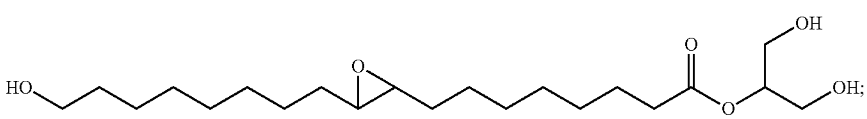
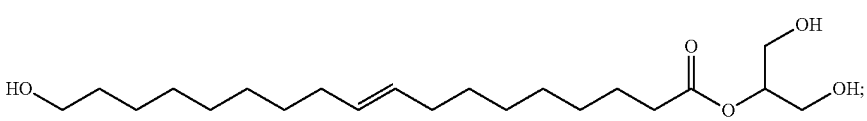
or
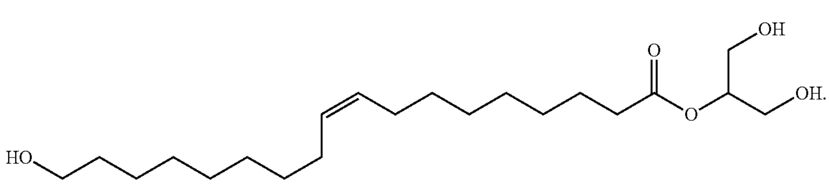 [SMILES: O=C(CCCCCCC/C=C\CCCCCCCCO)OC(CO)CO]

The coating agents herein can include one or more of the following medium chain fatty acid 1-glyceryl ester compounds (e.g., compounds of Formula I):
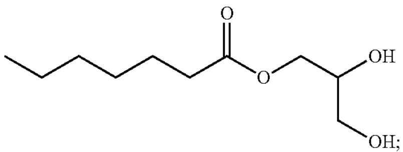
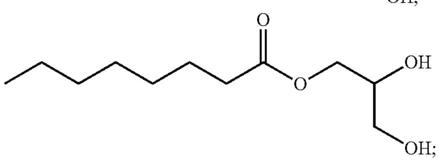
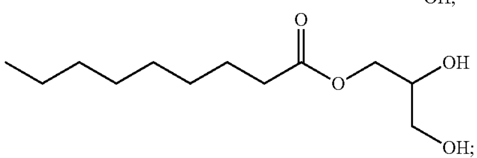
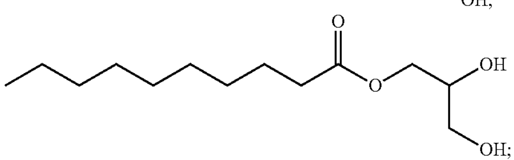
-continued
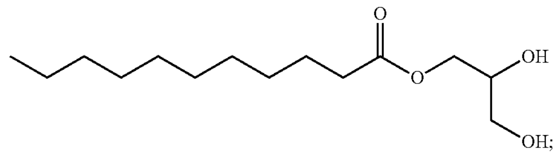
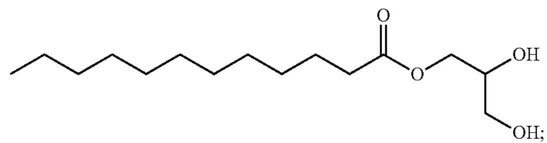
or
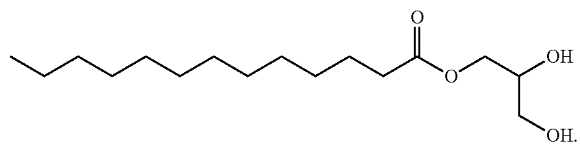
The coating agents herein can include one or more of the following long chain fatty acid 1-glyceryl ester compounds (e.g., compounds of Formula I):
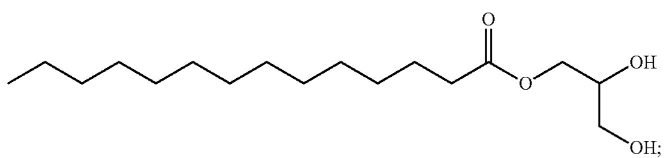
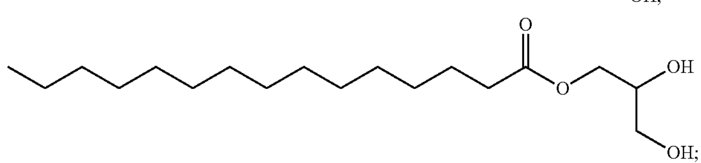
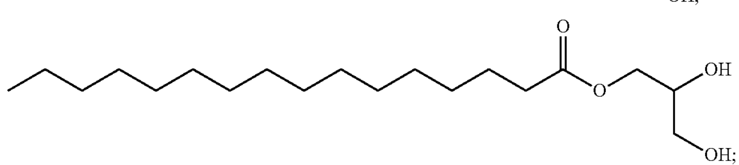
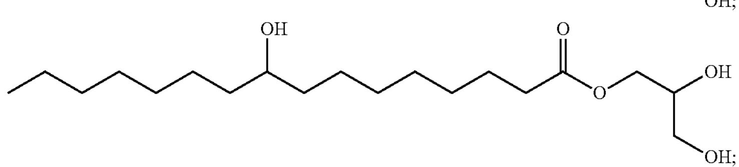
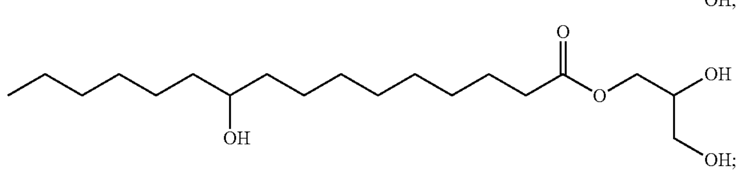
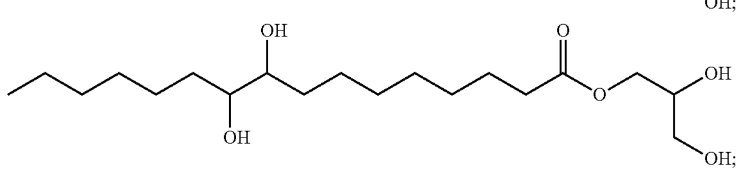

-continued
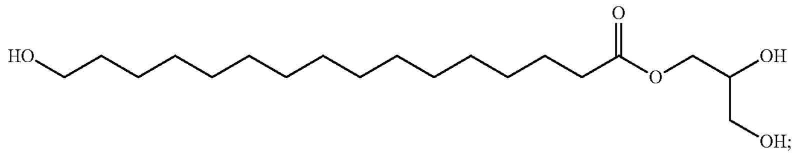
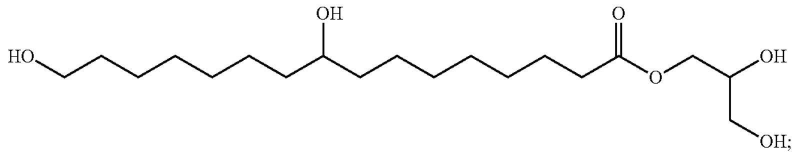
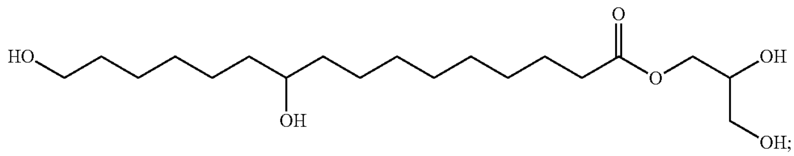
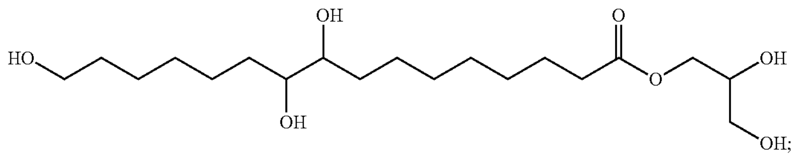
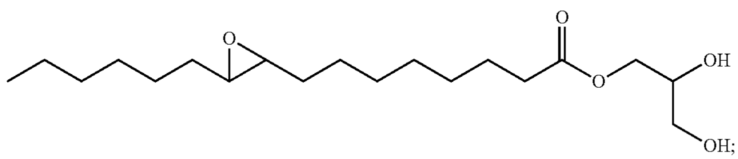
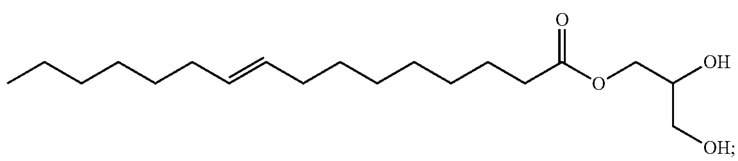
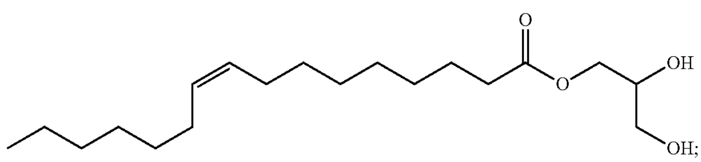
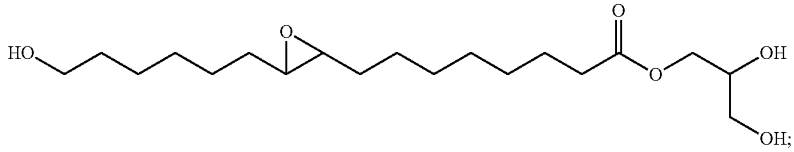
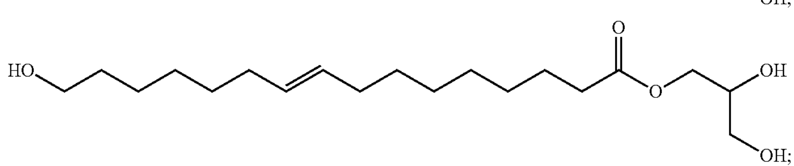
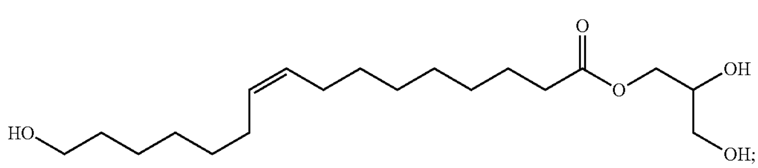
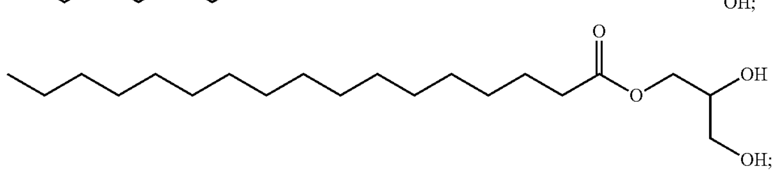

-continued
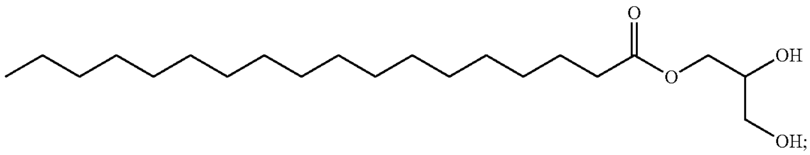
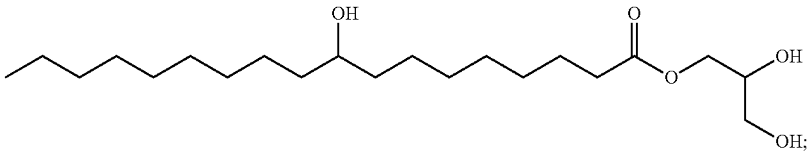
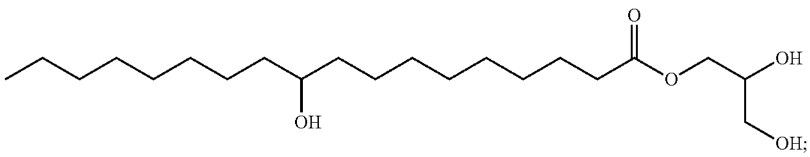
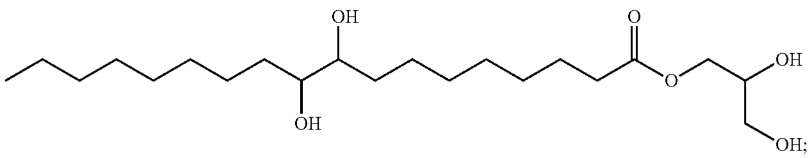
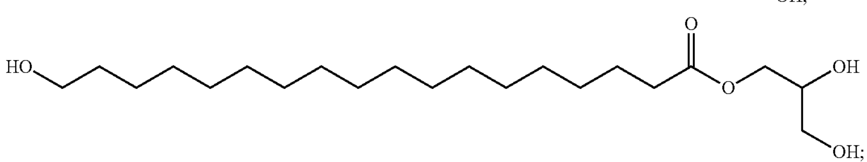
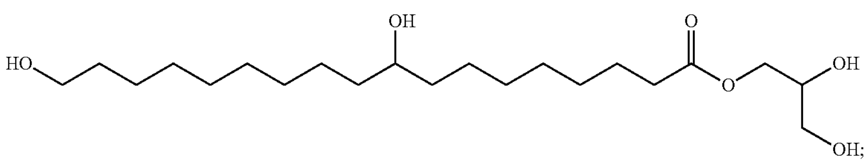
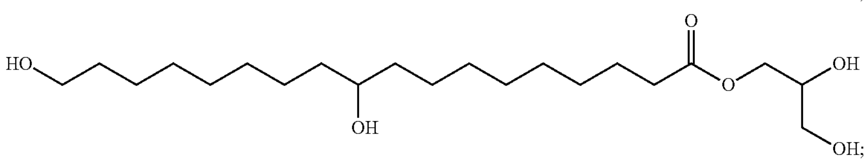
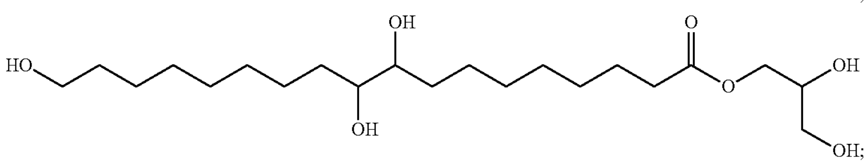
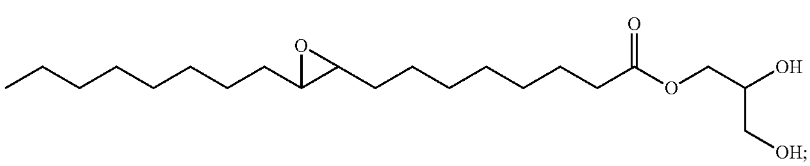
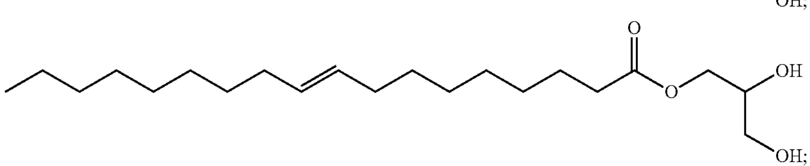
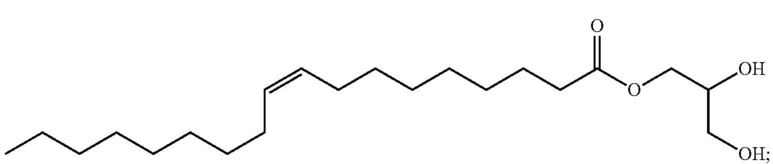

-continued
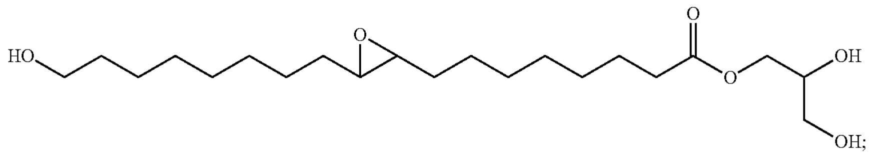
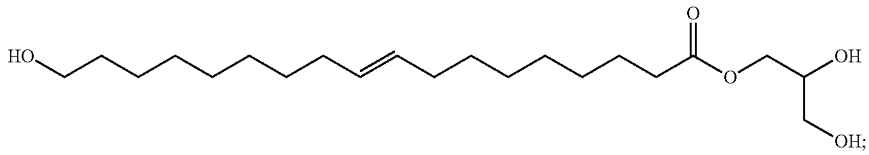
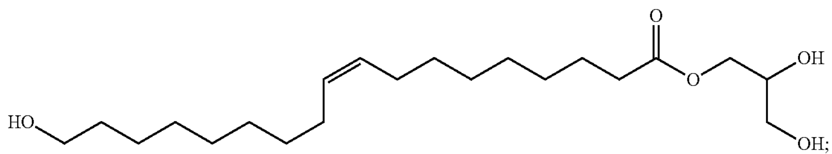
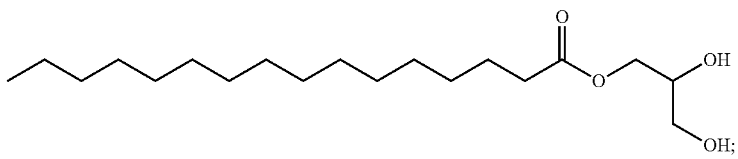
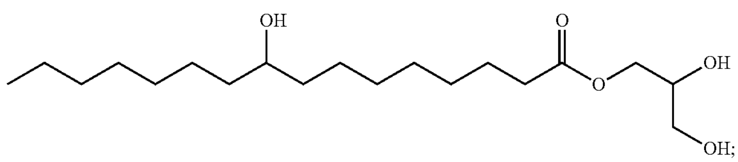
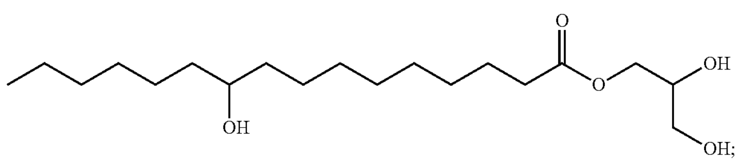
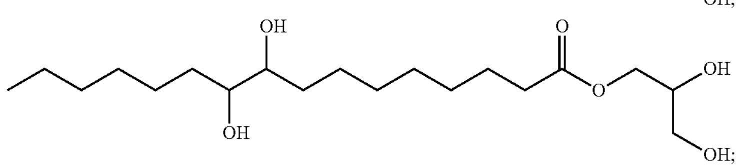
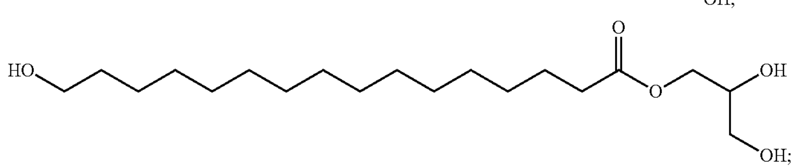
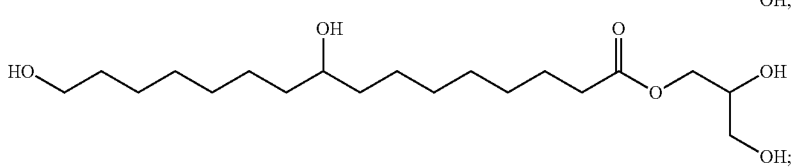
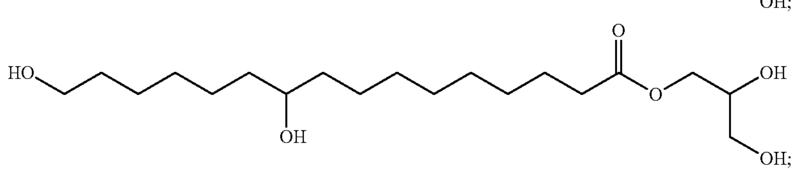
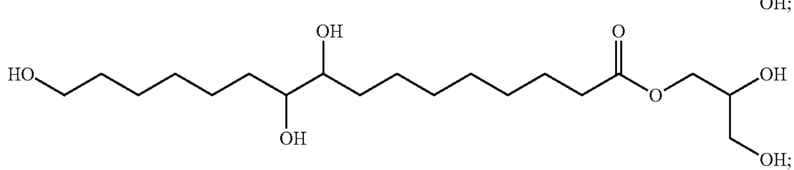

-continued
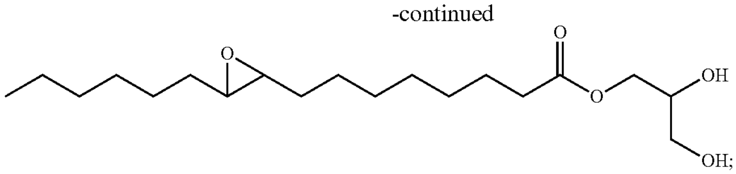
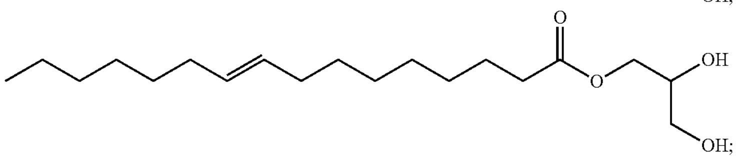
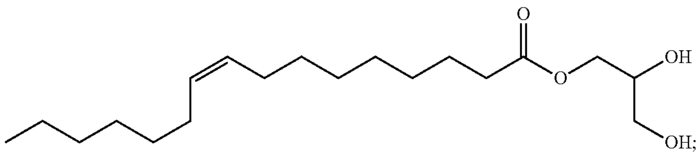
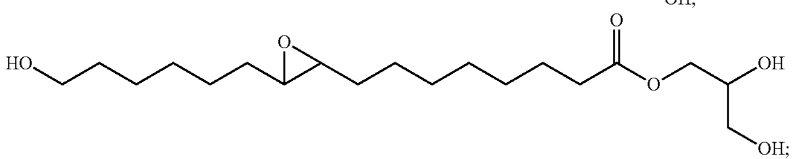
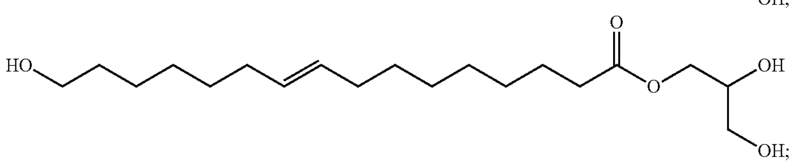
or
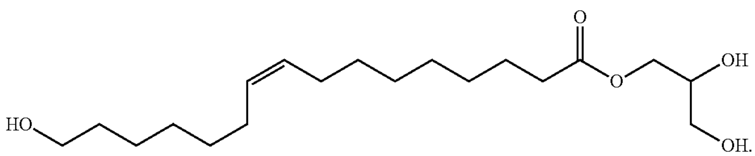 [SMILES: O=C(CCCCCCC/C=C\CCCCCCO)OCC(O)CO]
The coating agents herein can include one or more of the following fatty acid salts (e.g., compounds of Formula II or Formula III), where X is a cationic counter ion and n represents the charge state (i.e., the number of proton-equivalent charges) of the cationic counter ion:
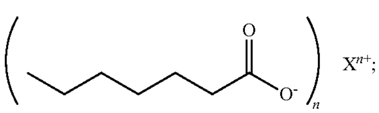
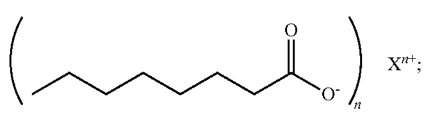
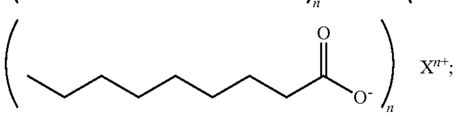
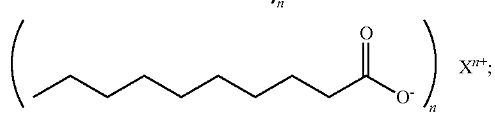
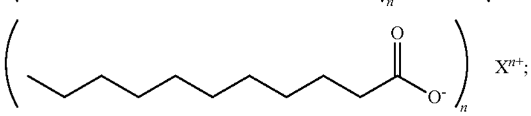
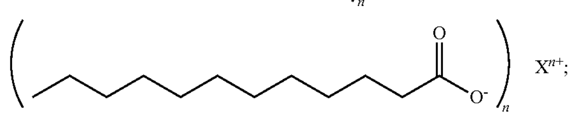
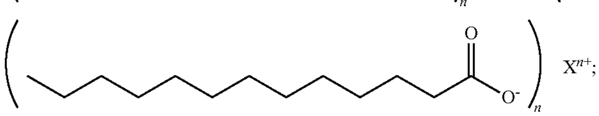
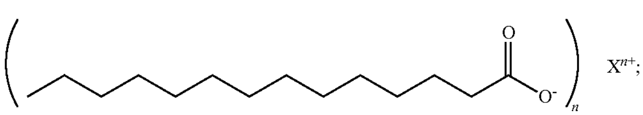

-continued
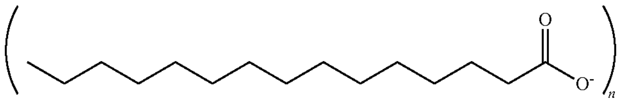
$X^{n+}$;
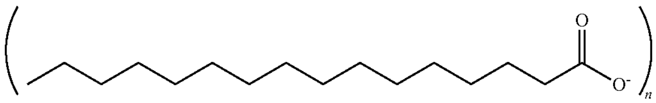
$X^{n+}$;
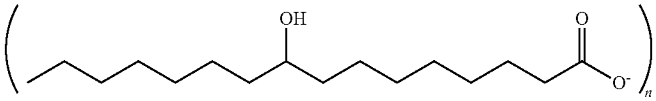
$X^{n+}$;
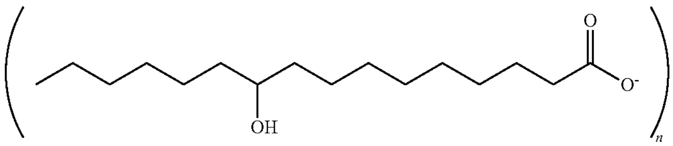
$X^{n+}$;
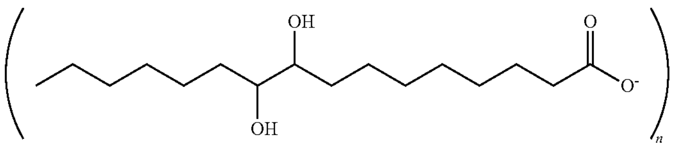
$X^{n+}$;
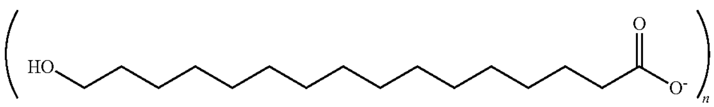
$X^{n+}$;
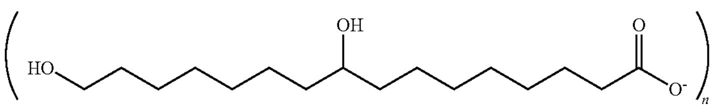
$X^{n+}$;
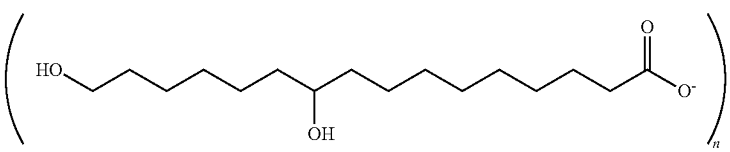
$X^{n+}$;
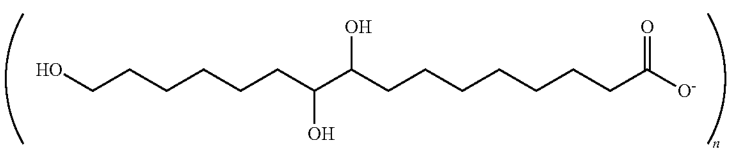
$X^{n+}$;
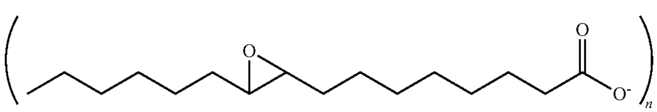
$X^{n+}$;
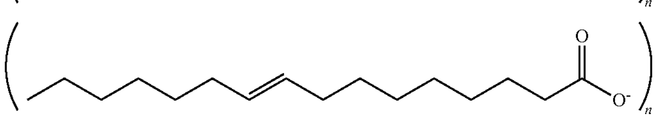
$X^{n+}$;
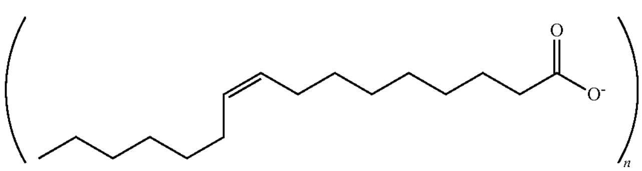
$X^{n+}$;
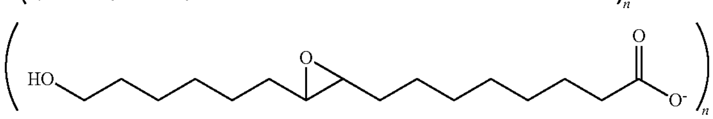
$X^{n+}$;
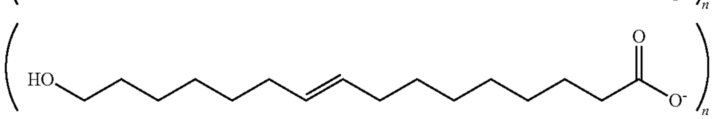
$X^{n+}$;

-continued
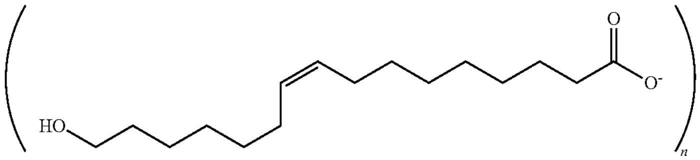
$X^{n+}$;
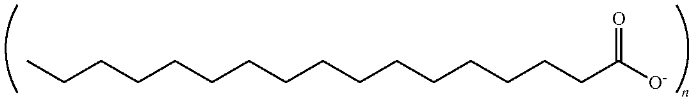
$X^{n+}$;
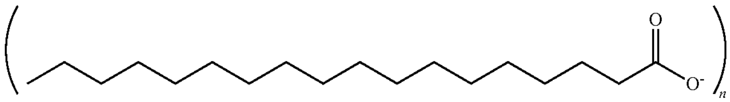
$X^{n+}$;
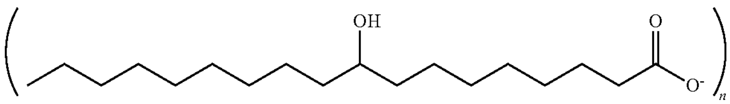
$X^{n+}$;
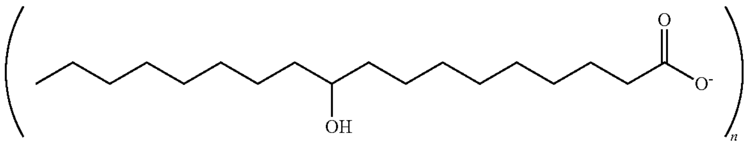
$X^{n+}$;
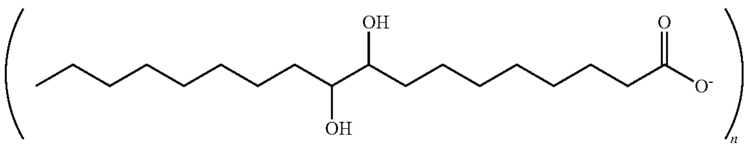
$X^{n+}$;
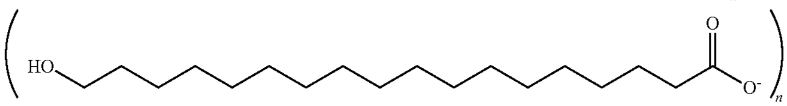
$X^{n+}$;
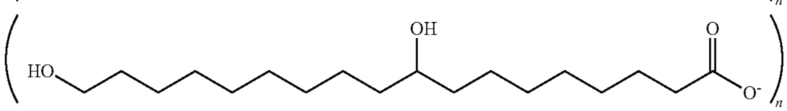
$X^{n+}$;
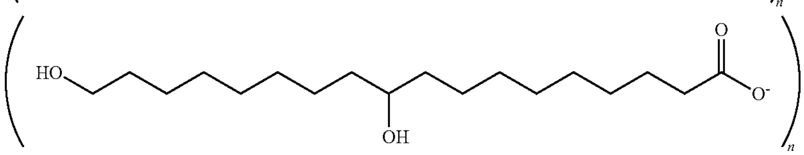
$X^{n+}$;
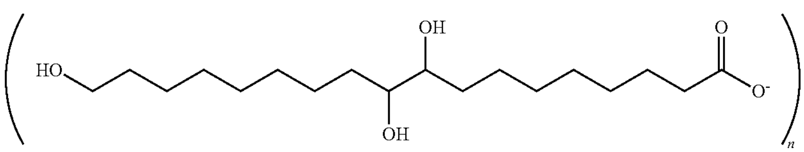
$X^{n+}$;
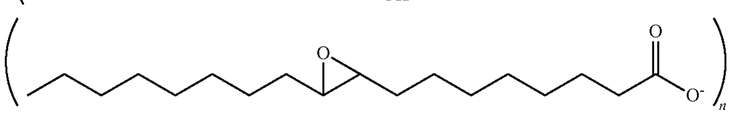
$X^{n+}$;
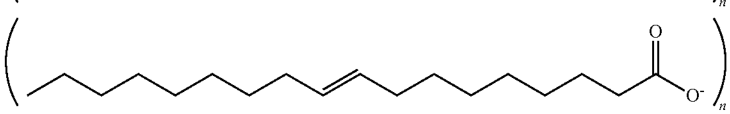
$X^{n+}$;
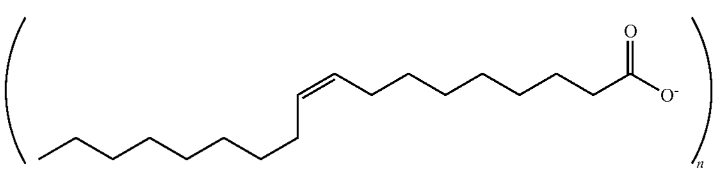
$X^{n+}$;
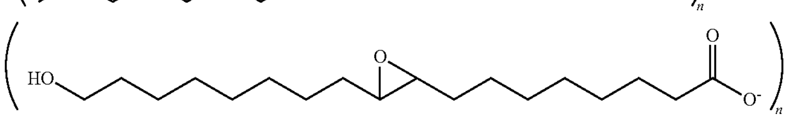
$X^{n+}$;

-continued

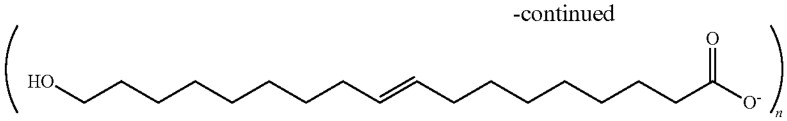

$X^{n+}$; or

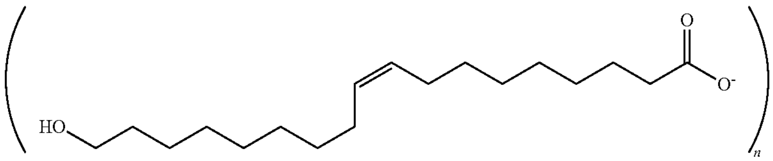

$X^{n+}$.

In some embodiments, n is 1, 2, or 3. In some embodiments, X is sodium, potassium, calcium, or magnesium.

As previously described, coating agents formed predominantly of various combinations of compounds of Formula I (e.g., coating agents that are at least 50% compounds of Formula I by mass or by molar composition) each having a carbon chain length of at least 14 have been shown to form protective coatings on produce and other agricultural products that are effective at reducing moisture loss and oxidation. As also previously described, the coatings can be formed over the outer surface of the agricultural product by dissolving, suspending, or dispersing the coating agent in a solvent to form a mixture, applying the mixture to the surface of the agricultural product (e.g., by spray coating the product, by dipping the product in the mixture, or by brushing the mixture onto the surface of the product), and then removing the solvent (e.g., by allowing the solvent to evaporate). The solvent can include any polar, non-polar, protic, or aprotic solvents, including any combinations thereof. Examples of solvents that can be used include water, methanol, ethanol, isopropanol, butanol, acetone, ethyl acetate, chloroform, acetonitrile, tetrahydrofuran, diethyl ether, methyl tert-butyl ether, any other suitable solvent or combinations thereof. In cases where the coating is going to be applied to plants or other edible products, it may be preferable to use a solvent that is safe for consumption, for example water, ethanol, or combinations thereof. Depending on the solvent that is used, the solubility limit of the coating agent in the solvent may be lower than desired for particular applications. For example, when compounds of Formula I are used as the coating agent and the solvent is water (or is predominantly water), the solubility limit of the coating agent may be relatively low. In these cases it may still be possible to add the desired concentration of coating agent to the solvent and form a suspension or colloid.

In order to improve the solubility of the coating agent in the solvent, or to allow the coating agent to be suspended or dispersed in the solvent, the coating agent can further include an emulsifier. When the coatings are to be formed over plants or other edible products, it may be preferable that the emulsifier be safe for consumption. Furthermore, it is also preferable that the emulsifier either not be incorporated into the coating or, if the emulsifier is incorporated into the coating, that it does not degrade the performance of the coating.

Through extensive experimentation, it has been shown that organic salts (e.g., compounds of Formula II or Formula III) added to the coating agent can increase the solubility of the coating agent or allow the coating agent to be suspended or dispersed in solvents having a substantial water content (e.g., solvents that are at least 50% water by volume), provided that the concentration of the salts is not too low (relative to the concentration of compounds of Formula I). Furthermore, the added salts do not substantially degrade the performance of subsequently formed coatings provided that the concentration of the salts (relative to the concentration of the compounds of Formula I) is not too high.

For example, coating agents including a first group of compounds of Formula I mixed with a second group of compounds of Formula II and/or III can be added to water to form a suspension by heating the water to about 70° C., adding the coating agent, and then cooling the resulting mixture to about room temperature (or a lower temperature). The cooled mixture can then be applied to substrates such as produce to form a protective coating, as described throughout. However, it has been found that when the compounds of Formula I make up at least 50% of the mass of the coating agent and the compounds of Formula II and/or III make up less than about 3% of the coating agent, the coating agent either cannot be suspended in the water at the elevated temperature, or the coating agent can be suspended in the water at the higher temperature but then crashes out as the temperature is reduced, thus preventing coatings from being able to be formed from the mixture.

Figure 18:
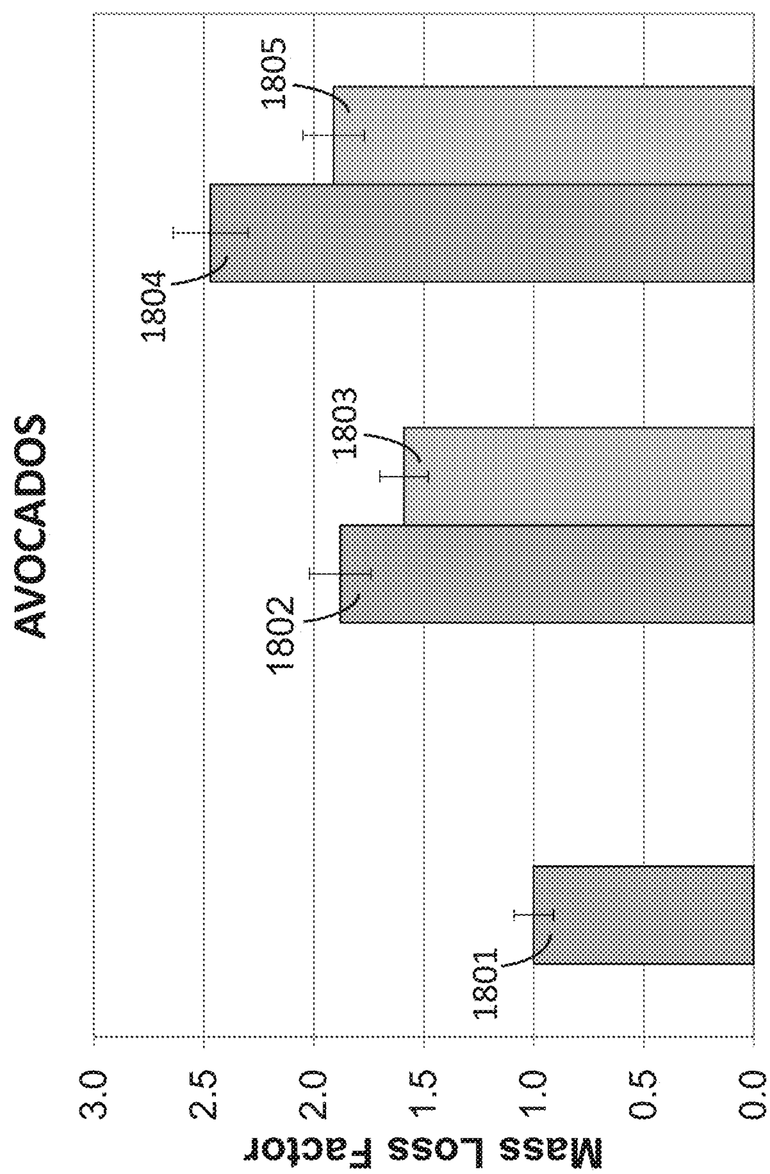
FIG. 18 shows a plot of average daily mass loss rates of avocados treated with mixtures including various combinations of fatty acid esters and fatty acid salts suspended in water.

Additionally, if the concentration of compounds of Formula II and/or III is too high, the performance of the resulting coatings can be degraded. For example, as shown in FIG. 18 and Example 13 below, coatings formed on avocados from a 94:6 mixture of compounds of Formula I (PA-1G and SA-1G) to compounds of Formula II or III (SA-Na) resulted in a mass loss factor of 1.88. However, when the study was repeated with a 70:30 mixture of the same compounds, the mass loss factor of the coated avocados was reduced to 1.59. As further shown in FIG. 18, a similar degradation in the mass loss factor with a high concentration of salts in the coating agent was observed when the compound of Formula II or III in the coating agent was MA-Na.

In view of the above, compositions (e.g., coating agents) can include a first group of compounds that includes one or more compounds of Formula I (e.g., fatty acids or esters thereof) and a second group of compounds that includes one or more salts of Formula II or Formula III (e.g., fatty acid salts). The compound(s) of Formula I and/or the salt(s) of Formula II or III can optionally have a carbon chain length of at least 14. A mass ratio of the first group of compounds (e.g., compounds of Formula I such as fatty acids or esters, including monoacylglycerides) to the second group of compounds (salts of Formula II or III, e.g., fatty acid salts) can, for example, be in a range of about 2 to 200, for example about 2 to 100, 2 to 99, 2 to 90, 2 to 80, 2 to 70, 2 to 60, 2 to 50, 2 to 40, 2 to 30, 2 to 25, 2 to 20, 2 to 15, 2 to 10, 2.5 to 200, 2.5 to 100, 2.5 to 90, 2.5 to 80, 2.5 to 70, 2.5 to 60, 2.5 to 50, 2.5 to 40, 2.5 to 30, 2.5 to 25, 2.5 to 20, 2.5 to 15, 2.5 to 10, 3 to 200, 3 to 100, 3 to 90, 3 to 80, 3 to 70, 3 to 60, 3 to 50, 3 to 40, 3 to 30, 3 to 25, 3 to 20, 3 to 15, 3 to 10, 4 to 200, 4 to 100, 4 to 90, 4 to 80, 4 to 70, 4 to 60, 4 to 50, 4 to 40, 4 to 30, 4 to 25, 4 to 20, 4 to 15, 4 to 10, 5 to 200, 5 to 100, 5 to 90, 5 to 80, 5 to 70, 5 to 60, 5 to 50, 5 to 40, 5 to 30, 5 to 25, 5 to 20, 5 to 15, 5 to 10, 10 to 100, 10 to 99, 10 to 90, 10 to 80, 10 to 70, 10 to 60, 10 to 50, 10 to 40, 10 to 30, 10 to 25, 10 to 20, 10 to 15, 15 to 100, 15 to 99, 15 to 90, 15 to 80, 15 to 70, 15 to 60, 15 to 50, 15 to 40, 15 to 30, 15 to 25, or 15 to 20.

As described above, the coating agent can be added to or dissolved, suspended, or dispersed in a solvent to form a colloid, suspension, or solution. The various components of the coating agent (e.g., the compounds of Formula I and the salts) can be combined prior to being added to the solvent and then added to the solvent together. Alternatively, the components of the coating agent can be kept separate from one another and then be added to the solvent consecutively (or at separate times).

The concentration of the first group of compounds (compounds of Formula I) in the solvent/solution/suspension/colloid can, for example, be in a range of about 1 mg/mL to about 200 mg/mL, such as about 1 to 150 mg/mL, 1 to 100 mg/mL, 1 to 90 mg/mL, 1 to 80 mg/mL, 1 to 75 mg/mL, 1 to 70 mg/mL, 1 to 65 mg/mL, 1 to 60 mg/mL, 1 to 55 mg/mL, 1 to 50 mg/mL, 1 to 45 mg/mL, 1 to 40 mg/mL, 2 to 200 mg/mL, 2 to 150 mg/mL, 2 to 100 mg/mL, 2 to 90 mg/mL, 2 to 80 mg/mL, 2 to 75 mg/mL, 2 to 70 mg/mL, 2 to 65 mg/mL, 2 to 60 mg/mL, 2 to 55 mg/mL, 2 to 50 mg/mL, 2 to 45 mg/mL, 2 to 40 mg/mL, 5 to 200 mg/mL, 5 to 150 mg/mL, 5 to 100 mg/mL, 5 to 90 mg/mL, 5 to 80 mg/mL, 5 to 75 mg/mL, 5 to 70 mg/mL, 5 to 65 mg/mL, 5 to 60 mg/mL, 5 to 55 mg/mL, 5 to 50 mg/mL, 5 to 45 mg/mL, 5 to 40 mg/mL, 10 to 200 mg/mL, 10 to 150 mg/mL, 10 to 100 mg/mL, 10 to 90 mg/mL, 10 to 80 mg/mL, 10 to 75 mg/mL, 10 to 70 mg/mL, 10 to 65 mg/mL, 10 to 60 mg/mL, 10 to 55 mg/mL, 10 to 50 mg/mL, 10 to 45 mg/mL, or 10 to 40 mg/mL.

The concentration of the second group of compounds (salts of Formula II or Formula III, e.g., fatty acid salts) in the solvent/solution/suspension/colloid can, for example, be in a range of about 0.01 mg/mL to about 80 mg/mL, such as about 0.01 to 75 mg/mL, 0.01 to 70 mg/mL, 0.01 to 65 mg/mL, 0.01 to 60 mg/mL, 0.01 to 55 mg/mL, 0.01 to 50 mg/mL, 0.01 to 45 mg/mL, 0.01 to 40 mg/mL, 0.01 to 35 mg/mL, 0.01 to 30 mg/mL, 0.01 to 25 mg/mL, 0.01 to 20 mg/mL, 0.01 to 15 mg/mL, 0.01 to 10 mg/mL, 0.1 to 80 mg/mL, 0.1 to 75 mg/mL, 0.1 to 70 mg/mL, 0.1 to 65 mg/mL, 0.1 to 60 mg/mL, 0.1 to 55 mg/mL, 0.1 to 50 mg/mL, 0.1 to 45 mg/mL, 0.1 to 40 mg/mL, 0.1 to 35 mg/mL, 0.1 to 30 mg/mL, 0.1 to 25 mg/mL, 0.1 to 20 mg/mL, 0.1 to 15 mg/mL, 0.1 to 10 mg/mL, 1 to 80 mg/mL, 1 to 75 mg/mL, 1 to 70 mg/mL, 1 to 65 mg/mL, 1 to 60 mg/mL, 1 to 55 mg/mL, 1 to 50 mg/mL, 1 to 45 mg/mL, 1 to 40 mg/mL, 1 to 35 mg/mL, 1 to 30 mg/mL, 1 to 25 mg/mL, 1 to 20 mg/mL, 1 to 15 mg/mL, 1 to 10 mg/mL, 2 to 80 mg/mL, 2 to 75 mg/mL, 2 to 70 mg/mL, 2 to 65 mg/mL, 2 to 60 mg/mL, 2 to 55 mg/mL, 2 to 50 mg/mL, 2 to 45 mg/mL, 2 to 40 mg/mL, 2 to 35 mg/mL, 2 to 30 mg/mL, 2 to 25 mg/mL, 2 to 20 mg/mL, 2 to 15 mg/mL, or 2 to 10 mg/mL.

The concentration of the composition (e.g., the coating agent) in the solvent/solution/suspension/colloid can, for example, be in a range of about 1 mg/mL to about 200 mg/mL, such as about 1 to 150 mg/mL, 1 to 100 mg/mL, 1 to 90 mg/mL, 1 to 80 mg/mL, 1 to 75 mg/mL, 1 to 70 mg/mL, 1 to 65 mg/mL, 1 to 60 mg/mL, 1 to 55 mg/mL, 1 to 50 mg/mL, 1 to 45 mg/mL, 1 to 40 mg/mL, 2 to 200 mg/mL, 2 to 150 mg/mL, 2 to 100 mg/mL, 2 to 90 mg/mL, 2 to 80 mg/mL, 2 to 75 mg/mL, 2 to 70 mg/mL, 2 to 65 mg/mL, 2 to 60 mg/mL, 2 to 55 mg/mL, 2 to 50 mg/mL, 2 to 45 mg/mL, 2 to 40 mg/mL, 5 to 200 mg/mL, 5 to 150 mg/mL, 5 to 100 mg/mL, 5 to 90 mg/mL, 5 to 80 mg/mL, 5 to 75 mg/mL, 5 to 70 mg/mL, 5 to 65 mg/mL, 5 to 60 mg/mL, 5 to 55 mg/mL, 5 to 50 mg/mL, 5 to 45 mg/mL, 5 to 40 mg/mL, 10 to 200 mg/mL, 10 to 150 mg/mL, 10 to 100 mg/mL, 10 to 90 mg/mL, 10 to 80 mg/mL, 10 to 75 mg/mL, 10 to 70 mg/mL, 10 to 65 mg/mL, 10 to 60 mg/mL, 10 to 55 mg/mL, 10 to 50 mg/mL, 10 to 45 mg/mL, or 10 to 40 mg/mL.

As also described above and demonstrated in the examples below, the coating solutions/suspensions/colloids can further include a wetting agent that serves to reduce the contact angle between the solution/suspension/colloid and the surface of the substrate being coated. The wetting agent can be included as a component of the coating agent and therefore added to the solvent at the same time as other components of the coating agent. Alternatively, the wetting agent can be separate from the coating agent and can be added to the solvent either before, after, or at the same time as the coating agent. Alternatively, the wetting agent can be separate from the coating agent, and can be applied to a surface before the coating agent in order to prime the surface.

The wetting agent can be a fatty acid or salt or ester thereof. The wetting agent can be a compound or group of compounds of Formula I, II, or III, where Formulas I, II, and III are given above. In particular, the wetting agent compounds can each have a carbon chain length of 13 or less. For example, the carbon chain length can be, 7, 8, 9, 10, 11, 12, 13, in a range of 7 to 13, or in a range of 8 to 12. The wetting agent can also or alternatively be one or more of a phospholipid, a lysophospholipid, a glycoglycerolipid, a glycolipid, an ascorbyl ester of a fatty acid, an ester of lactic acid, an ester of tartaric acid, an ester of malic acid, an ester of fumaric acid, an ester of succinic acid, an ester of citric acid, or an ester of pantothenic acid. In some embodiments, the wetting agents included in the mixtures herein are edible and/or safe for consumption.

Prior to adding the wetting agent to the solvent (and either before or after adding the coating agent for cases where the wetting agent and coating agent are separate), the contact angle between the solvent/solution/suspension/colloid and carnauba, candelilla, or paraffin wax can be at least about 70°, for example at least about 75°, at least about 80°, at least about 85°, or at least about 90°. After adding the wetting agent to the solvent (and either before or after adding the coating agent for cases where the wetting agent and coating agent are separate), the contact angle between the resulting solution/suspension/colloid and carnauba, candelilla, or paraffin wax can be less than 85°, for example less than about 80°, less than about 75°, less than about 70°, less than about 65°, less than about 60°, less than about 55°, less than about 50°, less than about 45°, less than about 40°, less than about 35°, less than about 30°, less than about 25°, less than about 20°, less than about 15°, less than about 10°, less than about 5°, or about 0°.

Because the wetting agents can in many cases damage the substrate being coated, the concentration of the wetting agent compounds can be less than that of the other components of the coating agent. However, if the concentration of the wetting agents added to the solvent is too low, the surface energy of the resulting solution/suspension/colloid may not be substantially different from that of the solvent, in which case improved surface wetting of the substrate may not be achieved.

In some embodiments, compounds used as wetting agents can also (or alternatively) be used as emulsifiers. For example, in some embodiments, a medium chain fatty acid (e.g., having a carbon chain length of 7, 8, 9, 10, 11, 12, or 13) or salt or ester thereof is used as an emulsifier (and optionally also functions as a wetting agent) in the composition, thereby enabling the composition to be dissolved or suspended in the solvent. In some embodiments, a phospholipid, a lysophospholipid, a glycoglycerolipid, a glycolipid, an ascorbyl ester of a fatty acid, an ester of lactic acid, an ester of tartaric acid, an ester of malic acid, an ester of fumaric acid, an ester of succinic acid, an ester of citric acid, or an ester of pantothenic acid is included in the composition and functions as an emulsifier (and optionally also functions as a wetting agent).

In view of the above, any of the compositions (e.g., coating agents) described herein can include a first group of compounds of Formulas I, II, and/or III (e.g., fatty acids and/or salts or esters thereof) and a second group of compounds of Formulas I, II, and/or III (e.g., fatty acids and/or salts or esters thereof), where each compound of the first group of compounds has a carbon chain length of at least 14, and each compound of the second group of compounds has a carbon chain length of 13 or less, for example in a range of 7 to 13. The first and second groups of compounds can each, for example, include ethyl esters, methyl esters, glyceryl esters (e.g., monoacylglycerides such as 1-monoacylglycerides or 2-monoacylglycerides), sodium salts of fatty acids, potassium salts of fatty acids, calcium salts of fatty acids, magnesium salts of fatty acids, or combinations thereof.

A mass ratio of the fatty acids and/or esters in the first group of compounds to the salts in the first group of compounds can be in any of the ranges given previously (e.g., a range such that the solubility of the coating agent in the solvent is sufficient to allow the desired coating agent concentration to be dissolved, suspended, or dispersed in the solvent). A mass ratio of the first group of compounds (carbon chain length of at least 14) to the second group of compounds (carbon chain length of 13 or less) can be in a range of about 2 to 200, for example about 2 to 100, 2 to 90, 2 to 80, 2 to 70, 2 to 60, 2 to 50, 2 to 40, 2 to 30, 2 to 25, 2 to 20, 2 to 15, 2 to 10, 2.5 to 200, 2.5 to 100, 2.5 to 90, 2.5 to 80, 2.5 to 70, 2.5 to 60, 2.5 to 50, 2.5 to 40, 2.5 to 30, 2.5 to 25, 2.5 to 20, 2.5 to 15, 2.5 to 10, 3 to 200, 3 to 100, 3 to 90, 3 to 80, 3 to 70, 3 to 60, 3 to 50, 3 to 40, 3 to 30, 3 to 25, 3 to 20, 3 to 15, 3 to 10, 4 to 200, 4 to 100, 4 to 90, 4 to 80, 4 to 70, 4 to 60, 4 to 50, 4 to 40, 4 to 30, 4 to 25, 4 to 20, 4 to 15, 4 to 10, 5 to 200, 5 to 100, 5 to 90, 5 to 80, 5 to 70, 5 to 60, 5 to 50, 5 to 40, 5 to 30, 5 to 25, 5 to 20, 5 to 15, or 5 to 10.

As described above, the coating agent can be added to or dissolved, suspended, or dispersed in a solvent to form a suspension, colloid, or solution. The various components of the coating agent (e.g., the compounds of Formula I, the salts of Formula II and/or III, and/or the wetting agents) can be combined prior to being added to the solvent and then added to the solvent together. Alternatively, at least some of the components of the coating agent can be kept separate from other components and can be added to the solvent consecutively (or at separate times).

The concentration of the first group of compounds (compounds of Formula I, II and/or III having a carbon chain length of at least 14) in the solvent/solution/suspension/colloid can, for example, be in a range of about 1 mg/mL to about 200 mg/mL, such as about 1 to 150 mg/mL, 1 to 100 mg/mL, 1 to 90 mg/mL, 1 to 80 mg/mL, 1 to 75 mg/mL, 1 to 70 mg/mL, 1 to 65 mg/mL, 1 to 60 mg/mL, 1 to 55 mg/mL, 1 to 50 mg/mL, 1 to 45 mg/mL, 1 to 40 mg/mL, 2 to 200 mg/mL, 2 to 150 mg/mL, 2 to 100 mg/mL, 2 to 90 mg/mL, 2 to 80 mg/mL, 2 to 75 mg/mL, 2 to 70 mg/mL, 2 to 65 mg/mL, 2 to 60 mg/mL, 2 to 55 mg/mL, 2 to 50 mg/mL, 2 to 45 mg/mL, 2 to 40 mg/mL, 5 to 200 mg/mL, 5 to 150 mg/mL, 5 to 100 mg/mL, 5 to 90 mg/mL, 5 to 80 mg/mL, 5 to 75 mg/mL, 5 to 70 mg/mL, 5 to 65 mg/mL, 5 to 60 mg/mL, 5 to 55 mg/mL, 5 to 50 mg/mL, 5 to 45 mg/mL, 5 to 40 mg/mL, 10 to 200 mg/mL, 10 to 150 mg/mL, 10 to 100 mg/mL, 10 to 90 mg/mL, 10 to 80 mg/mL, 10 to 75 mg/mL, 10 to 70 mg/mL, 10 to 65 mg/mL, 10 to 60 mg/mL, 10 to 55 mg/mL, 10 to 50 mg/mL, 10 to 45 mg/mL, or 10 to 40 mg/mL.

The concentration of wetting agents or second group of compounds of Formula I, II, and/or III (e.g., compounds of Formula I and/or salts of Formula II and/or III having a carbon chain length of 13 or less) in the solvent/solution/suspension/colloid can, for example, be about 0.01 mg/mL to about 20 mg/mL, such as about 0.01 mg/mL to 15 mg/mL, 0.01 mg/mL to 12 mg/mL, 0.01 mg/mL to 10 mg/mL, 0.01 mg/mL to 9 mg/mL, 0.01 mg/mL to 8 mg/mL, 0.01 mg/mL to 7 mg/mL, 0.01 mg/mL to 6 mg/mL, 0.01 mg/mL to 5 mg/mL, 0.1 mg/mL to 20 mg/mL, 0.1 mg/mL to 15 mg/mL, 0.1 mg/mL to 12 mg/mL, 0.1 mg/mL to 10 mg/mL, 0.1 mg/mL to 9 mg/mL, 0.1 mg/mL to 8 mg/mL, 0.1 mg/mL to 7 mg/mL, 0.1 mg/mL to 6 mg/mL, 0.1 mg/mL to 5 mg/mL, 0.5 mg/mL to 20 mg/mL, 0.5 mg/mL to 15 mg/mL, 0.5 mg/mL to 12 mg/mL, 0.5 mg/mL to 10 mg/mL, 0.5 mg/mL to 9 mg/mL, 0.5 mg/mL to 8 mg/mL, 0.5 mg/mL to 7 mg/mL, 0.5 mg/mL to 6 mg/mL, or 0.5 mg/mL to 5 mg/mL.

The composition that is added to the solvent (e.g., the coating agent) can be composed from about 50% to about 99.9% (e.g., about 60%-99.9%, 65%-99.9%, 70%-99.9%, 75%-99.9%, 80%-99.9%, 85%-99.9%, 90%-99.9%, 50%-99%, 60%-99%, 65%-99%, 70%-99%, 75%-99%, 80%-99%, 85%-99%, 90%-99%, 50%-98%, 60%-98%, 65%-98%, 70%-98%, 75%-98%, 80%-98%, 85%-98%, 90%-98%, 50%-96%, 60%-96%, 65%-96%, 70%-96%, 75%-96%, 80%-96%, 85%-96%, 90%-96%, 50%-94%, 60%-94%, 65%-94%, 70%-94%, 75%-94%, 80%-94%, 85%-94%, or 90%-94%) by mass of a first group of compounds of fatty acids, fatty acid esters, fatty acid salts, or combinations thereof (e.g., compounds of Formula I and/or salts of Formula II or Formula III), where optionally each compound of the first group optionally has a carbon chain length of at least 14. In some embodiments, the compounds of the first group are fatty acid esters, e.g., monoacylglycerides.

The composition that is added to the solvent (e.g., the coating agent) can be composed from about 0.1% to about 50% (e.g., about 0.1%-45%, 0.1%-40%, 0.1%-35%, 0.1%-30%, 0.1%-25%, 0.1%-20%, 0.1%-15%, 0.1%-10%, 0.1%-8%, 0.1%-6%, 0.1%-5%, 0.1%-4%, 0.4%-50%, 0.4%-45%, 0.4%-40%, 0.4%-35%, 0.4%-30%, 0.4%-25%, 0.4%-20%, 0.4%-15%, 0.4%-10%, 0.4%-8%, 0.4%-6%, 0.4%-5%, 0.4%-4%, 0.7%-50%, 0.7%-45%, 0.7%-40%, 0.7%-35%, 0.7%-30%, 0.7%-25%, 0.7%-20%, 0.7%-15%, 0.7%-10%, 0.7%-8%, 0.7%-6%, 0.7%-5%, 0.7%-4%, 1%-50%, 1%-45%, 1%-40%, 1%-35%, 1%-30%, 1%-25%, 1%-20%, 1%-15%, 1%-10%, 1%-8%, 1%-6%, 1%-5%, or 1%-4%) by mass of a second group of compounds of fatty acids, fatty acid esters, fatty acid salts, or combinations thereof (e.g., compounds of Formula I and/or salts of Formula II and/or III), where each compound of the second group optionally has a carbon chain length of 13 or less (e.g., a carbon chain length in a range of 7 to 13). The compounds of the second group can function as wetting agents, as previously described.

The composition that is added to the solvent (e.g., the coating agent) can be composed from about 0.1% to about 50% (e.g., about 0.1%-45%, 0.1%-40%, 0.1%-35%, 0.1%-30%, 0.1%-25%, 0.1%-20%, 0.1%-15%, 0.1%-10%, 0.1%-8%, 0.1%-6%, 0.1%-5%, 0.1%-4%, 0.4%-50%, 0.4%-45%, 0.4%-40%, 0.4%-35%, 0.4%-30%, 0.4%-25%, 0.4%-20%, 0.4%-15%, 0.4%-10%, 0.4%-8%, 0.4%-6%, 0.4%-5%, 0.4%-4%, 0.7%-50%, 0.7%-45%, 0.7%-40%, 0.7%-35%, 0.7%-30%, 0.7%-25%, 0.7%-20%, 0.7%-15%, 0.7%-10%, 0.7%-8%, 0.7%-6%, 0.7%-5%, 0.7%-4%, 1%-50%, 1%-45%, 1%-40%, 1%-35%, 1%-30%, 1%-25%, 1%-20%, 1%-15%, 1%-10%, 1%-8%, 1%-6%, 1%-5%, or 1%-4%) by mass of a third group of compounds comprised of salts of compounds of Formula II or Formula III, or fatty acid salts. Each compound of the third group can optionally have a carbon chain length greater than 13. The compounds of the third group can function as emulsifiers and, for example, increase the solubility of the coating agent, as previously described.

Any of the coating solutions/suspensions/colloids described herein can further include an antimicrobial agent, for example ethanol or citric acid. In some implementations, the antimicrobial agent is part of or a component of the solvent. Any of the coating solutions described herein can further include other components or additives such as sodium bicarbonate.

In some implementations, coatings formed from coating agents described herein over agricultural products can be configured to change the surface energy of the agricultural product. Various properties of coatings described herein can be adjusted by tuning the crosslink density of the coating, its thickness, or its chemical composition. This can, for example, be used to control the ripening of postharvest fruit or produce. For example, coatings formed from coating agents that primarily include bifunctional or polyfunctional monomer units can, for example, have higher crosslink densities than those that include monofunctional monomer units. Thus, coatings formed from bifunctional or polyfunctional monomer units can in some cases result in slower rates of ripening as compared to coatings formed from monofunctional monomer units.

In some implementations, one or more wetting agents such as those described above are used to improve the wetting of the surfaces to which the coating solutions/suspensions/colloids are applied, but the wetting agent are not included in the coating solutions/suspensions/colloids. Instead, the wetting agents are added to a second solvent (which can be the same as or different than the solvent to which the coating agent is added) to form a second mixture, and the second mixture is applied to the surface to be coated prior to applying the coating solution/suspension/colloid to the surface. In this case, the second mixture can prime the surface to be coated such that the contact angle of the coating solution/suspension/colloid with the surface is less than it would have otherwise been, thereby improving surface wetting.

Any of the coating agents described herein can further include additional materials that are also transported to the surface with the coating, or are deposited separately and are subsequently encapsulated by the coating (e.g., the coating is formed at least partially around the additional material), or are deposited separately and are subsequently supported by the coating (e.g., the additional material is anchored to the external surface of the coating). Examples of such additional materials can include cells, biological signaling molecules, vitamins, minerals, pigments, aromas, enzymes, catalysts, antifungals, antimicrobials, and/or time-released drugs. The additional materials can be non-reactive with surface of the coated product and/or coating, or alternatively can be reactive with the surface and/or coating.

In some implementations, the coating can include an additive configured, for example, to modify the viscosity, vapor pressure, surface tension, or solubility of the coating. The additive can, for example, be configured to increase the chemical stability of the coating. For example, the additive can be an antioxidant configured to inhibit oxidation of the coating. In some implementations, the additive can reduce or increase the melting temperature or the glass-transition temperature of the coating. In some implementations, the additive is configured to reduce the diffusivity of water vapor, oxygen, $CO_2$, or ethylene through the coating or enable the coating to absorb more ultra violet (UV) light, for example to protect the agricultural product (or any of the other products described herein). In some implementations, the additive can be configured to provide an intentional odor, for example a fragrance (e.g., smell of flowers, fruits, plants, freshness, scents, etc.). In some implementations, the additive can be configured to provide color and can include, for example, a dye or a US Food and Drug Administration (FDA) approved color additive.

Any of the coating agents or coatings formed thereof that are described herein can be flavorless or have high flavor thresholds, e.g. above 500 ppm, and can be odorless or have a high odor threshold. In some embodiments, the materials included in any of the coatings described herein can be substantially transparent. For example, the coating agent, the solvent, and/or any other additives included in the coating can be selected so that they have substantially the same or similar indices of refraction. By matching their indices of refraction, they may be optically matched to reduce light scattering and improve light transmission. For example, by utilizing materials that have similar indices of refraction and have a clear, transparent property, a coating having substantially transparent characteristics can be formed.

The compositions (e.g., coating agents) described herein can be of high purity. For example, the compositions can be substantially free (e.g., be less than 10% by mass, less than 9% by mass, less than 8% by mass, less than 7% by mass, less than 6% by mass, or less than 5%, 4%, 3%, 2%, or 1% by mass) of diglycerides, triglycerides, proteins, polysaccharides, phenols, lignans, aromatic acids, terpenoids, flavonoids, carotenoids, alkaloids, alcohols, alkanes, and/or aldehydes. In some embodiments, the compositions comprise less than 10% (e.g., less than 9%, 8%, 7%, 6%, 5%, 4%, 3%, 2%, or 1%) by mass of diglycerides. In some embodiments, the compositions comprise less than 10% (e.g., less than 9%, 8%, 7%, 6%, 5%, 4%, 3%, 2%, or 1%) by mass of triglycerides.

Any of the coatings described herein can be disposed on the external surface of an agricultural product or other substrate using any suitable means. For example, the substrate can be dip-coated in a bath of the coating formulation (e.g., an aqueous or mixed aqueous-organic or organic solution). The deposited coating can form a thin layer on the surface of an agricultural product, which can protect the agricultural product from biotic stressors, water loss, and/or oxidation. In some implementations, the deposited coating can have a thickness of less than 10 microns, less than 9 microns, less than 8 microns, less than 7 microns, less than 6 microns, less than 5 microns, less than 4 microns, less than 3 microns, less than 2 microns, or less than about 1500 nm, and/or the coating can be transparent to the naked eye. For example, the deposited coating can have a thickness of about 10 nm, about 20 nm, about 30 nm, about 40 nm, about 50 nm, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, 1,000 nm, about 1,100 nm, about 1,200 nm, about 1,300 nm, about 1,400 nm, about 1,500 nm, about 1,600 nm, about 1,700 nm, about 1,800 nm, about 1,900 nm, about 2,000 nm, about 2,100 nm, about 2,200 nm, about 2,300 nm, about 2,400 nm, about 2,500 nm, about 2,600 nm, about 2,700 nm, about 2,800 nm, about 2,900 nm, or about 3,000 nm, inclusive of all ranges therebetween.

In some implementations, the deposited coating can be deposited substantially uniformly over the substrate and can be free of defects and/or pinholes. In some implementations, the dip-coating process can include sequential coating of the agricultural product in baths of coating precursors that can undergo self-assembly or covalent bonding on the agricultural product to form the coating. In some implementations, the coating can be deposited on agricultural products by passing the agricultural products under a stream of the coating solution/suspension/colloid (e.g., a waterfall of the coating solution/suspension/colloid). For example, the agricultural products can be disposed on a conveyor that passes through the stream of the coating solution/suspension/colloid. In some implementations, the coating can be misted, vapor- or dry vapor-deposited on the surface of the agricultural product. In some implementations, the coating solution/suspension/colloid can be mechanically applied to the surface of the product to be coated, for example by brushing it onto the surface. In some embodiments, the coating can be configured to be fixed on the surface of the agricultural product by UV crosslinking or by exposure to a reactive gas, for example oxygen.

In some implementations, the coating solutions/suspensions/colloids can be spray-coated on the agricultural products. Commercially available sprayers can be used for spraying the coating solutions/suspensions/colloids onto the agricultural product. In some implementations, the coating formulation can be electrically charged in the sprayer before spray-coating on to the agricultural product, such that the deposited coating electrostatically and/or covalently bonds to the exterior surface of the agricultural product.

As previously described, the coatings formed from coating agents described herein can be configured to prevent water loss or other moisture loss from the coated portion of the plant, delay ripening, and/or prevent oxygen diffusion into the coated portion of the plant, for example, to reduce oxidation of the coated portion of the plant. The coatings can also serve as a barrier to diffusion of carbon dioxide and/or ethylene into or out of the plant or agricultural product. The coatings can also protect the coated portion of the plant against biotic stressors, such as, for example, bacteria, fungi, viruses, and/or pests that can infest and decompose the coated portion of the plant. Since bacteria, fungi and pests all identify food sources via recognition of specific molecules on the surface of the agricultural product, coating the agricultural products with the coating agent can deposit molecularly contrasting molecules on the surface of the portion of the plant, which can render the agricultural products unrecognizable. Furthermore, the coating can also alter the physical and/or chemical environment of the surface of the agricultural product making the surface unfavorable for bacteria, fungi or pests to grow. The coating can also be formulated to protect the surface of the portion of the plant from abrasion, bruising, or otherwise mechanical damage, and/or protect the portion of the plant from photodegradation. The portion of the plant can include, for example, a leaf, a stem, a shoot, a flower, a fruit, a root, etc.

Any of the coatings described herein can be used to protect any agricultural product. In some embodiments, the coating can be coated on an edible agricultural product, for example, fruits, vegetables, edible seeds and nuts, herbs, spices, produce, meat, eggs, dairy products, seafood, grains, or any other consumable item. In such embodiments, the coating can include components that are non-toxic and safe for consumption by humans and/or animals. For example, the coating can include components that are U.S. Food and Drug Administration (FDA) approved direct or indirect food additives, FDA approved food contact substances, satisfy FDA regulatory requirements to be used as a food additive or food contact substance, and/or is an FDA Generally Recognized as Safe (GRAS) material. Examples of such materials can be found within the FDA Code of Federal Regulations Title 21, located at "http://www.accessdata.fda.gov/scripts/cdrh/cfdocs/cfcfr/cfrsearch.cfm", the entire contents of which are hereby incorporated by reference herein. In some embodiments, the components of the coating can include a dietary supplement or ingredient of a dietary supplement. The components of the coating can also include an FDA approved food additive or color additive. In some embodiments, the coating can include components that are naturally derived, as described herein. In some embodiments, the coating can be flavorless or have a high flavor threshold of below 500 ppm, are odorless or have a high odor threshold, and/or are substantially transparent. In some embodiments, the coating can be configured to be washed off an edible agricultural product, for example, with water.

In some embodiments, the coatings described herein can be formed on an inedible agricultural product. Such inedible agricultural products can include, for example, inedible flowers, seeds, shoots, stems, leaves, whole plants, and the like. In such embodiments, the coating can include components that are non-toxic, but the threshold level for non-toxicity can be higher than that prescribed for edible products. In such embodiments, the coating can include an FDA approved food contact substance, an FDA approved food additive, or an FDA approved drug ingredient, for example, any ingredient included in the FDA's database of approved drugs, which can be found at "http://www.accessdata.fda.gov/scripts/cder/drugsatfda/index.cfm", the entire contents of which are hereby incorporated herein by reference. In some embodiments, the coating can include materials that satisfy FDA requirements to be used in drugs or are listed within the FDA's National Drug Discovery Code Directory, "http://www.accessdata.fda.gov/scripts/cder/ndc/default.cfm", the entire contents of which are hereby incorporated herein by reference. In some embodiments, the materials can include inactive drug ingredients of an approved drug product as listed within the FDA's database, "http://www.accessdata.fda.gov/scripts/cder/ndc/default.cfm", the entire contents of which are hereby incorporated herein by reference.

Embodiments of the coatings described herein provide several advantages, including, for example: (1) the coatings can protect the agricultural products from biotic stressors, i.e. bacteria, viruses, fungi, or pests; (2) the coatings can prevent evaporation of water and/or diffusion of oxygen, carbon dioxide, and/or ethylene; (3) coating can help extend the shelf life of agricultural products, for example, post-harvest produce, without refrigeration; (4) the coatings can introduce mechanical stability to the surface of the agricultural products eliminating the need for expensive packaging designed to prevent the types of bruising which accelerate spoilage; (5) use of agricultural waste materials to obtain the coatings can help eliminate the breeding environments of bacteria, fungi, and pests; (6) the coatings can be used in place of pesticides to protect plants, thereby minimizing the harmful impact of pesticides to human health and the environment; (7) the coatings can be naturally derived and hence, safe for human consumption. Since in some cases the components of the coatings described herein can be obtained from agricultural waste, such coatings can be made at a relatively low cost. Therefore, the coatings can be particularly suited for small scale farmers, for example, by reducing the cost required to protect crops from pesticides and reducing post-harvest losses of agricultural products due to decomposition by biotic and/or environmental stressors.

Due to segmentation in the marketplace, the preparation/formation of coating agents or coating solutions/suspensions/colloids and the formation of coatings over substrates from the coating solutions/suspensions/colloids are often carried out by different parties or entities. For example, a manufacturer of compositions such as coating agents described herein (i.e., a first party) can form the compositions by one or more of the methods described herein. The manufacturer can then sell or otherwise provide the resulting composition to a second party, for example a farmer, shipper, distributor, or retailer of produce, and the second party can apply the composition to one or more agricultural products to form a protective coating over the products. Alternatively, the manufacturer can sell or otherwise provide the resulting composition to an intermediary party, for example a wholesaler, who then sells or otherwise provides the composition to a second party such as a farmer, shipper, distributor, or retailer of produce, and the second party can apply the composition to one or more agricultural products to form a protective coating over the products.

In some cases where multiple parties are involved, the first party may optionally provide instructions or recommendations about the composition (i.e., the coating agent), either written or oral, indicating one or more of the following: (i) that the composition is intended to be applied to a product for the purpose of coating or protecting the product, to extend the life of the product, to reduce spoilage of the product, or to modify or improve the aesthetic appearance of the product; (ii) conditions and/or methods that are suitable for applying the compositions to the surfaces of products; and/or (iii) potential benefits (e.g., extended shelf life, reduced rate of mass loss, reduced rate of molding and/or spoilage, etc.) that can result from the application of the composition to a product. While the instructions or recommendations may be supplied by the first party directly with the plant extract composition (e.g., on packaging in which the composition is sold or distributed), the instructions or recommendations may alternatively be supplied separately, for example on a website owned or controlled by the first party, or in advertising or marketing material provided by or on behalf of the first party.

In view of the above, it is recognized that in some cases, a party that manufactures compositions (i.e., coating agents) or coating solutions/suspensions/colloids according to one or more methods described herein (i.e., a first party) may not directly form a coating over a product from the composition, but can instead direct (e.g., can instruct or request) a second party to form a coating over a product from the composition. That is, even if the first party does not coat a product by the methods and compositions described herein, the first party may still cause the coating agent or solution to be applied to the product to form a protective coating over the product by providing instructions or recommendations as described above. Accordingly, as used herein, the act of applying a coating agent or solution/suspension/colloid to a product (e.g., a plant or agricultural product) also includes directing or instructing another party to apply the coating agent or solution to the product, thereby causing the coating agent or solution to be applied to the product.

EXAMPLES

The following examples describe effects of various coating agents and solutions/suspensions/colloids on various substrates, as well as characterization of some of the various coating agents and solutions/suspensions/colloids. These examples are only for illustrative purposes and are not meant to limit the scope of the present disclosure. In each of the examples below, all reagents and solvents were purchased and used without further purification unless specified.

Figure 1:
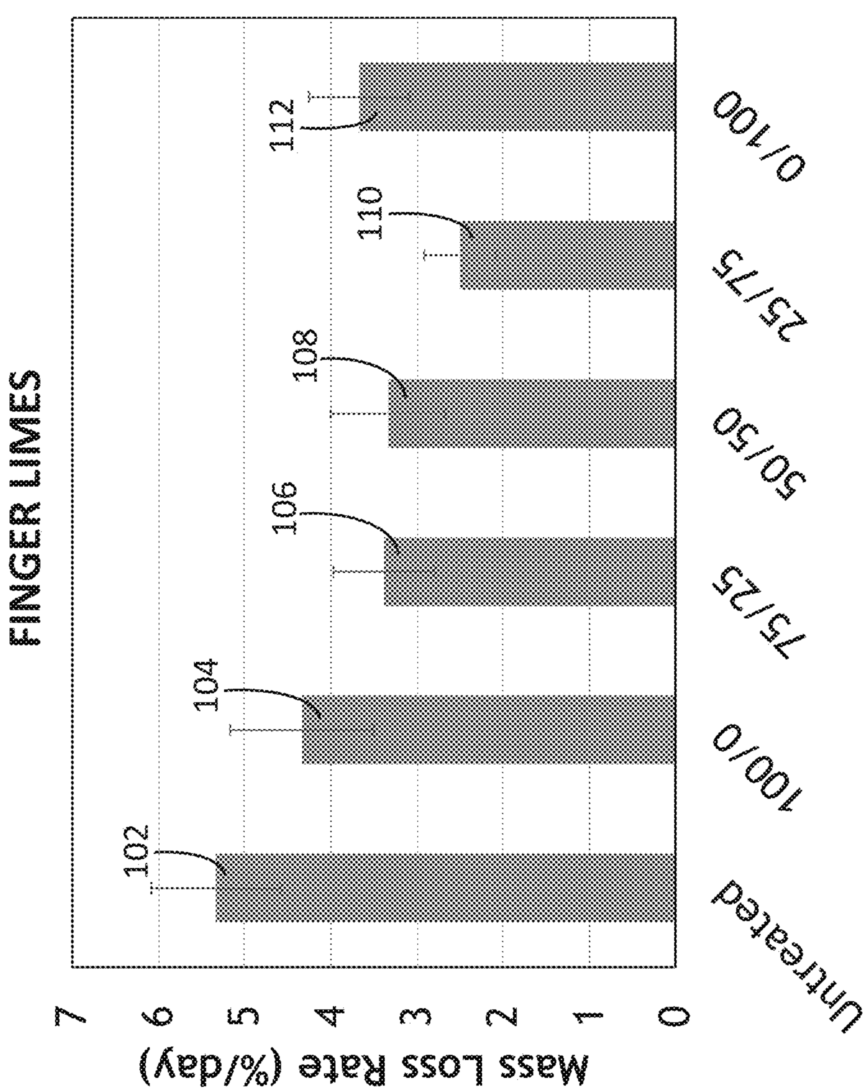
FIG. 1 shows a plot of mass loss rates per day for finger limes coated with 1-glyceryl and 2-glyceryl esters of palmitic acid.

Example 1: Effect of Coatings Formed of Long Chain Fatty Acid Esters on Mass Loss Rates of Finger Limes FIG. 1 is a graph showing average daily mass loss rates for finger limes coated with various mixtures of PA-2G and PA-1G measured over the course of several days. Each bar in the graph represents average daily mass loss rates for a group of 24 finger limes. The finger limes corresponding to bar 102 were untreated. The finger limes corresponding to bar 104 were coated with a coating agent that was substantially pure PA-1G. The finger limes corresponding to bar 106 were coated with a coating agent that was about 75% PA-1G and 25% PA-2G by mass. The finger limes corresponding to bar 108 were coated with a coating agent that was about 50% PA-1G and 50% PA-2G by mass. The finger limes corresponding to bar 110 were coated with a coating agent that was about 25% PA-1G and 75% PA-2G by mass. The finger limes corresponding to bar 112 were coated with a coating agent that was substantially pure PA-2G. The coating agents were each dissolved in ethanol at a concentration of 10 mg/mL to form solutions, and the solutions were applied to the surface of the corresponding finger limes to form the coatings.

In order to form the coatings, the finger limes were placed in bags, and the solution containing the composition was poured into the bag. The bag was then sealed and lightly agitated until the entire surface of each finger lime was wet. The finger limes were then removed from the bag and allowed to dry on drying racks. The finger limes were kept under ambient room conditions at a temperature in the range of about 23° C.-27° C. and humidity in the range of about 40%-55% while they dried and for the entire duration of the time they were tested.

As shown in FIG. 1, the untreated finger limes (102) exhibited an average mass loss rate of 5.3% per day. The mass loss rates of the finger limes coated with the substantially pure PA-1G formulation (104) and the substantially pure PA-2G formulation (112) exhibited average daily mass loss rates of 4.3% and 3.7%, respectively. The groups of finger limes corresponding to bars 106 (75:25 mass ratio of PA-1G to PA-2G) and 108 (50:50 mass ratio of PA-1G to PA-2G) both exhibited average daily mass loss rates of 3.4%. The finger limes corresponding to bar 110 (25:75 mass ratio of PA-1G to PA-2G) exhibited average daily mass loss rates of 2.5%.

Example 2: Effect of Coatings Formed of Long Chain Fatty Acids and/or Esters Thereof on Mass Loss Rates of Avocados Nine solutions using combinations of long chain fatty acid esters were prepared to examine the effects of various coating agent compositions on the mass loss rate of avocados treated with a solution composed of the coating agent dissolved in a solvent to form a coating over the avocados. Each solution was composed of the coating agents described below dissolved in ethanol at a concentration of 5 mg/mL.

The first solution contained MA-1G and PA-2G combined at a molar ratio of 1:3. The second solution contained MA-1G and PA-2G combined at a molar ratio of 1:1. The third solution contained MA-1G and PA-2G combined at a molar ratio of 3:1. The fourth solution contained PA-1G and PA-2G combined at a molar ratio of 3:1. The fifth solution contained PA-1G and PA-2G combined at a molar ratio of 1:1. The sixth solution contained PA-1G and PA-2G combined at a molar ratio of 1:3. The seventh solution contained SA-1G and PA-2G combined at a molar ratio of 1:3. The eighth solution contained SA-1G and PA-2G combined at a molar ratio of 1:1. The ninth solution contained SA-1G and PA-2G combined at a molar ratio of 3:1.

Avocados were harvested simultaneously and divided into nine groups of 30 avocados, each of the groups being qualitatively identical (i.e., all groups had avocados of approximately the same average size and quality). In order to form the coatings, the avocados were each individually dipped in one of the solutions, with each group of 30 avocados being treated with the same solution. The avocados were then placed on drying racks and allowed to dry under ambient room conditions at a temperature in the range of about 23° C.-27° C. and relative humidity in the range of about 40%-55%. The avocados were all held at these same temperature and humidity conditions for the entire duration of time they were tested.

Figure 2:
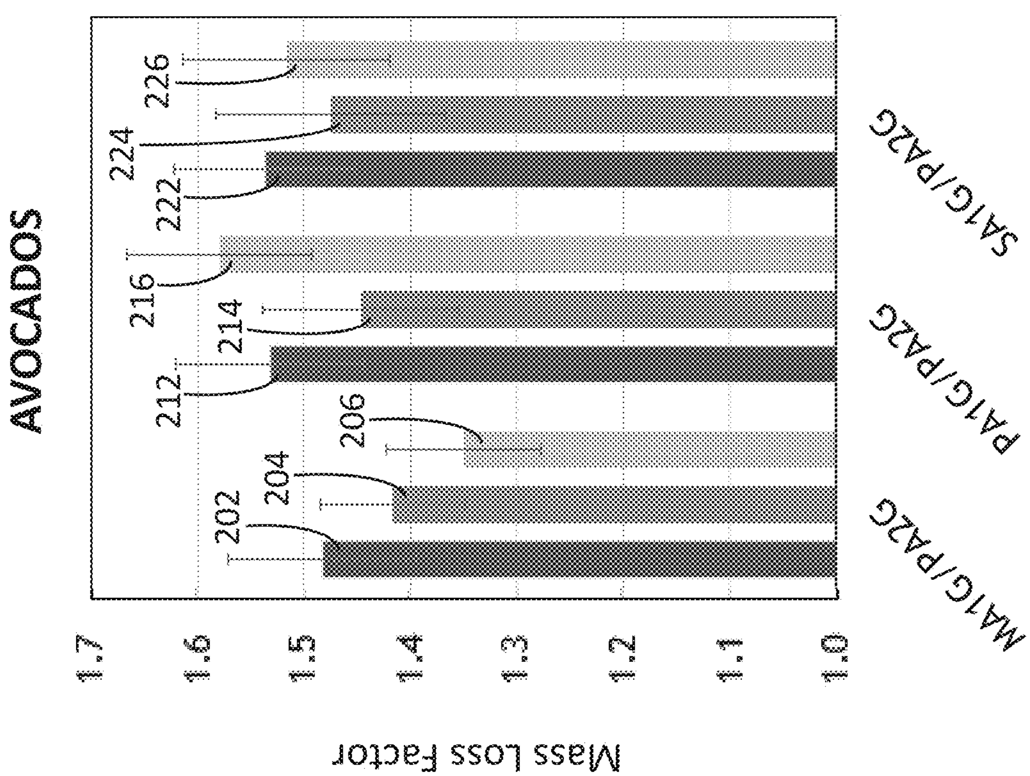
FIG. 2 shows a plot of mass loss factors for avocados coated with combinations of 1-glyceryl and 2-glyceryl esters of palmitic acid, stearic acid, and myristic acid.

FIG. 2 is a graph showing the mass loss factor for avocados coated with various solutions described above. Bars 202, 204, and 206 correspond to MA-1G and PA-2G combined at a molar ratio of about 1:3, 1:1, and 3:1 (first, second, and third solutions), respectively. Bars 212, 214, and 216 correspond to PA-1G and PA-2G combined at a molar ratio of about 1:3, 1:1, and 3:1 (fourth, fifth, and sixth solutions), respectively. Bars 222, 224, and 226 correspond to SA-1G and PA-2G combined at a molar ratio of about 1:3, 1:1, and 3:1 (seventh, eighth, and ninth solutions), respectively.

As shown in FIG. 2, treatment in the first solution (202) resulted in a mass loss factor of 1.48, treatment in the second solution (204) resulted in a mass loss factor of 1.42, treatment in the third solution (206) resulted in a mass loss factor of 1.35, treatment in the fourth solution (212) resulted in a mass loss factor of 1.53, treatment in the fifth solution (214) resulted in a mass loss factor of 1.45, treatment in the sixth solution (216) resulted in a mass loss factor of 1.58, treatment in the seventh solution (222) resulted in a mass loss factor of 1.54, treatment in the eighth solution (224) resulted in a mass loss factor of 1.47, and treatment in the ninth solution (226) resulted in a mass loss factor of 1.52.

Figure 3:
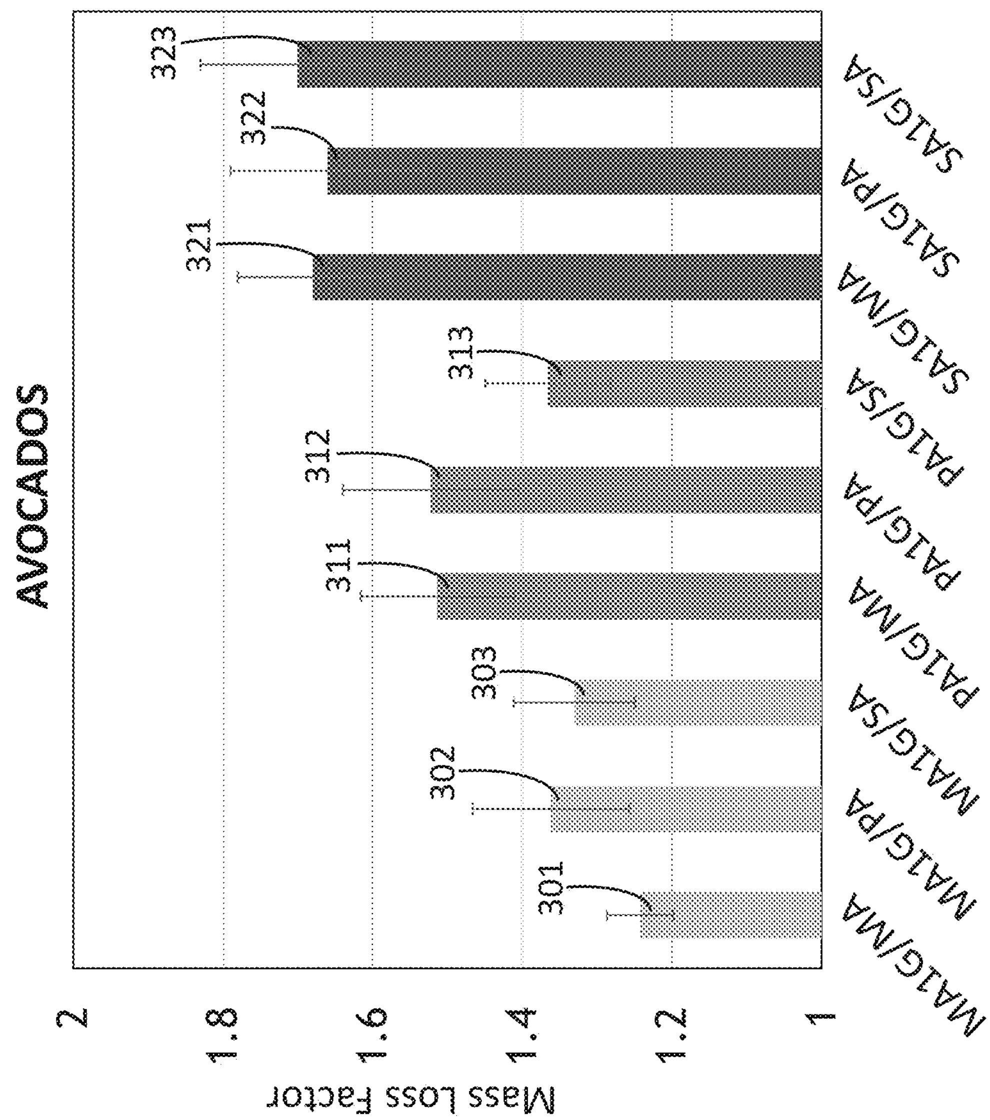
FIG. 3 shows a plot of mass loss factors for avocados coated with combinations of fatty acids (MA, PA, and SA) and glyceryl esters of fatty acids (MA-1G, PA-1G, and SA-1G).

FIG. 3 is a graph showing the mass loss factor for avocados each coated with a mixture including a long chain fatty acid ester and a long chain fatty acid. All mixtures were a 1:1 mix by mole ratio of the compound of fatty acid ester and the fatty acid. Bars 301-303 correspond to coating agents composed of MA-1G and MA (301), MA-1G and PA (302), and MA-1G and SA (303). Bars 311-313 correspond to coating agents composed of PA-1G and MA (311), PA-1G and PA (312), and PA-1G and SA (313). Bars 321-323 correspond to coating agents composed of SA-1G and MA (321), SA-1G and PA (322), and SA-1G and SA (323). Each bar in the graph represents a group of 30 avocados. All coatings were formed by dipping the avocados in a solution comprising the associated mixture dissolved in ethanol at a concentration of 5 mg/mL, placing the avocados on drying racks, and allowing the avocados to dry under ambient room conditions at a temperature in the range of about 23° C.-27° C. and humidity in the range of about 40%-55%. The avocados were held at these same temperature and humidity conditions for the entire duration of the time they were tested.

As shown, the mass loss factor tended to increase as the carbon chain length of the fatty acid ester was increased. For example, all mixtures for which the carbon chain length of the ester was greater than 13 resulted in a mass loss factor greater than 1.2, all mixtures for which the carbon chain length of the ester was greater than 15 resulted in a mass loss factor greater than 1.35, and all mixtures for which the carbon chain length of the ester was greater than 17 resulted in a mass loss factor great than 1.6.

Figure 4:
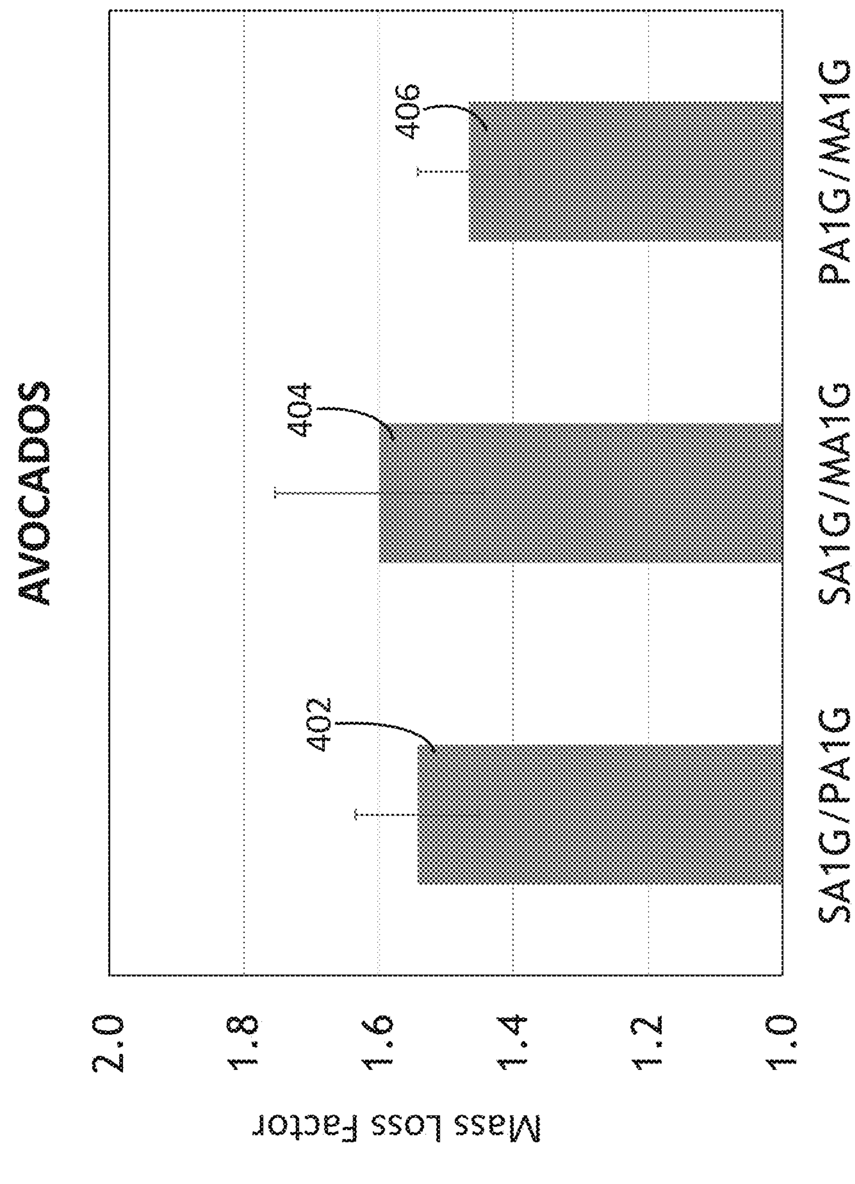
FIG. 4 shows a plot of mass loss factors for avocados coated with combinations of 1-glyceryl esters of palmitic acid, stearic acid, and myristic acid.

FIG. 4 is a graph showing the mass loss factor for avocados each coated with a coating agent including two different long chain fatty acid ester compounds mixed at a 1:1 mole ratio. Bar 402 corresponds to a mixture of SA-1G and PA-1G, bar 404 corresponds to a mixture of SA-1G and MA-1G, and bar 406 corresponds to a mixture of PA-1G and MA-1G. Each bar in the graph represents a group of 30 avocados. All coatings were formed by dipping the avocados in a solution composed of the associated mixture dissolved in ethanol at a concentration of 5 mg/mL, placing the avocados on drying racks, and allowing the avocados to dry under ambient room conditions at a temperature in the range of about 23° C.-27° C. and humidity in the range of about 40%-55%. The avocados were held at these same temperature and humidity conditions for the entire duration of the time they were tested. As shown, the PA-1G/MA-1G mixture (406) resulted in a mass loss factor of 1.47, the SA-1G/PA-1G mixture (402) resulted in a mass loss factor of 1.54, and the SA-1G/MA-1G mixture (1604) resulted in a mass loss factor of 1.60.

Example 3: Effect of Coating Agent Concentration on Mass Loss Rates of Coated Blueberries Two solutions were prepared by dissolving a coating agent formed of PA-2G and PA-1G mixed at a mass ratio of 75:25 in substantially pure ethanol. For the first solution, the coating agent was dissolved in the ethanol at a concentration of 10 mg/mL, and for the second solution, the coating agent was dissolved in the ethanol at a concentration of 20 mg/mL.

Blueberries were harvested simultaneously and divided into three groups of 60 blueberries each, each of the groups being qualitatively identical (i.e., all groups had blueberries of approximately the same average size and quality). The first group was a control group of untreated blueberries, the second group was treated with the 10 mg/mL solution, and the third group was treated with the 20 mg/mL solution.

To treat the blueberries, each blueberry was picked up with a set of tweezers and individually dipped in the solution for approximately 1 second, after which the blueberry was placed on a drying rack and allowed to dry. The blueberries were kept under ambient room conditions at a temperature in the range of 23° C.-27° C. and humidity in the range of 40%-55% while they dried and for the entire duration of the time they were tested. Mass loss was measured by carefully weighing the blueberries each day, where the reported percent mass loss was equal to the ratio of mass reduction to initial mass.

Figure 6:
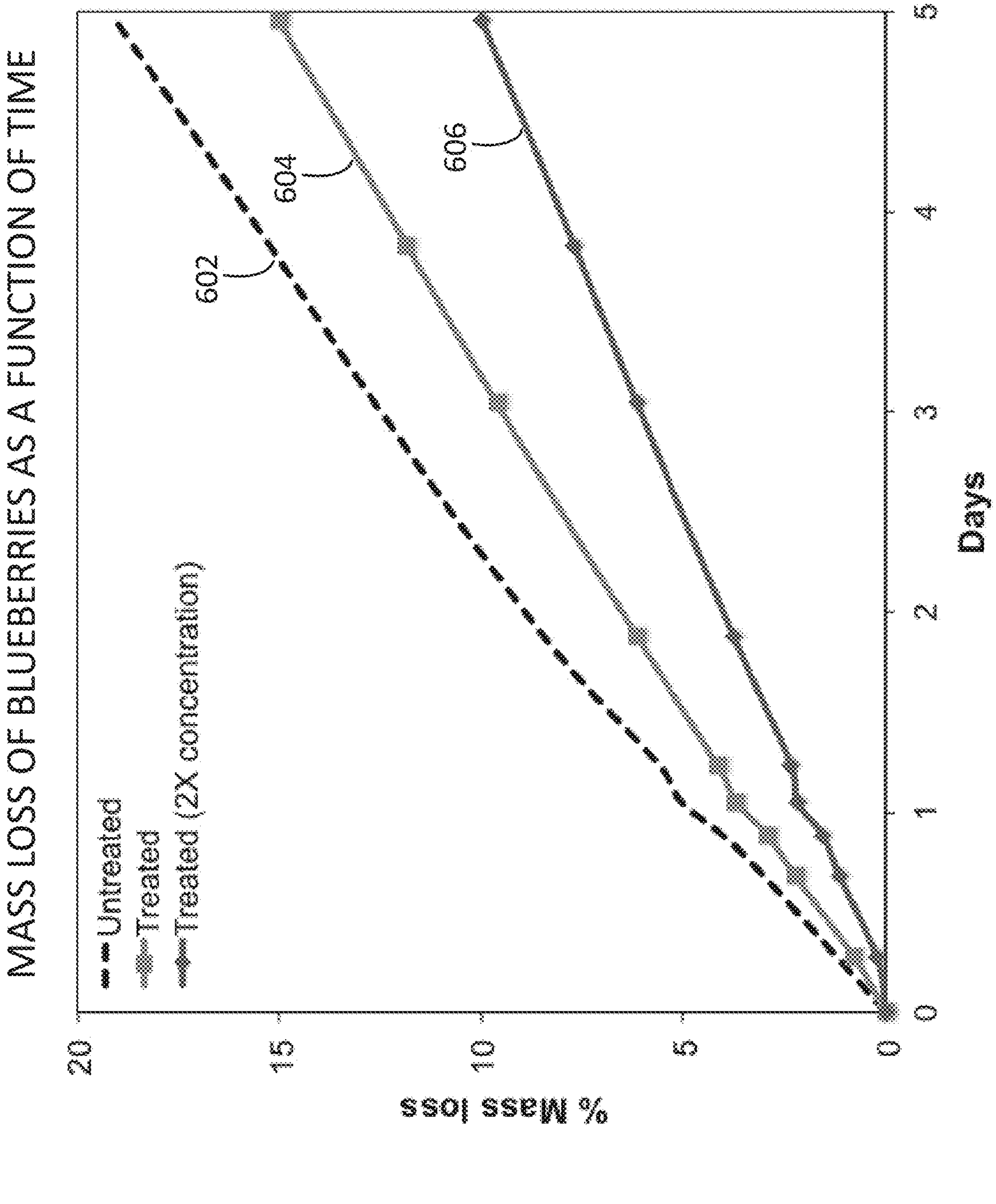
FIG. 6 is a plot of percent mass loss of both treated and untreated blueberries over the course of 5 days.

FIG. 6 shows plots of the percent mass loss over the course of 5 days in untreated (control) blueberries (602), blueberries treated using the first solution of 10 mg/mL (604), and blueberries treated using the second solution of 20 mg/mL (606). As shown, the percent mass loss for untreated blueberries was 19.2% after 5 days, whereas the percent mass loss for blueberries treated with the 10 mg/mL solution was 15% after 5 days, and the percent mass loss for blueberries treated with the 20 mg/mL solution was 10% after 5 days.

Example 4: Effect of Coatings Formed of Esters and Salts of Long Chain Fatty Acids on Mass Loss Rates of Lemons FIG. 7 is a graph showing the mass loss factor for lemons each coated with a coating agent including SA-1G and SA-Na mixed at a 4:1 mass ratio. Bar 702 corresponds to untreated lemons (control group), bar 704 corresponds to lemons treated with a suspension composed of the coating agent suspended in water at a concentration of 10 mg/mL, bar 706 corresponds to lemons treated with a suspension composed of the coating agent suspended in water at a concentration of 20 mg/mL, bar 708 corresponds to lemons treated with a suspension composed of the coating agent suspended in water at a concentration of 30 mg/mL, bar 710 corresponds to lemons treated with a suspension composed of the coating agent suspended in water at a concentration of 40 mg/mL, and bar 712 corresponds to lemons treated with a suspension composed of the coating agent suspended in water at a concentration of 50 mg/mL.

Each bar in the graph represents a group of 90 lemons. All coatings were formed by dipping the lemons in their associated suspension, placing the lemons on drying racks, and allowing the lemons to dry under ambient room conditions at a temperature in the range of about 23° C.-27° C. and humidity in the range of about 40%-55%. The lemons were held at these same temperature and humidity conditions for the entire duration of the time they were tested. As seen in FIG. 7, the mass loss factor for the lemons treated with the 10 mg/mL solution (704) was 1.83, the mass loss factor for the lemons treated with the 20 mg/mL solution (706) was 1.75, the mass loss factor for the lemons treated with the 30 mg/mL solution (708) was 1.90, the mass loss factor for the lemons treated with the 40 mg/mL solution (710) was 1.78, and the mass loss factor for the lemons treated with the 50 mg/mL solution (712) was 1.83.

Example 5: Effect of Coatings Formed of Esters/Salts of Long Chain Fatty Acids and Esters of Medium Chain Esters on Mass Loss Rates of Lemons FIG. 8 is a graph showing mass loss factors of lemons treated with various coating agents suspended in water. Bar 802 corresponds to untreated lemons. Bar 804 corresponds a coating agent formed of SA-1G and MA-Na mixed at a 95:5 mass ratio and added to the water at a concentration of 10 mg/mL. Bar 806 corresponds a coating agent formed of SA-1G and MA-Na mixed at a 95:5 mass ratio and added to the water at a concentration of 30 mg/mL. Bar 808 corresponds a coating agent formed of 10 mg/mL of SA-1G and MA-Na (mixed at a 95:5 mass ratio) and 5 mg/mL of UA-1G suspended in water. Bar 810 corresponds to a coating agent formed of 30 mg/mL of SA-1G and MA-Na (mixed at a 95:5 mass ratio) and 5 mg/mL of UA-1G suspended in water.

Each bar in the graph represents a group of 60 lemons. All coatings were formed by dipping the lemons in their associated solution, placing the lemons on drying racks, and allowing the lemons to dry under ambient room conditions at a temperature in the range of about 23° C.-27° C. and humidity in the range of about 40%-55%. The lemons were held at these same temperature and humidity conditions for the entire duration of the time they were tested. As seen in FIG. 8, the mass loss factor for the lemons corresponding to bar 804 was 1.50, the mass loss factor for the lemons corresponding to bar 806 was 1.68, the mass loss factor for the lemons corresponding to bar 808 was 1.87, and the mass loss factor for the lemons corresponding to bar 810 was 2.59.

Example 6: Contact Angles of Solvents and Mixtures on the Surfaces of Lemons

FIG. 10 shows a graph of contact angles of various solvents or mixtures on the surfaces of non-waxed lemons. Contact angles were determined by placing drops containing 5 microliters of solvent/mixture on the surface of a lemon and determining the contact angle by digital image analysis. Each bar in the graph represents measurements of 15-20 drops. For bar 1002, the solvent was pure water (control sample). For bar 1004, the mixture included SA-1G and MA-Na combined at a mass ratio of 95:5 and dispersed in water at a concentration of 30 mg/mL. The mixtures corresponding to bars 1006, 1008, 1010, 1012, 1014, and 1016 were the same as that of bar 1004 but also included small concentrations of CA-1G. Bar 1006 included 0.1 mg/mL of CA-1G, bar 1008 included 0.5 mg/mL of CA-1G, bar 1010 included 1 mg/mL of CA-1G, bar 1012 included 2 mg/mL of CA-1G, bar 1014 included 4 mg/mL of CA-1G, and bar 1016 included 6 mg/mL of CA-1G.

As seen in FIG. 10, the drops corresponding to bar 1002 (pure water) exhibited an average contact angle of 88° on lemons. The drops corresponding to bar 1004 (SA-1G/MA-Na in water) exhibited an average contact angle of 84° on lemons. The drops corresponding to bar 1006 (addition of 0.1 mg/mL of CA-1G) exhibited an average contact angle of 70° on lemons. The drops corresponding to bar 1008 (addition of 0.5 mg/mL of CA-1G) exhibited an average contact angle of 68° on lemons. The drops corresponding to bar 1010 (addition of 1 mg/mL of CA-1G) exhibited an average contact angle of 65° on lemons. The drops corresponding to bar 1012 (addition of 2 mg/mL of CA-1G) exhibited an average contact angle of 58° on lemons. The drops corresponding to bar 1014 (addition of 4 mg/mL of CA-1G) exhibited an average contact angle of 56° on lemons. The drops corresponding to bar 1016 (addition of 6 mg/mL of CA-1G) exhibited an average contact angle of 47° on lemons.

Example 7: Dependence on Carbon Chain Length of Surfactant on Contact Angles of Mixtures on the Surfaces of Lemons FIG. 11 shows a graph of contact angles of various mixtures on the surfaces of non-waxed lemons. Contact angles were determined by placing drops containing 5 microliters of the mixture on the surface of a lemon and determining the contact angle by digital image analysis. Each bar in the graph represents measurements of 15-20 drops. For bar 1102, the solvent was pure water (control sample). For bar 1104, the mixture included SA-1G and MA-Na combined at a mass ratio of 95:5 and dispersed in water at a concentration of 30 mg/mL. The suspensions corresponding to bars 1106, 1108, and 1110 were the same as that of bar 1104 but also included 4 mg/mL of a medium chain fatty acid ester. For bar 1106 the medium chain fatty acid ester was LA-1G (carbon chain length of 12), for bar 1108 the medium chain fatty acid ester was UA-1G (carbon chain length of 11), and for bar 1110 the medium chain fatty acid ester was CA-1G (carbon chain length of 10).

As seen in FIG. 11, the drops corresponding to bar 1102 (pure water) exhibited an average contact angle of 88° on lemons. The drops corresponding to bar 1104 (SA-1G/MA-Na in water) exhibited an average contact angle of 84° on lemons. The drops corresponding to bar 1106 (addition of 4 mg/mL of LA-1G) exhibited an average contact angle of 67° on lemons. The drops corresponding to bar 1108 (addition of 4 mg/mL of UA-1G) exhibited an average contact angle of 56° on lemons. The drops corresponding to bar 1110 (addition of 1 mg/mL of CA-1G) exhibited an average contact angle of 50° on lemons.

Example 8: Contact Angles of Solvents and Mixtures on the Surfaces of Lemons, Candelilla Wax, and Carnauba Wax FIG. 12 shows a graph of contact angles of various solvents and mixtures on the surfaces of non-waxed lemons (1201-1203), candelilla wax (1211-1213), and carnauba wax (1221-1223). Contact angles were determined by placing drops containing 5 microliters of solution on the surface being tested and determining the contact angle by digital image analysis. Each bar in the graph represents measurements of 15-20 drops. For bars 1201, 1211, and 1221, the solvent was pure water (control sample). The second group of bars (1202, 1212, and 1222) correspond to 30 mg/mL of SA-1G and SA-Na combined at a mass ratio of 94:6, as well as 0.25 mg/mL of citric acid and 0.325 mg/mL of sodium bicarbonate dispersed in water. The third group of bars (1203, 1213, and 1223) correspond to a mixture which was the same as that of the second group of bars but also included 3 mg/mL of CA-1G.

As seen in FIG. 12, the drops corresponding to bar 1201 exhibited an average contact angle of 92° on lemons. The drops corresponding to bar 1202 exhibited an average contact angle of 105° on candelilla wax. The drops corresponding to bar 1203 exhibited an average contact angle of 96° on carnauba wax. The drops corresponding to bar 1211 exhibited an average contact angle of 80° on lemons. The drops corresponding to bar 1212 exhibited an average contact angle of 87° on candelilla wax. The drops corresponding to bar 1213 exhibited an average contact angle of 88° on carnauba wax. The drops corresponding to bar 1221 exhibited an average contact angle of 44° on lemons. The drops corresponding to bar 1222 exhibited an average contact angle of 31° on candelilla wax. The drops corresponding to bar 1223 exhibited an average contact angle of 32° on carnauba wax.

Example 9: Effect of Adding Medium Chain Fatty Acid Esters to Coating Mixtures Used to Form Protective Coatings Over Avocados FIG. 13 shows the mass loss factor for groups of avocados that were coated with a coating agent including SA-1G and MA-Na mixed with various concentrations of CA-1G or LA-1G. Coatings were formed by adding each coating agent in water at the specified concentration to form a mixture, applying the mixture to the surface of the avocados, and allowing the solvent to evaporate. Bar 1301 corresponds to untreated avocados (control group). Bar 1302 corresponds to a coating agent including SA-1G and MA-Na combined at a mass ratio of 94:6 and added to water at a concentration of 30 mg/mL. For bars 1303 and 1313, the mixture was the same as that for bar 1302, except that 1 mg/mL of CA-1G (bar 1303) or LA-1G (bar 1313) was also added. For bars 1304 and 1314, the mixture was the same as that for bar 1302, except that 2.5 mg/mL of CA-1G (bar 1304) or LA-1G (bar 1314) was also added. For bars 1305 and 1315, the mixture was the same as that for bar 1302, except that 4 mg/mL of CA-1G (bar 1305) or LA-1G (bar 1315) was also added. Each bar in the graph represents a group of 30 avocados. All coatings were formed by dipping the avocados in their associated mixture, placing the avocados on drying racks, and allowing the avocados to dry under ambient room conditions at a temperature in the range of about 23° C.-27° C. and humidity in the range of about 40%-55%. The avocados were held at these same temperature and humidity conditions for the entire duration of the time they were tested.

As seen in FIG. 13, the average mass loss factor for the avocados corresponding to bar 1302 (no medium chain fatty acid esters) was 1.78. For mixtures including small concentrations of CA-1G (bars 1303-1305), the average mass loss factors of the coated avocados were 2.35 for bar 1303 (CA-1G concentration of 1 mg/mL), 2.24 for bar 1304 (CA-1G concentration of 2.5 mg/mL), and 2.18 for bar 1305 (CA-1G concentration of 4 mg/mL). For mixtures including small concentrations of LA-1G (bars 1313-1315), the average mass loss factors of the coated avocados were 1.61 for bar 1313 (LA-1G concentration of 1 mg/mL), 2.15 for bar 1314 (LA-1G concentration of 2.5 mg/mL), and 2.15 for bar 1315 (LA-1G concentration of 4 mg/mL).

Example 10: Effect of Adding CA-1G to Coating Mixtures Used to Form Protective Coatings Over Cherries FIG. 14 shows the mass loss factor for groups of cherries (Bing variety) that were coated with a coating agent including SA-1G and MA-Na mixed with various concentrations of CA-1G. Coatings were formed by dissolving each coating agent in water at the specified concentration to form a solution, applying the solution to the surface of the cherries, and allowing the solvent to evaporate. Bar 1401 corresponds to untreated cherries (control group). Bar 1402 corresponds to a coating agent including SA-1G and MA-Na combined at a mass ratio of 94:6 and suspended in water at a concentration of 40 mg/mL. For bar 1403, the suspension was the same as that for bar 1402, except that 0.5 mg/mL of CA-1G was also added. For bar 1404, the suspension was the same as that for bar 1402, except that 1 mg/mL of CA-1G was also added. For bar 1405, the suspension was the same as that for bar 1402, except that 3 mg/mL of CA-1G was also added. Each bar in the graph represents a group of 90 cherries. All coatings were formed by dipping the cherries in their associated suspension, placing the cherries on drying racks, and allowing the cherries to dry under ambient room conditions at a temperature in the range of about 23° C.-27° C. and humidity in the range of about 40%-55%. The cherries were held at these same temperature and humidity conditions for the entire duration of the time they were tested.

As seen in FIG. 14, the average mass loss factor for the cherries corresponding to bar 1402 (no medium chain fatty acid esters) was 1.60. For suspensions including small concentrations of CA-1G (bars 1403-1405), the average mass loss factors of the coated cherries were 1.75 for bar 1403 (CA-1G concentration of 0.5 mg/mL), 1.96 for bar

1404 (CA-1G concentration of 1 mg/mL), and 2.00 for bar 1405 (CA-1G concentration of 3 mg/mL).

Example 11: Effect of Adding UA-1G to Coating Mixtures Used to Form Protective Coatings Over Finger Limes FIG. 15 shows the mass loss factor for groups of finger limes that were coated with a coating agent including SA-1G and SA-Na mixed with various concentrations of UA-1G. Coatings were formed by adding each coating agent to water at the specified concentration to form a suspension, applying the suspension to the surface of the finger limes, and allowing the solvent to evaporate. Bar 1501 corresponds to untreated finger limes (control group). Bar 1502 corresponds to a coating agent including SA-1G and SA-Na combined at a mass ratio of 94:6 and suspended in water at a concentration of 30 mg/mL. For bar 1503, the suspension was the same as that for bar 1502, except that 1 mg/mL of UA-1G was also added. For bar 1504, the suspension was the same as that for bar 1502, except that 3 mg/mL of UA-1G was also added. For bar 1505, the suspension was the same as that for bar 1502, except that 5 mg/mL of UA-1G was also added. Each bar in the graph represents a group of 48 finger limes. All coatings were formed by dipping the finger limes in their associated suspension, placing the finger limes on drying racks, and allowing the finger limes to dry under ambient room conditions at a temperature in the range of about 23° C.-27° C. and humidity in the range of about 40%-55%. The finger limes were held at these same temperature and humidity conditions for the entire duration of the time they were tested.

As seen in FIG. 15, the average mass loss factor for the finger limes corresponding to bar 1502 (no medium chain fatty acid esters) was 1.61. For suspensions including small concentrations of UA-1G (bars 1503-1505), the average mass loss factors of the coated finger limes were 2.33 for bar 1503 (UA-1G concentration of 1 mg/mL), 2.06 for bar 1504 (UA-1G concentration of 3 mg/mL), and 1.93 for bar 1505 (UA-1G concentration of 5 mg/mL).

Figure 16:
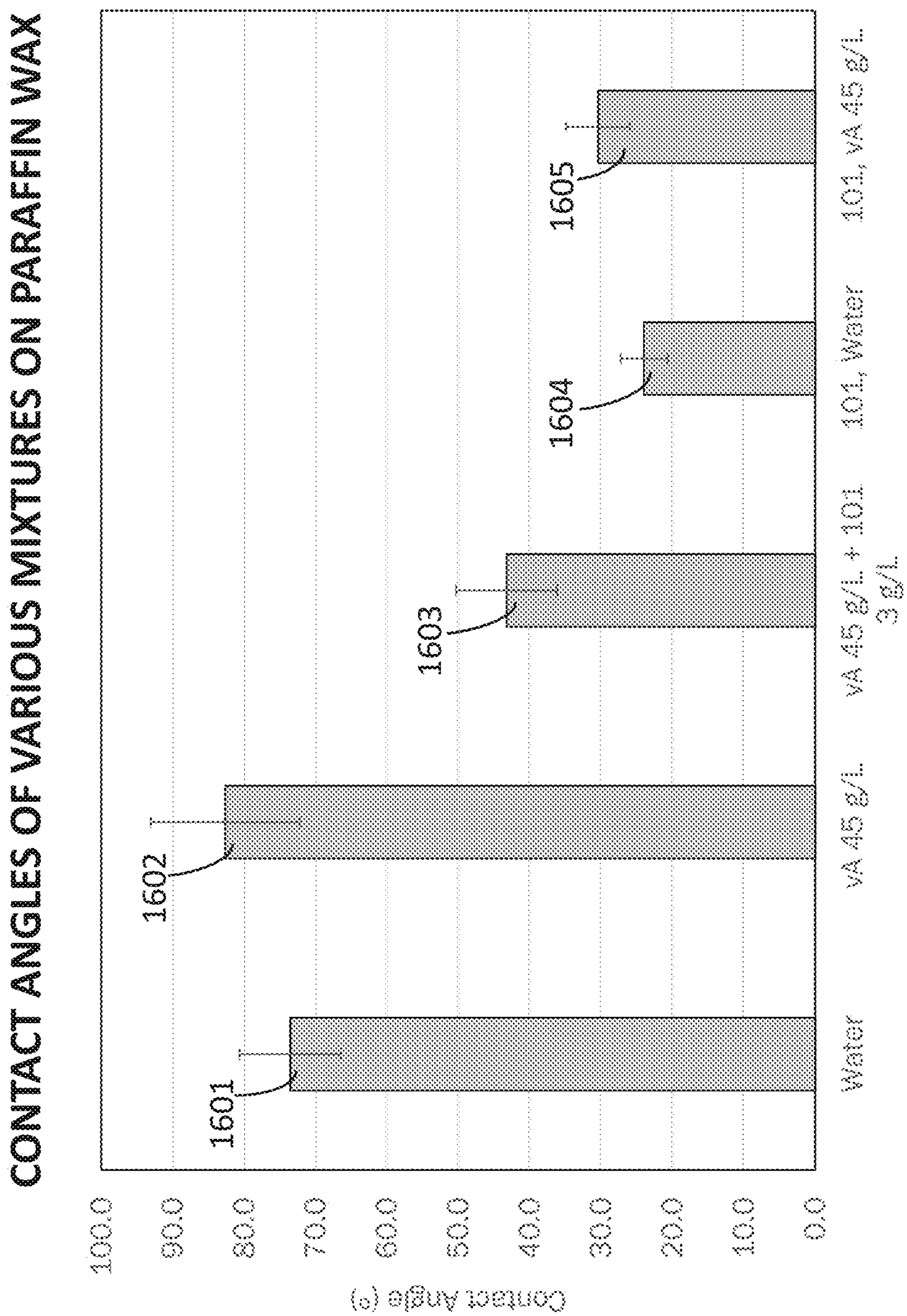
FIG. 16 shows a graph of contact angles of various solvents and mixtures on the surface of paraffin wax.

Example 12: Effect of Priming the Surface of Paraffin Wax on the Contact Angle of Solvents and Mixtures FIG. 16 shows a graph of contact angles of various solvents and mixtures on the surface of paraffin wax. Contact angles were determined by placing drops containing 5 microliters of solvent/mixture on the surface of paraffin wax and determining the contact angle by digital image analysis. Each bar in the graph represents measurements of 15-20 drops. For bar 1601, the solvent was pure water. For bar 1602, the mixture included SA-1G and SA-Na combined at a mass ratio of 95:5 and dispersed in water at a concentration of 45 mg/mL. The mixture corresponding to bar 1603 was the same as that of bar 1602 but also included 3 mg/mL of CA-1G. For bar 1604, a mixture of CA-1G at a concentration of 3 mg/mL in water was first deposited on the surface of the paraffin wax and then allowed to dry in order to prime the surface. Afterward, the contact angle of water on the primed surface was determined. For bar 1605, a mixture of CA-1G at a concentration of 3 mg/mL in water was first deposited on the surface of the paraffin wax and then allowed to dry in order to prime the surface. Afterward, the contact angle of a mixture of SA-1G and SA-Na at a mass ratio of 95:5 dispersed in water at a concentration of 45 mg/mL on the primed surface was determined.

As seen in FIG. 16, the drops corresponding to bar 1601 (pure water) exhibited an average contact angle of 74° on paraffin wax. The drops corresponding to bar 1602 (a mixture of SA-1G and SA-Na) exhibited an average contact angle of 83° on paraffin wax. The drops corresponding to bar 1603 (a mixture of SA-1G, Sa-Na, and CA-1G) exhibited an average contact angle of 43° on paraffin wax. The drops corresponding to bar 1604 (pure water on primed paraffin wax surface) exhibited an average contact angle of 24°. The drops corresponding to bar 1605 (mixture of SA-1G and SA-Na in water on primed paraffin wax surface) exhibited an average contact angle of 30°.

Example 13: Effect of Ester to Salt Ratio in Coatings Over Avocados on Mass Loss Factor FIG. 18 shows the mass loss factor for groups of avocados that were coated with a coating agent including either SA-Na or MA-Na combined at different ratios with a mixture that was approximately a 50/50 mix of SA-1G and PA-1G. Coatings were formed by adding each coating agent to water at a concentration of 30 mg/mL to form a suspension, applying the suspension to the surface of the avocados, and allowing the solvent to evaporate. Bar 1801 corresponds to untreated avocados (control group). Bar 1802 corresponds to a coating agent including the SA-1G/PA-1G mixture and SA-Na combined at a mass ratio of 94:6. Bar 1803 corresponds to a coating agent including the SA-1G/PA-1G mixture and SA-Na combined at a mass ratio of 70:30. Bar 1804 corresponds to a coating agent including the SA-1G/PA-1G mixture and MA-Na combined at a mass ratio of 94:6. Bar 1805 corresponds to a coating agent including the SA-1G/PA-1G mixture and MA-Na combined at a mass ratio of 70:30. Each bar in the graph represents a group of 180 avocados. All coatings were formed by brushing the suspension onto the avocados on a brushbed, placing the avocados on drying racks, and allowing the avocados to dry under ambient room conditions at a temperature in the range of about 23° C.-27° C. and humidity in the range of about 40%-55%. The avocados were held at these same temperature and humidity conditions for the entire duration of the time they were tested.

As seen in FIG. 18, the average mass loss factor for the avocados corresponding to bar 1802 was 1.88, the average mass loss factor for the avocados corresponding to bar 1803 was 1.59, the average mass loss factor for the avocados corresponding to bar 1804 was 2.47, and the average mass loss factor for the avocados corresponding to bar 1805 was 1.91.

While various compositions and methods have been described above, it should be understood that they have been presented by way of example only, and not limitation. Where methods and steps described above indicate certain events occurring in certain order, ordering of steps may be modified, and such modification are in accordance with the variations of the invention. Additionally, certain of the steps may be performed concurrently in a parallel process when possible, as well as performed sequentially as described above. The various implementations have been particularly shown and described, but it will be understood that various changes in form and details may be made. Accordingly, other implementations are within the scope of the following claims.

The invention claimed is:

1. An edible coating composition, comprising:

(i) from 70% to 99% by mass of a first group of one or more compounds, wherein each compound of the first group is a compound of Formula I; and (ii) from 1% to 30% by mass of a second group of one or more compounds, wherein each compound of the second group is a salt of Formula II, wherein Formulas I and II are:

(Formula I)

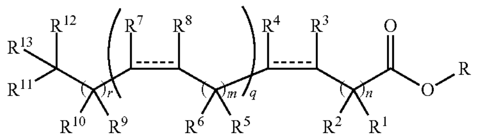

(Formula II)

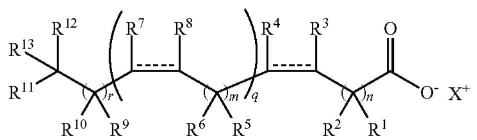

wherein for each of the formulas:

$R^1$, $R^2$, $R^5$, $R^6$, $R^9$, $R^{10}$, $R^{11}$, $R^{12}$ and $R^{13}$ are each independently, at each occurrence, —H, —(C═O)$R^{14}$, —(C═O)H, —(C═O)OH, —(C═O)O$R^{14}$, —(C═O)—O—(C═O)$R^{14}$, —O(C═O)$R^{14}$, —O$R^{14}$, —N$R^{14}R^{15}$, —S$R^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl, or heteroaryl is optionally substituted with one or more —O$R^{14}$, —N$R^{14}R^{15}$, —S$R^{14}$, or halogen;

$R^3$, $R^4$, $R^7$ and $R^8$ are each independently, at each occurrence, —H, —O$R^{14}$, —N$R^{14}R^{15}$, —S$R^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl, or heteroaryl is optionally substituted with —O$R^{14}$, —N$R^{14}R^{15}$, —S$R^{14}$, or halogen; or $R^3$ and $R^4$ can combine with the carbon atoms to which they are attached to form a $C_3$-$C_6$ cycloalkyl, a $C_4$-$C_6$ cycloalkenyl, or 3- to 6-membered ring heterocycle; and/or $R^7$ and $R^8$ can combine with the carbon atoms to which they are attached to form a $C_3$-$C_6$ cycloalkyl, a $C_4$-$C_6$ cycloalkenyl, or 3- to 6-membered ring;

$R^{14}$ and $R^{15}$ are each independently, at each occurrence, —H, aryl, heteroaryl, —$C_1$-$C_6$ alkyl, —$C_2$-$C_6$ alkenyl, or —$C_2$-$C_6$ alkynyl;

the symbol ------ represents a single or cis or trans double bond;

n is 0, 1, 2, 3, 4, 5, 6, 7, or 8;

m is 0, 1, 2, or 3;

q is 0, 1, 2, 3, 4, or 5;

r is 0, 1, 2, 3, 4, 5, 6, 7, or 8;

R is -glyceryl; and

X is a cationic moiety.

2. The composition of claim 1, wherein each compound of the first group of compounds has a carbon chain length of at least 14.

3. The composition of claim 2, wherein each compound of the second group of compounds has a carbon chain length of at least 14.

4. The composition of claim 1, wherein the second group of compounds comprises SA-Na, PA-Na, MA-Na, SA-K, PA-K, or MA-K.

5. The composition of claim 1, wherein the composition comprises less than 10% by mass of diglycerides.

6. The composition of claim 1, wherein the composition comprises less than 10% by mass of triglycerides.

7. The composition of claim 1, wherein the first group of one or more compounds comprises at least two compounds of Formula (I).

8. The composition of claim 1, comprising from 80% to 99% by mass of the first group of one or more compounds and from 1% to 20% by mass of the second group of one or more compounds.

9. A mixture comprising an edible coating composition in a solvent, the composition comprising:

(i) from 70% to 99% by mass of a first group of one or more compounds, wherein each compound of the first group is a compound of Formula I;

(ii) from 1% to 30% by mass of a second group of one or more compounds, wherein each compound of the second group is a salt of Formula II, wherein Formulas I and II are:

(Formula I)

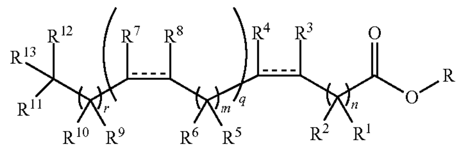

(Formula II)

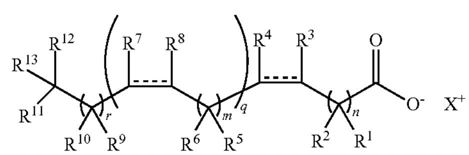

wherein for each of the formulas:

$R^1$, $R^2$, $R^5$, $R^6$, $R^9$, $R^{10}$, $R^{11}$, $R^{12}$ and $R^{13}$ are each independently, at each occurrence, —H, —(C═O)$R^{14}$, —(C═O)H, —(C═O)OH, —(C═O)O$R^{14}$, —(C═O)—O—(C═O)$R^{14}$, —O(C═O)$R^{14}$, —O$R^{14}$, —N$R^{14}R^{15}$, —S$R^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl, or heteroaryl is optionally substituted with one or more —O$R^{14}$, —N$R^{14}R^{15}$, —S$R^{14}$, or halogen;

$R^3$, $R^4$, $R^7$ and $R^8$ are each independently, at each occurrence, —H, —O$R^{14}$, —N$R^{14}R^{15}$, —S$R^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl, or heteroaryl is optionally substituted with —O$R^{14}$, —N$R^{14}R^{15}$, —S$R^{14}$, or halogen; or $R^3$ and $R^4$ can combine with the carbon atoms to which they are attached to form a $C_3$-$C_6$ cycloalkyl, a $C_4$-$C_6$ cycloalkenyl, or 3- to 6-membered ring heterocycle; and/or $R^7$ and $R^8$ can combine with the carbon atoms to which they are attached to form a $C_3$-$C_6$ cycloalkyl, a $C_4$-$C_6$ cycloalkenyl, or 3- to 6-membered ring;

$R^{14}$ and $R^{15}$ are each independently, at each occurrence, —H, aryl, heteroaryl, —$C_1$-$C_6$ alkyl, —$C_2$-$C_6$ alkenyl, or —$C_2$-$C_6$ alkynyl;

the symbol ------ represents a single or cis or trans double bond;

n is 0, 1, 2, 3, 4, 5, 6, 7, or 8;

m is 0, 1, 2, or 3;

q is 0, 1, 2, 3, 4, or 5;

r is 0, 1, 2, 3, 4, 5, 6, 7, or 8;

R is -glyceryl; and

X is a cationic moiety.

10. The mixture of claim 9, wherein the solvent is water.

11. The mixture of claim 9, wherein the solvent is at least 50% water by volume.

12. The mixture of claim 9, wherein the first group of compounds comprises one or more compounds selected from the group consisting of:

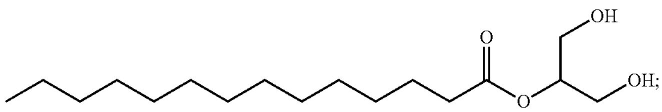

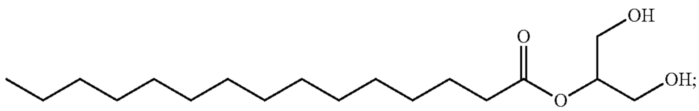

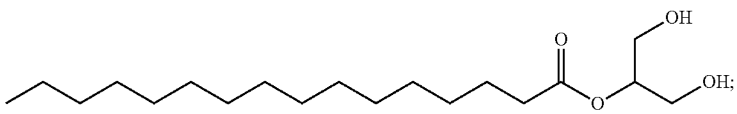

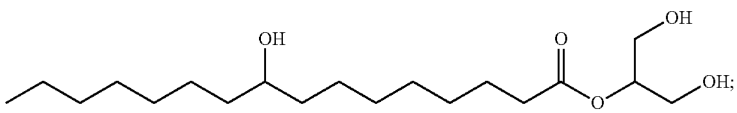

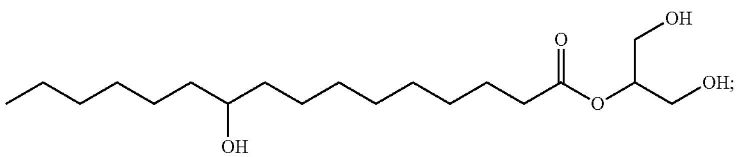

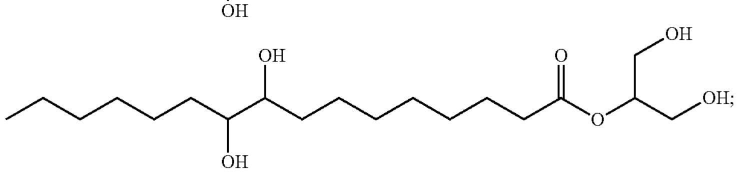

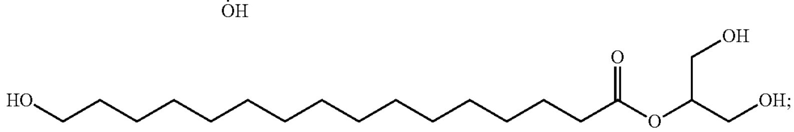

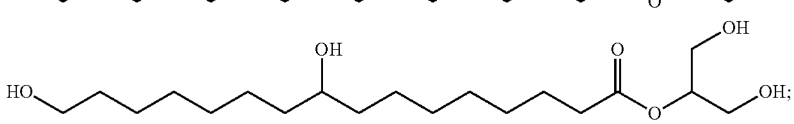

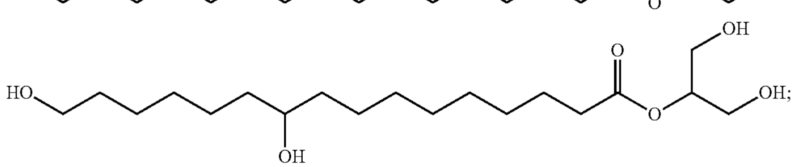

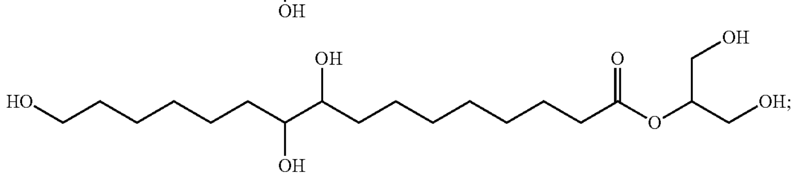

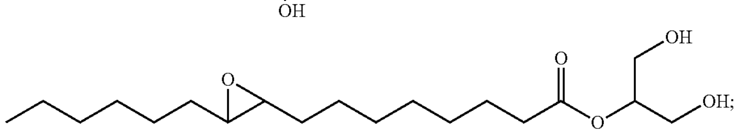

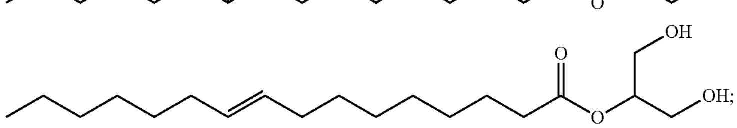

-continued
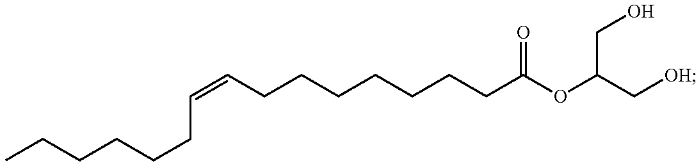
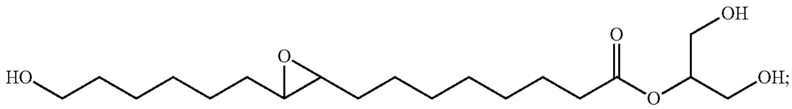
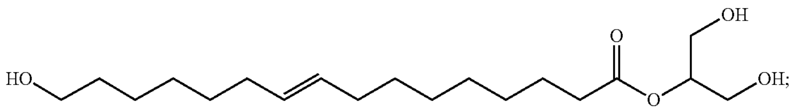
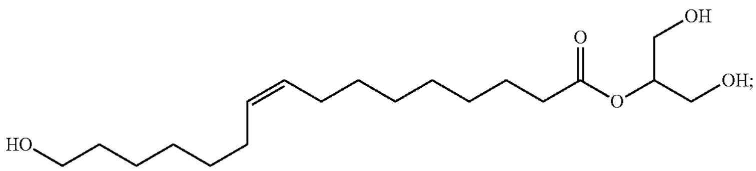
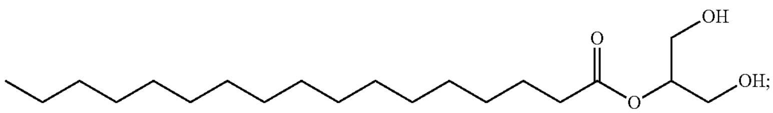
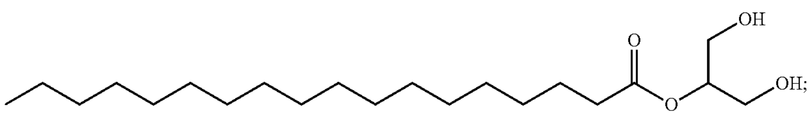
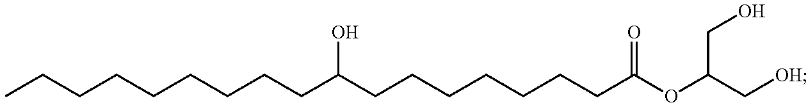
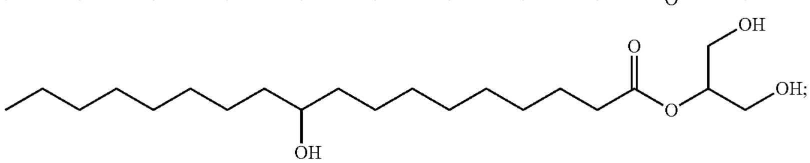
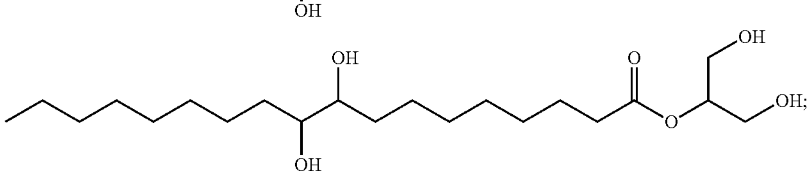
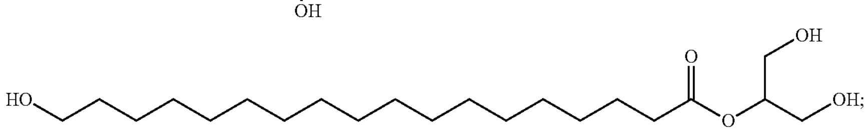
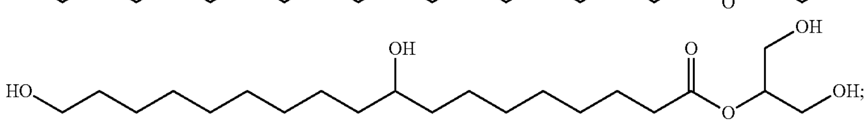
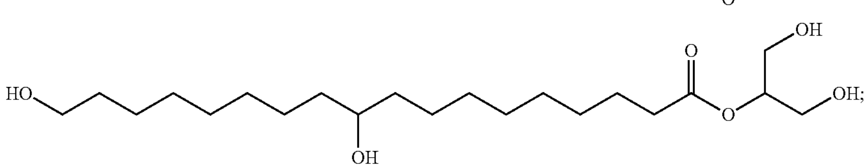
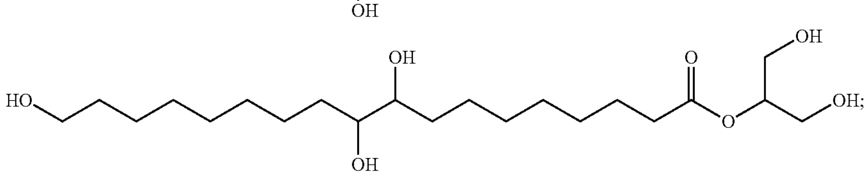

-continued
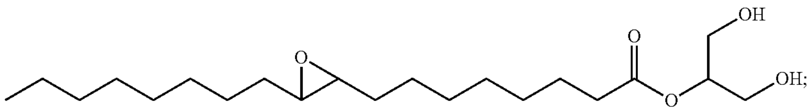
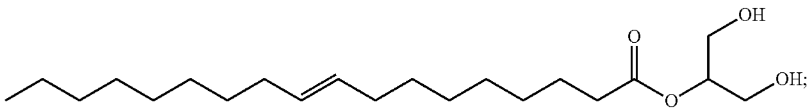
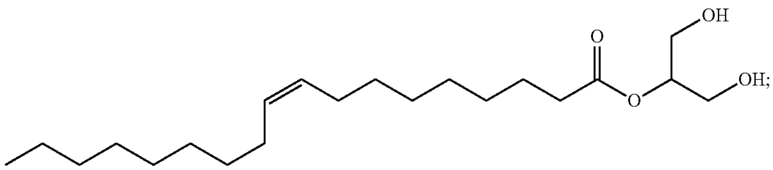
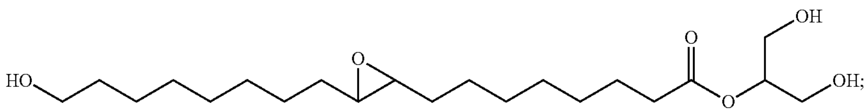
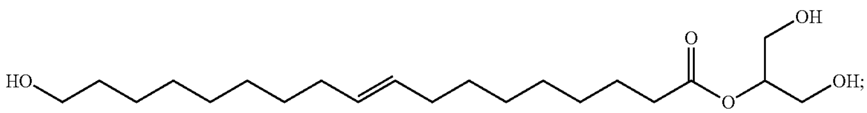
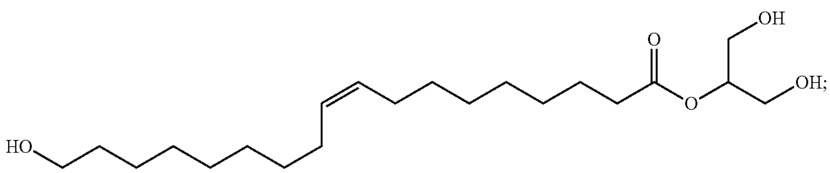
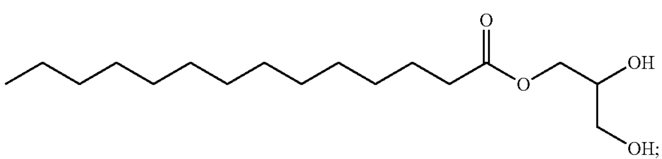
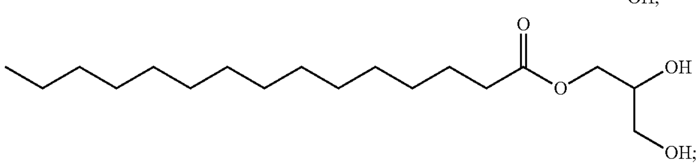
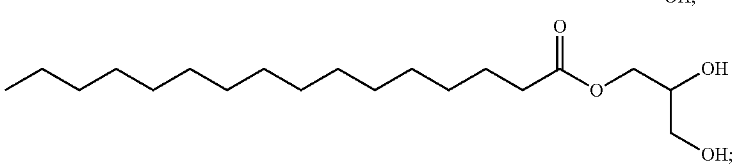
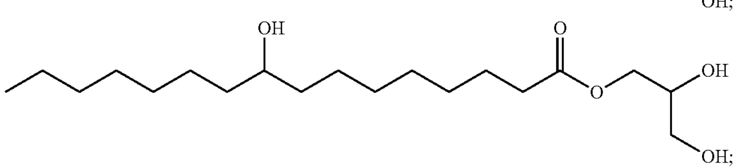
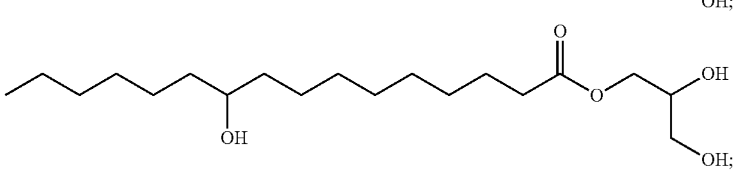
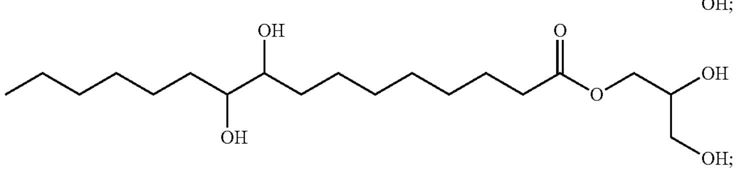

-continued
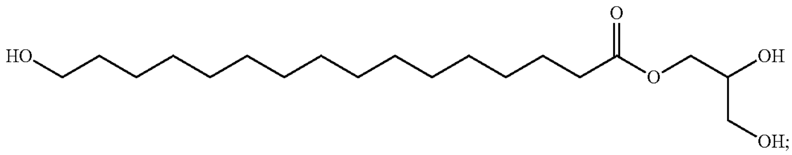
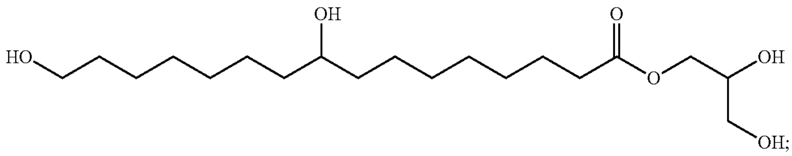
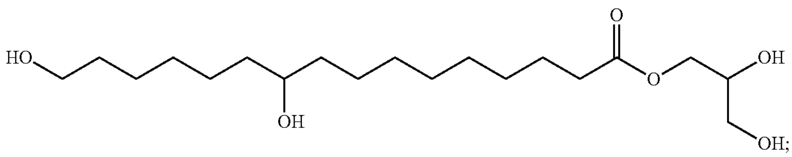
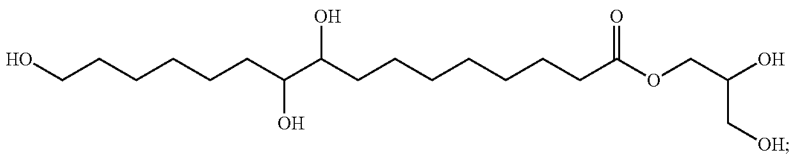
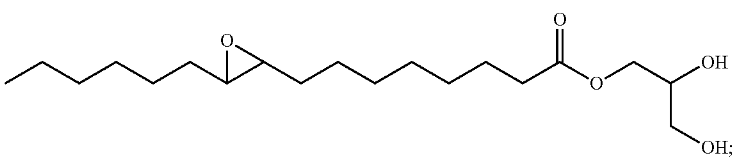
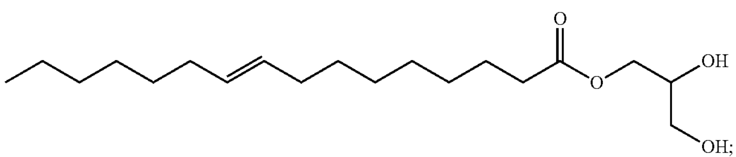
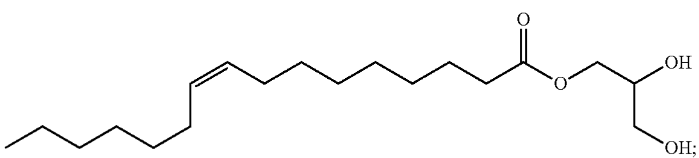
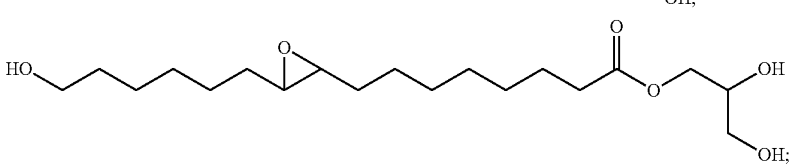
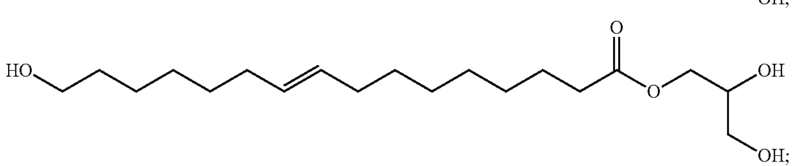
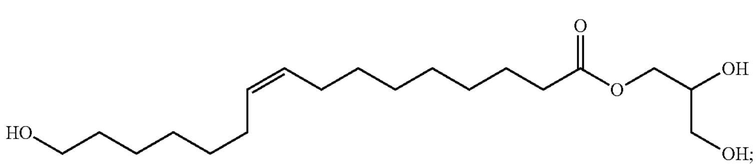
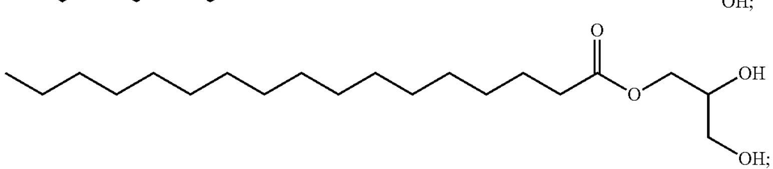

-continued
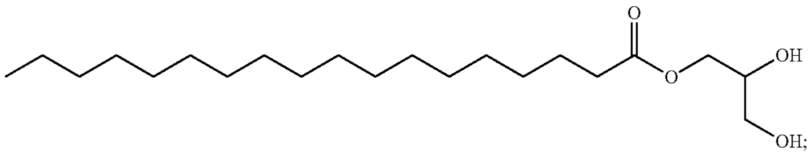
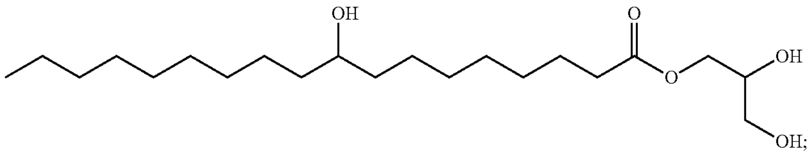
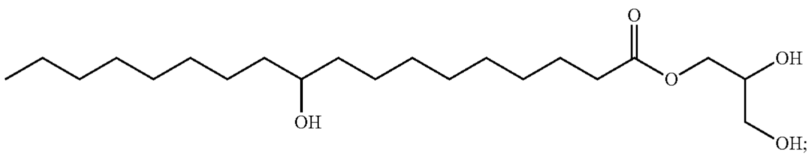
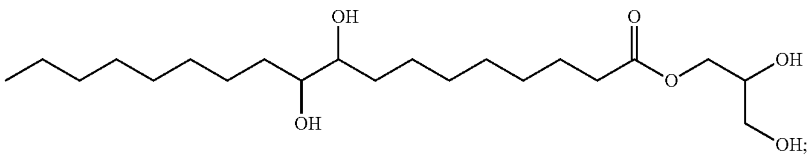
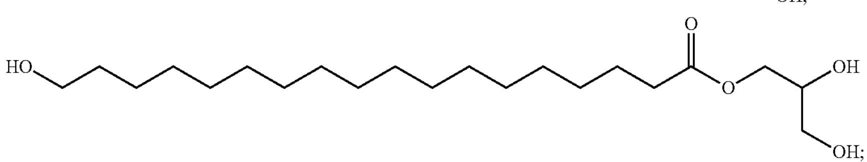
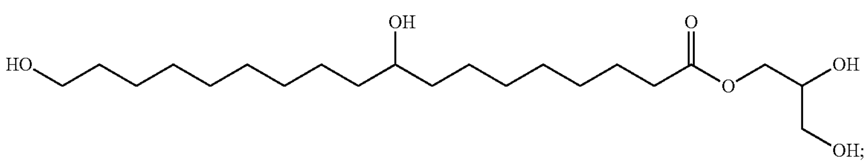
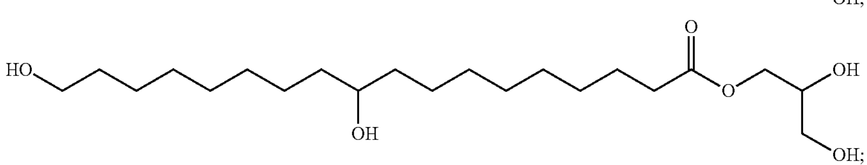
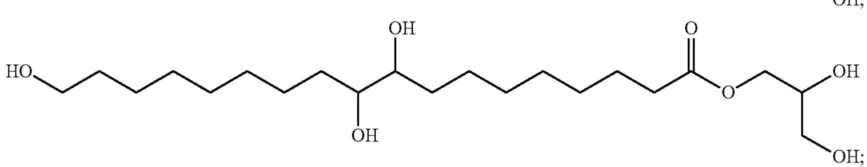
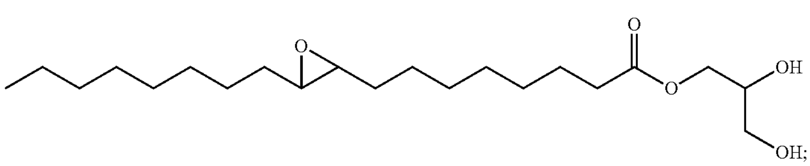
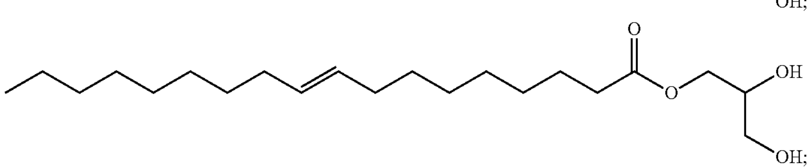
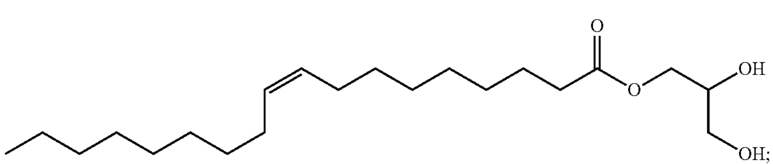

-continued
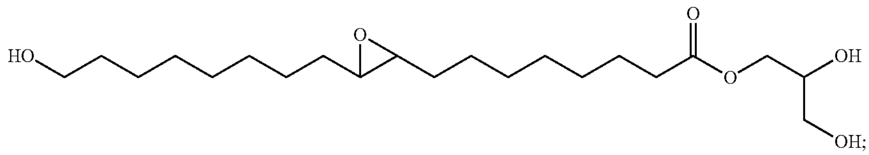
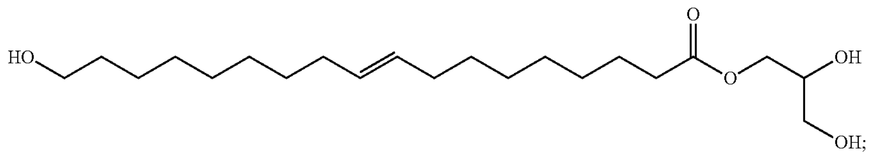
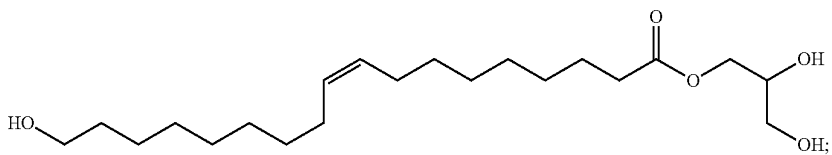
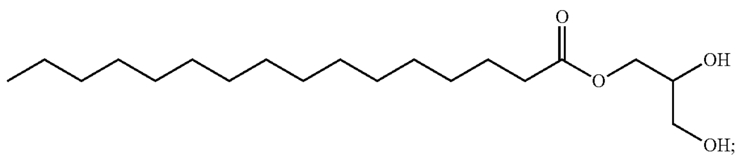
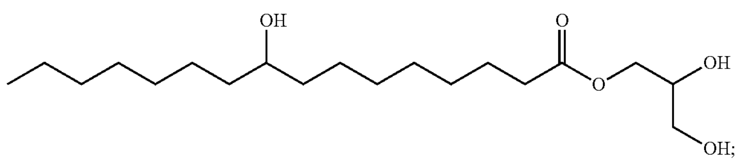
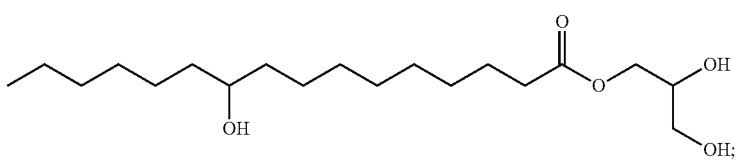
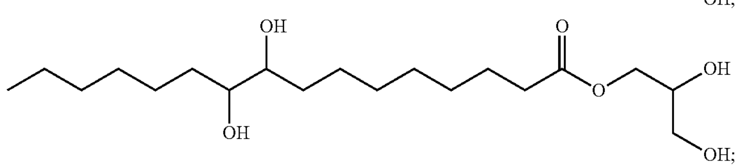
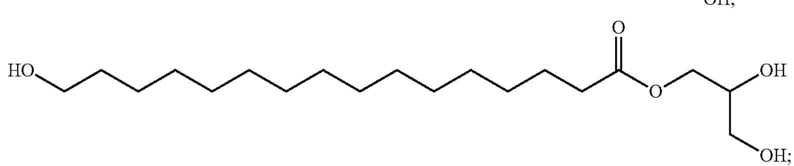
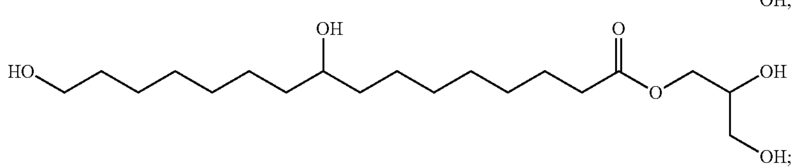
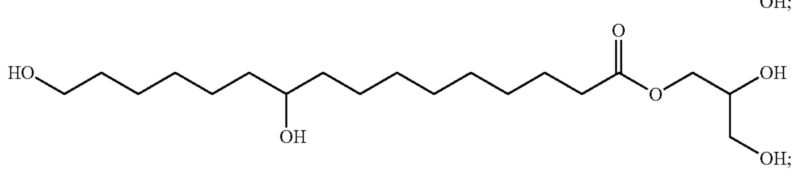
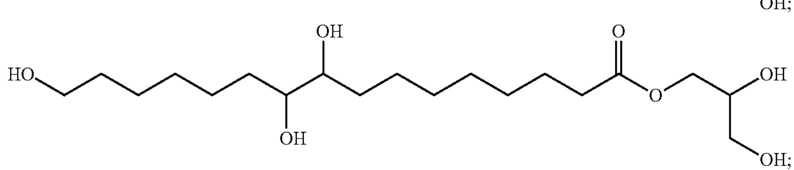

-continued

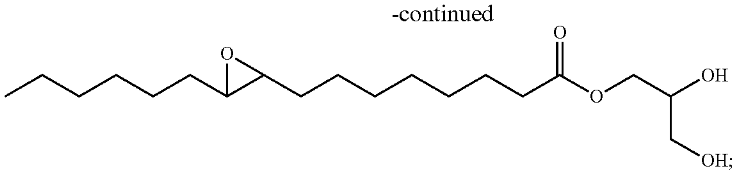

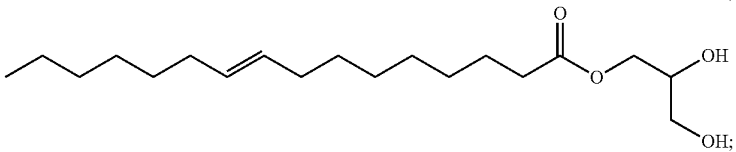

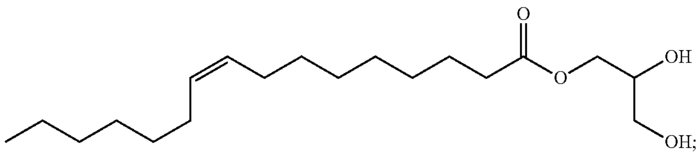

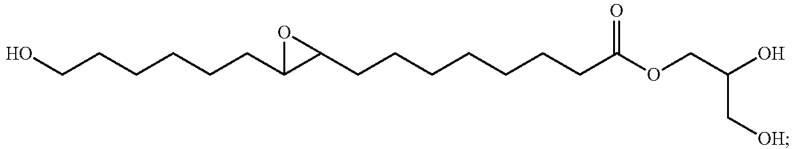

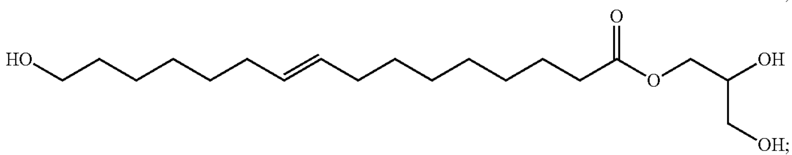

and

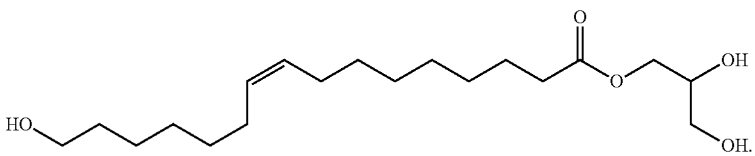

13. The mixture of claim 12, wherein the second group of compounds comprises SA-Na, PA-Na, MA-Na, SA-K, PA-K, or MA-K.

14. The mixture of claim 9, wherein a concentration of the composition in the mixture is in a range of 0.5 to 200 mg/mL.

15. The composition of claim 9, wherein the first group of one or more compounds comprises at least two compounds of Formula (I).

16. An edible coating composition, comprising:

(i) from 70% to 99% by mass of a first group of one or more compounds, wherein each compound of the first group is a compound of Formula I; and (ii) from 1% to 30% by mass of a second group of one or more compounds, wherein each compound of the second group is a compound of Formula III, wherein Formula I and Formula III are:

(Formula I)

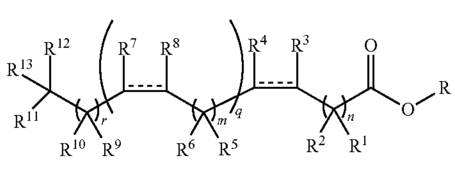

-continued (Formula III)

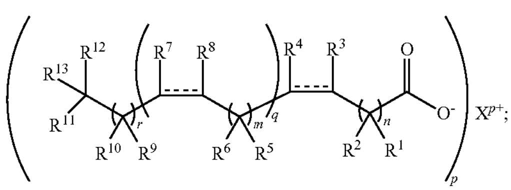

wherein for each of the formulas:

$R^1$, $R^2$, $R^5$, $R^6$, $R^9$, $R^{10}$, $R^{11}$, $R^{12}$ and $R^{13}$ are each independently, at each occurrence, —H, —(C═O)$R^{14}$, —(C═O)H, —(C═O)OH, —(C═O)O$R^{14}$, —(C═O)—O—(C═O)$R^{14}$, —O(C═O)$R^{14}$, —O$R^{14}$, —N$R^{14}R^{15}$, —S$R^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl, or heteroaryl is optionally substituted with one or more —O$R^{14}$, —N$R^{14}R^{15}$, —S$R^{14}$, or halogen;

$R^3$, $R^4$, $R^7$ and $R^8$ are each independently, at each occurrence, —H, —O$R^{14}$, —N$R^{14}R^{15}$, —S$R^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl, or heteroaryl is optionally substituted with —O$R^{14}$, —N$R^{14}R^{15}$, —S$R^{14}$, or halogen; or $R^3$ and $R^4$ can combine with the carbon atoms to which they are attached to form a $C_3$-$C_6$ cycloalkyl, a $C_4$-$C_6$ cycloalkenyl, or 3- to 6-membered ring heterocycle; and/or $R^7$ and $R^8$ can combine with the carbon atoms to which they are attached to form a $C_3$-$C_6$ cycloalkyl, a $C_4$-$C_6$ cycloalkenyl, or 3- to 6-membered ring;

$R^{14}$ and $R^{15}$ are each independently, at each occurrence, —H, aryl, heteroaryl, —$C_1$-$C_6$ alkyl, —$C_2$-$C_6$ alkenyl, or —$C_2$-$C_6$ alkynyl;

the symbol ====== represents a single or cis or trans double bond;

n is 0, 1, 2, 3, 4, 5, 6, 7, or 8;

m is 0, 1, 2, or 3;

q is 0, 1, 2, 3, 4, or 5;

r is 0, 1, 2, 3, 4, 5, 6, 7, or 8;

R is -glyceryl; and $X^{p+}$ is a cationic counter ion having a charge state p, and p is 2 or 3.

17. The composition of claim 16, wherein the first group of compounds comprises one or more compounds selected from the group consisting of:

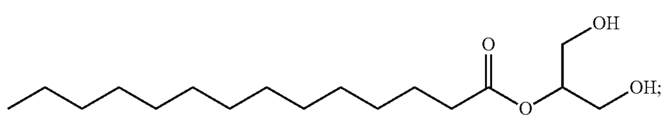

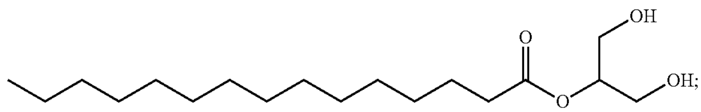

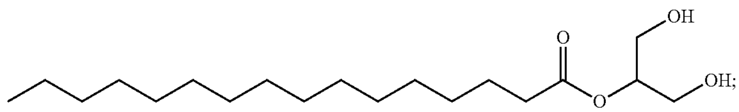

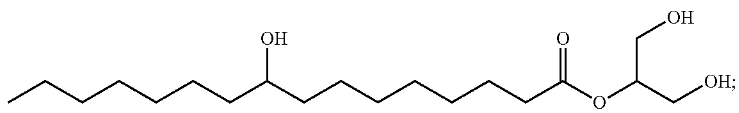

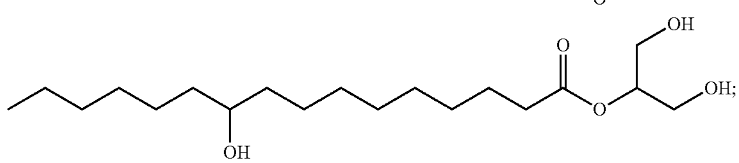

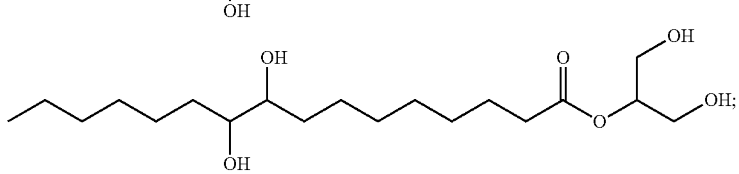

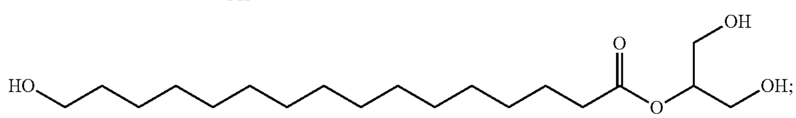

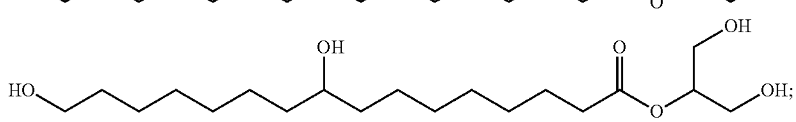

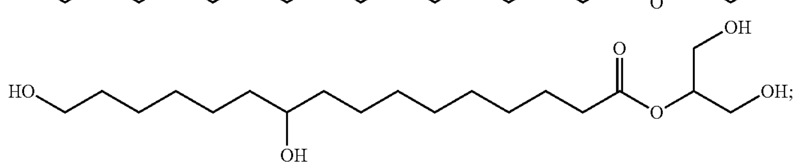

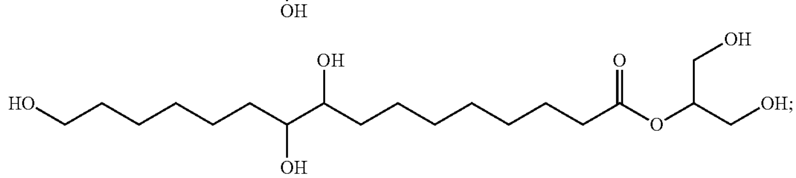

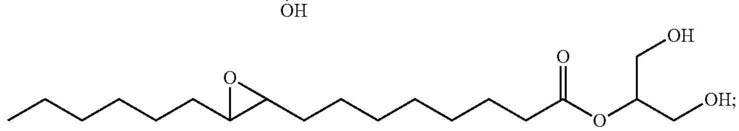

-continued
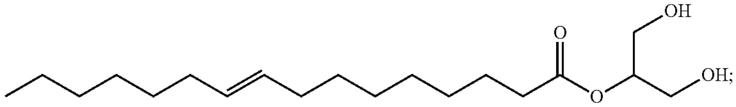
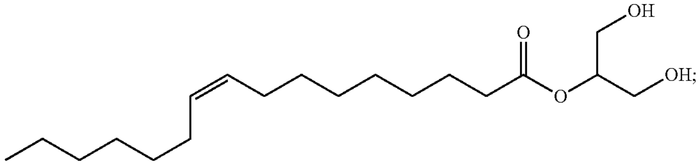
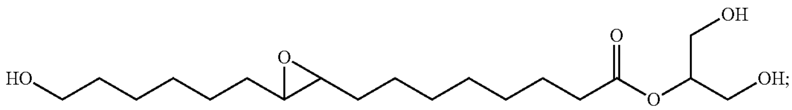
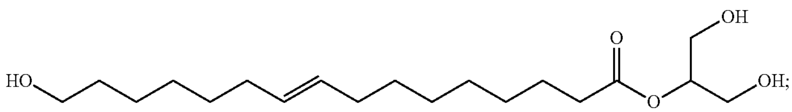
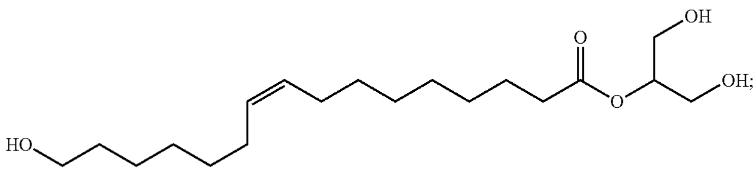
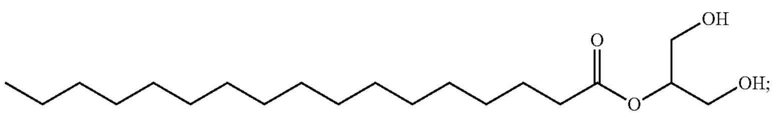
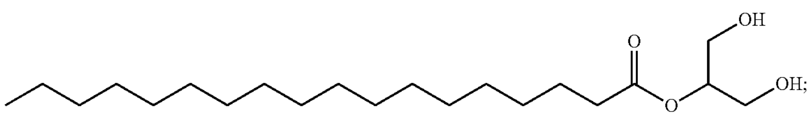
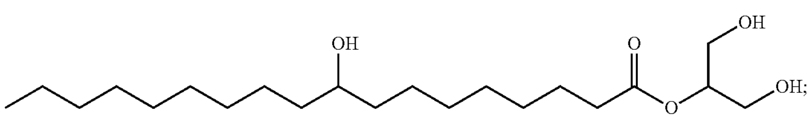
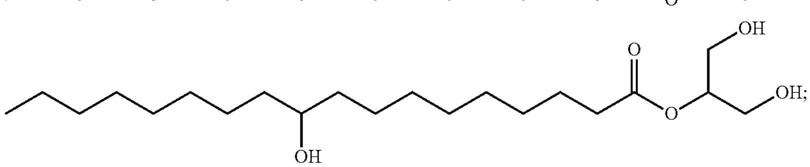
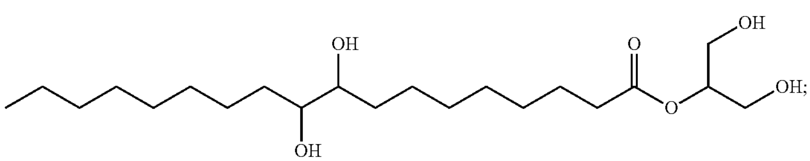
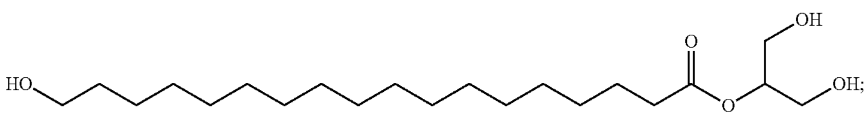
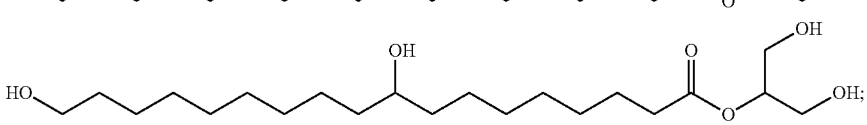
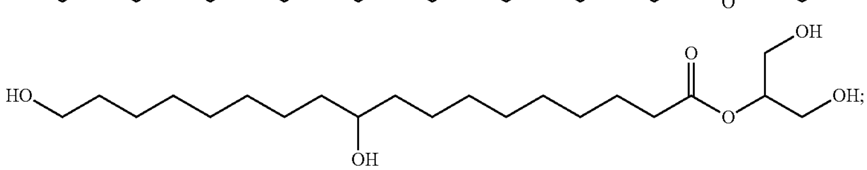

-continued
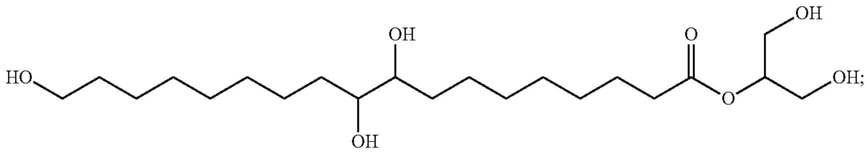
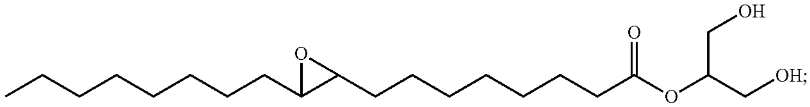
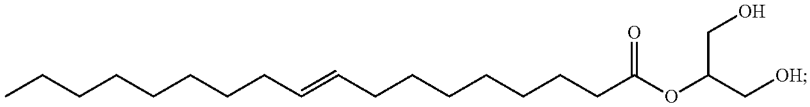
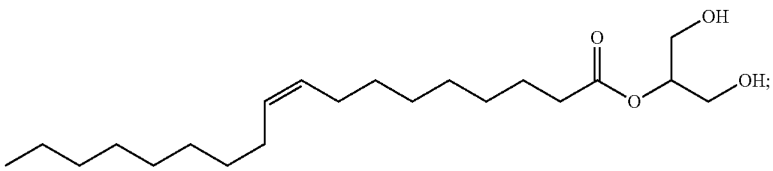
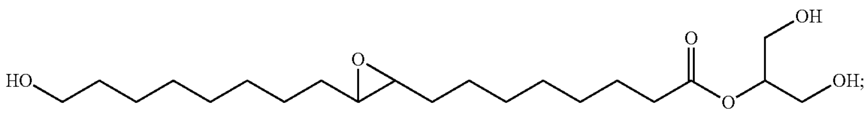
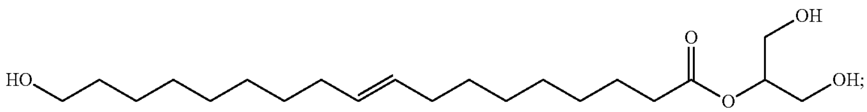
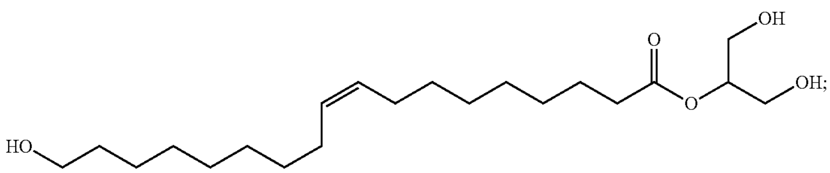
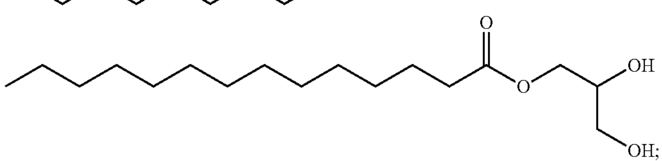
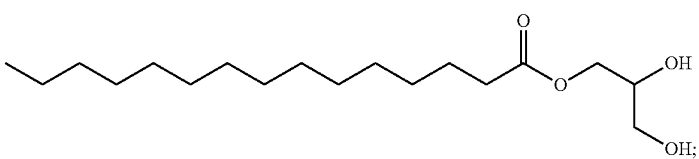
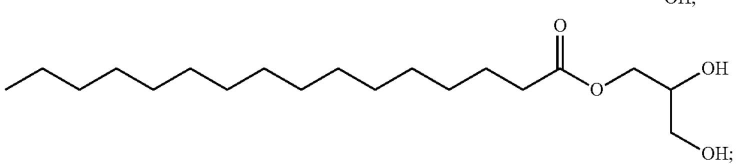
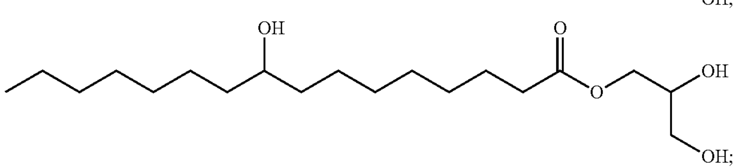
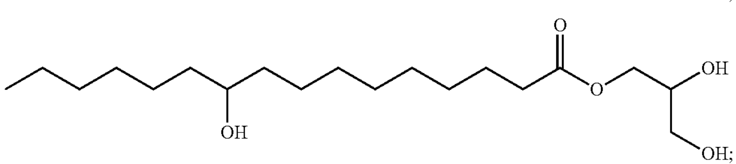

-continued
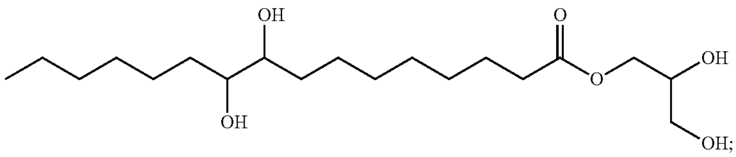
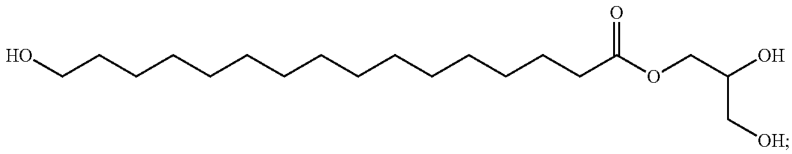
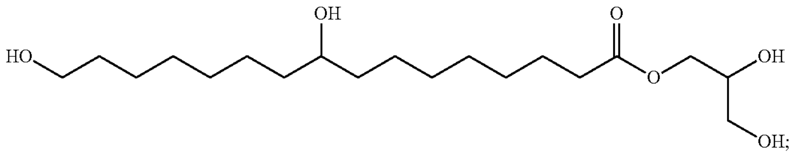
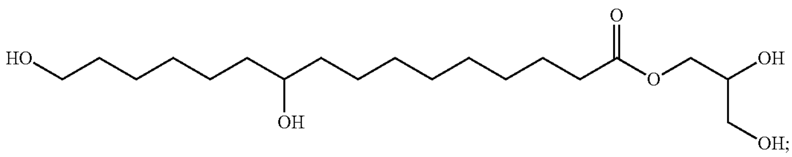
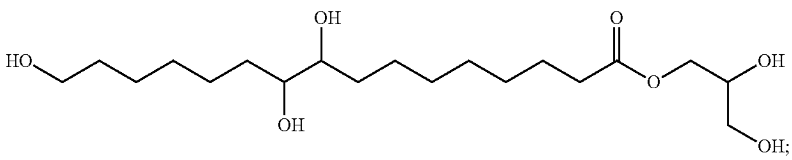
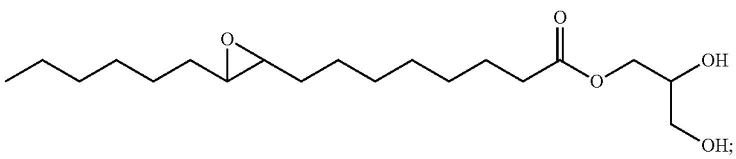
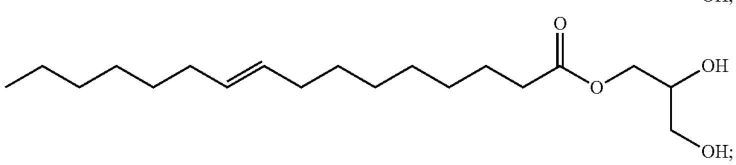
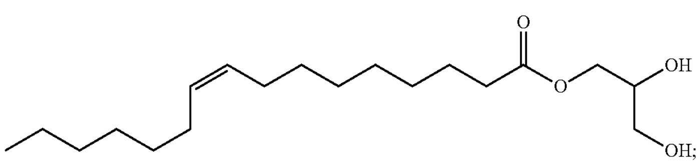
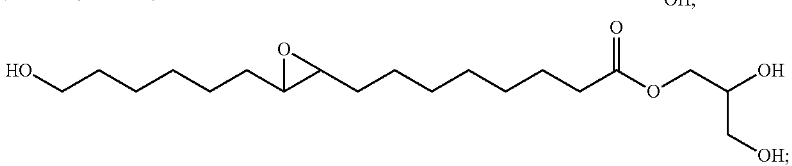
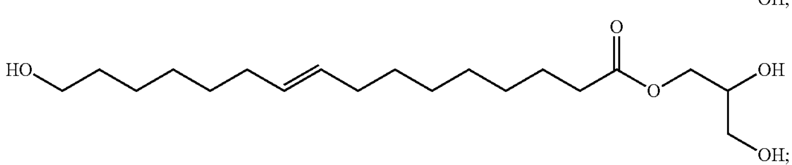
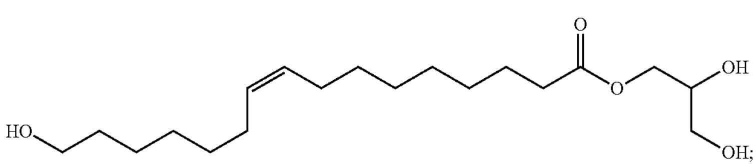

-continued
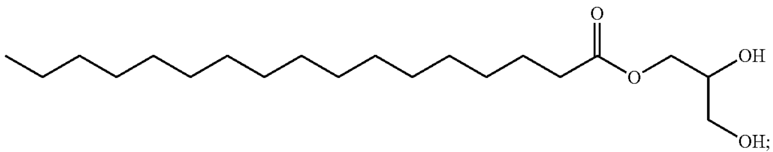
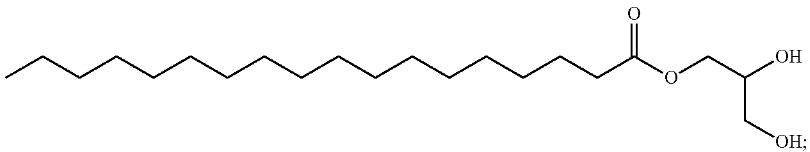
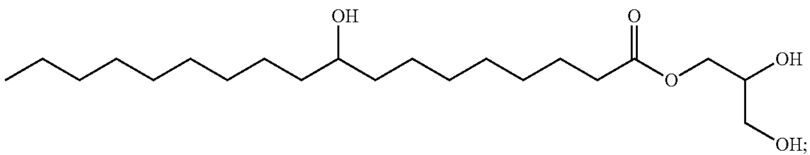
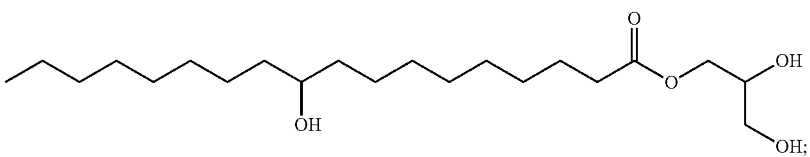
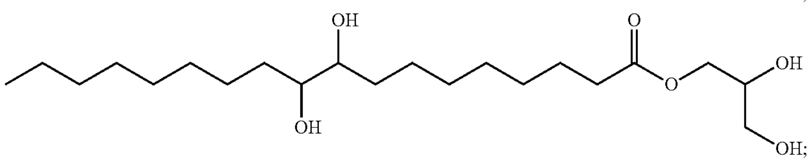
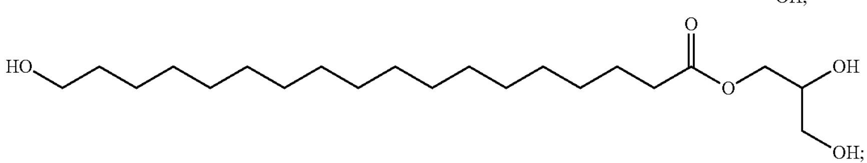
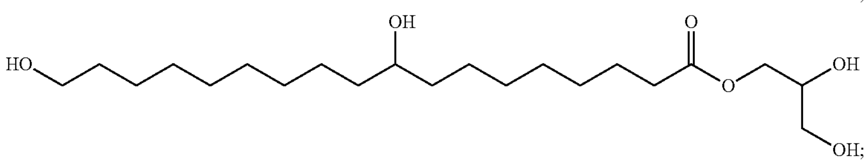
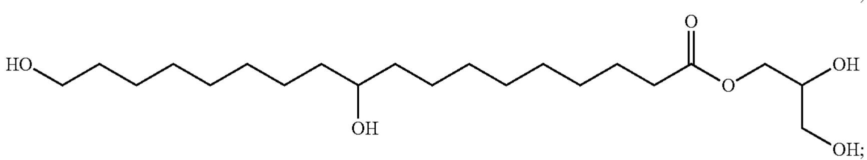
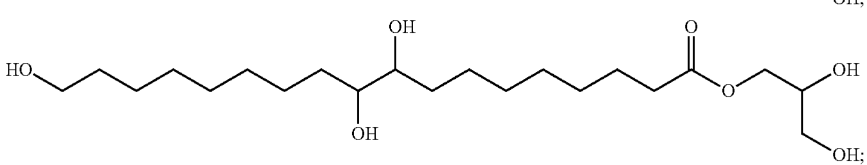
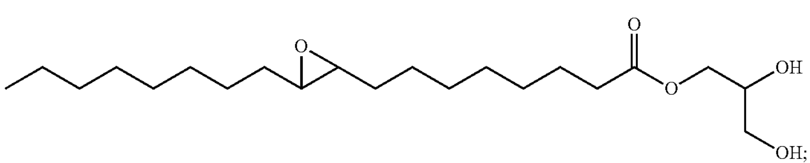
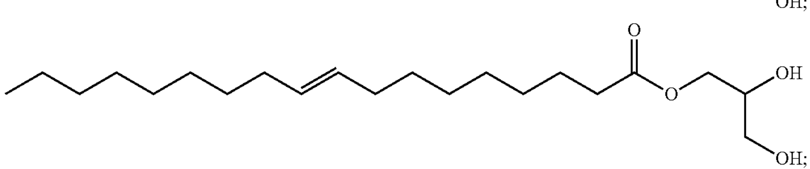

-continued
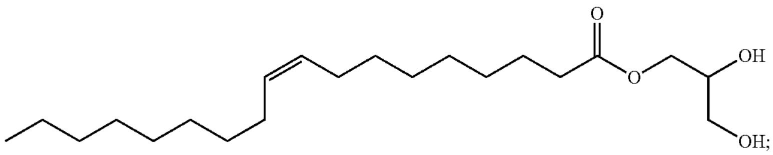
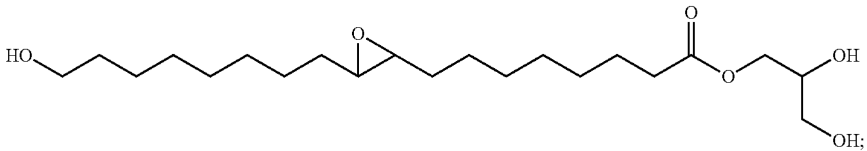
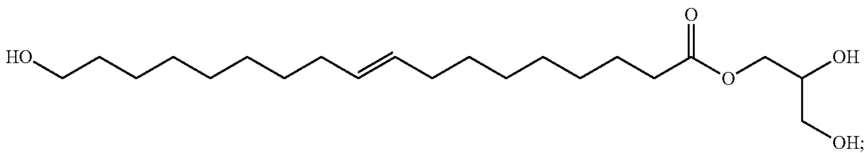
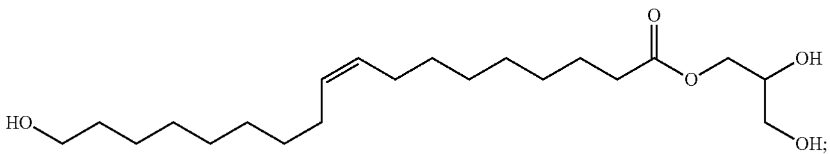
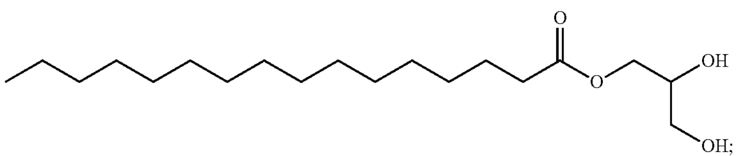
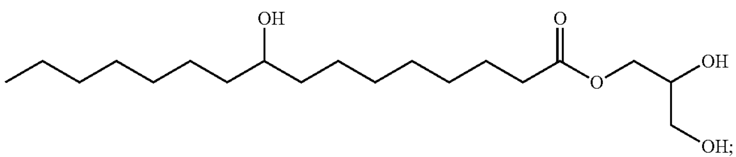
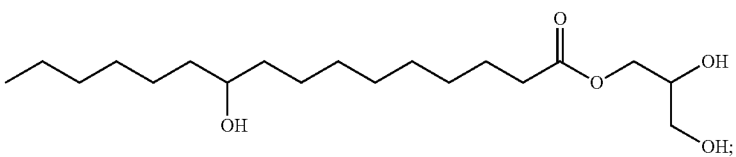
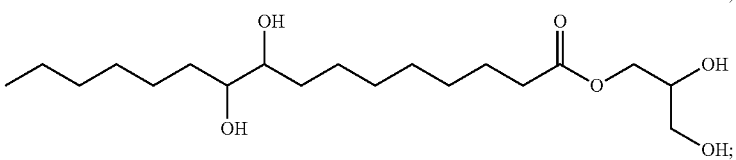
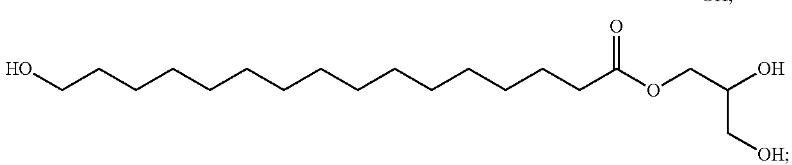
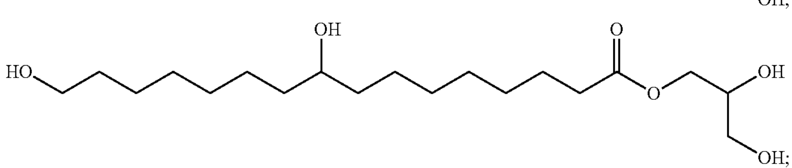
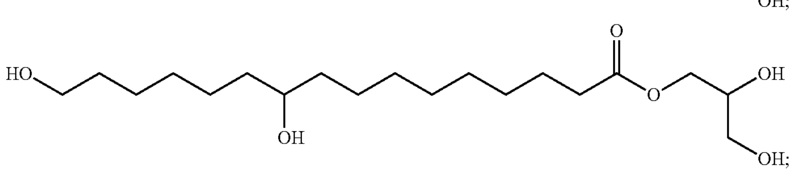

-continued

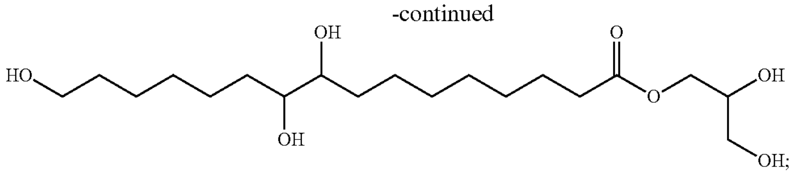

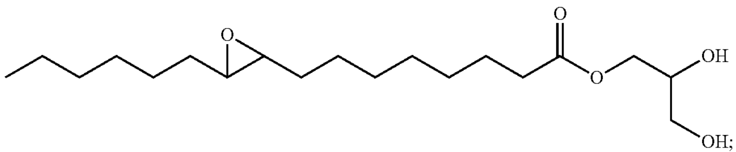

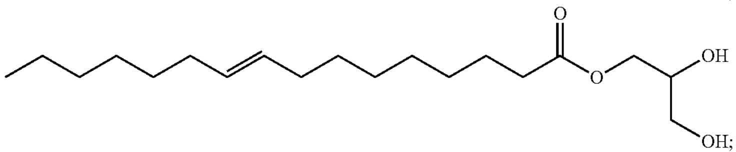

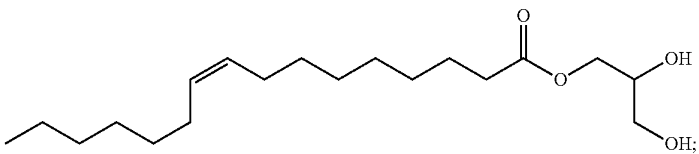

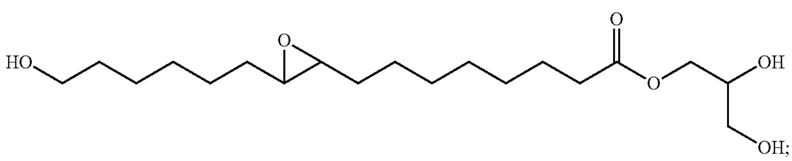

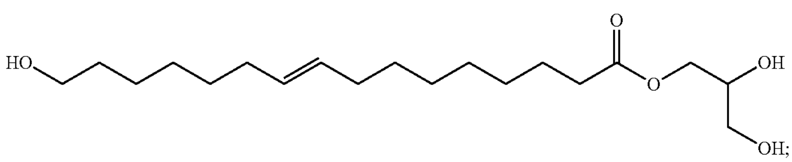

and

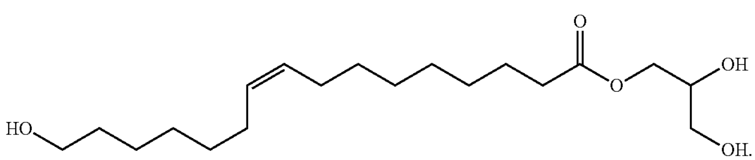 [SMILES: O=C(CCCCCCC/C=C\CCCCCCO)OCC(O)CO]

18. The composition of claim 16, wherein the second group of compounds comprises $(SA)_2$-Mg, $(PA)_2$-Mg, $(MA)_2$-Mg, $(SA)_2$-Ca, $(PA)_2$-Ca, or $(MA)_2$-Ca.

19. The composition of claim 16, wherein the first group of one or more compounds comprises at least two compounds of Formula (I).

20. A mixture comprising an edible coating composition in a solvent, the composition comprising:

(i) from 70% to 99% by mass of a first group of one or more compounds, wherein each compound of the first group is a compound of Formula I;

(ii) from 1% to 30% by mass of a second group of one or more compounds, wherein each compound of the second group is a compound of Formula III, wherein Formula I and Formula III are:

(Formula I)

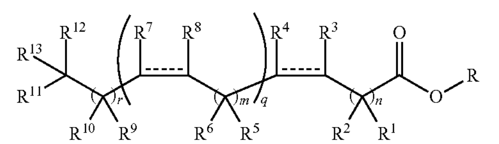

(Formula III)

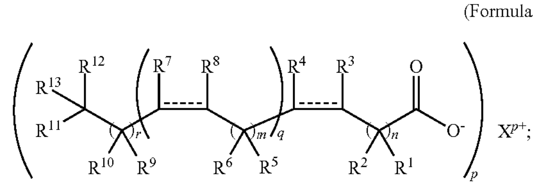

wherein for each of the formulas:

$R^1$, $R^2$, $R^5$, $R^6$, $R^9$, $R^{10}$, $R^{11}$, $R^{12}$ and $R^{13}$ are each independently, at each occurrence, —H, —(C═O)$R^{14}$, —(C═O)H, —(C═O)OH, —(C═O)O$R^{14}$, —(C═O)—O—(C═O)$R^{14}$, —O(C═O)$R^{14}$, —O$R^{14}$, —N$R^{14}R^{15}$, —S$R^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl, or heteroaryl is optionally substituted with one or more —O$R^{14}$, —N$R^{14}R^{15}$, —S$R^{14}$, or halogen;

$R^3$, $R^4$, $R^7$ and $R^8$ are each independently, at each occurrence, —H, —O$R^{14}$, —N$R^{14}R^{15}$, —S$R^{14}$, halogen, —$C_1$-$C_6$ alkyl, —$C_2$-$C_6$ alkenyl, —$C_2$-$C_6$ alkynyl, —$C_3$-$C_7$ cycloalkyl, aryl, or heteroaryl, wherein each alkyl, alkenyl, alkynyl, cycloalkyl, aryl, or heteroaryl is optionally substituted with —O$R^{14}$, —N$R^{14}R^{15}$, —S$R^{14}$, or halogen; or $R^3$ and $R^4$ can combine with the carbon atoms to which they are attached to form a $C_3$-$C_6$ cycloalkyl, a $C_4$-$C_6$ cycloalkenyl, or 3- to 6-membered ring heterocycle; and/or $R^7$ and $R^8$ can combine with the carbon atoms to which they are attached to form a $C_3$-$C_6$ cycloalkyl, a $C_4$-$C_6$ cycloalkenyl, or 3- to 6-membered ring;

$R^{14}$ and $R^{15}$ are each independently, at each occurrence, —H, aryl, heteroaryl, —$C_1$-$C_6$ alkyl, —$C_2$-$C_6$ alkenyl, or —$C_2$-$C_6$ alkynyl;

the symbol ------ represents a single or cis or trans double bond;

n is 0, 1, 2, 3, 4, 5, 6, 7, or 8;

m is 0, 1, 2, or 3;

q is 0, 1, 2, 3, 4, or 5;

r is 0, 1, 2, 3, 4, 5, 6, 7, or 8;

R is -glyceryl; and $X^{p+}$ is a cationic counter ion having a charge state p, and p is 2 or 3.

21. The mixture of claim 20, wherein the solvent is water.

22. The mixture of claim 20, wherein the solvent is at least 50% water by volume.

23. The mixture of claim 20, wherein each compound of the first group of compounds has a carbon chain length of at least 14.

24. The mixture of claim 23, wherein each compound of the second group of compounds has a carbon chain length of at least 14.

25. The mixture of claim 20, wherein the second group of compounds comprises $(SA)_2$-Mg, $(PA)_2$-Mg, $(MA)_2$-Mg, $(SA)_2$-Ca, $(PA)_2$-Ca, or $(MA)_2$-Ca.

26. The mixture of claim 20, wherein the composition comprises less than 10% by mass of diglycerides.

27. The mixture of claim 20, wherein the composition comprises less than 10% by mass of triglycerides.

28. The composition of claim 20, wherein the first group of one or more compounds comprises at least two compounds of Formula (I).

* * * * *